(12) United States Patent
Krishnaiah

(10) Patent No.: US 12,229,698 B2
(45) Date of Patent: *Feb. 18, 2025

(54) METHODS, SYSTEMS, APPARATUSES, AND DEVICES FOR FACILITATING MANAGING BUDGETS FOR CLOUD ACCOUNTS

(71) Applicant: Venkatesh Kumar Krishnaiah, Chantilly, VA (US)

(72) Inventor: Venkatesh Kumar Krishnaiah, Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,347

(22) Filed: May 7, 2024

(65) Prior Publication Data

US 2024/0289712 A1  Aug. 29, 2024

Related U.S. Application Data

(63) Continuation-in-part of application No. 18/298,177, filed on Apr. 10, 2023, now Pat. No. 12,028,274, (Continued)

(51) Int. Cl.
*G06Q 10/0631* (2023.01)
*G06Q 10/0637* (2023.01)

(52) U.S. Cl.
CPC .. *G06Q 10/06315* (2013.01); *G06Q 10/06375* (2013.01)

(58) Field of Classification Search
CPC ........ G06Q 10/06315; G06Q 10/06375; H04L 47/823; H04L 47/781; H04L 47/822
See application file for complete search history.

(56) References Cited

U.S. PATENT DOCUMENTS

| 2010/0050172 A1 | 2/2010 | Ferris |
| 2011/0313902 A1 | 12/2011 | Liu et al. |

(Continued)

FOREIGN PATENT DOCUMENTS

| CN | 109660366 A | 2/2022 |
| JP | 2017068296 A | 4/2017 |

(Continued)

OTHER PUBLICATIONS

"Breaking Down the Cost of Cloud Computing in 2023", retrieved from the internet retrieved on Apr. 6, 2023; <URL: https://www.techtarget.com/whatis/Breaking-Down-the-Cost-of-Cloud-Computing>.

(Continued)

*Primary Examiner* — Farzana B Huq

(57) ABSTRACT

A method for facilitating managing budgets for cloud accounts. The method comprises obtaining real-time account information associated with a cloud account of a cloud platform, analyzing the real-time account information using a machine learning model which is configured for detecting a pattern, a trend, and an anomaly corresponding to a utilization of a cloud resource by the cloud account, determining a value of a parameter associated with the utilization of the cloud resource by the cloud account, determining an action required to be implemented for the cloud account based on the determining of the value of the parameter, generating a cloud account controlling command for implementing the action based on the determining of the action, transmitting the cloud account controlling command to a cloud service provider device associated with a cloud service provider, and storing the real-time account information.

14 Claims, 45 Drawing Sheets

Related U.S. Application Data which is a continuation-in-part of application No. PCT/US2021/048091, filed on Aug. 27, 2021.

(60) Provisional application No. 63/553,995, filed on Feb. 15, 2024, provisional application No. 63/230,416, filed on Aug. 6, 2021.

(56) References Cited

U.S. PATENT DOCUMENTS

| | | | |
|---|---|---|---|
| 2012/0101952 | A1 | 4/2012 | Raleigh et al. |
| 2012/0124211 | A1 | 5/2012 | Kampas et al. |
| 2015/0067171 | A1* | 3/2015 | Yum .................. H04L 67/562 709/226 |
| 2016/0034835 | A1 | 2/2016 | Levi et al. |
| 2018/0077029 | A1 | 3/2018 | Mittal et al. |
| 2019/0171966 | A1* | 6/2019 | Rangasamy ........ G06F 11/3006 |
| 2019/0317821 | A1 | 10/2019 | O'Neal et al. |
| 2020/0073717 | A1 | 3/2020 | Hari |
| 2021/0044540 | A1 | 2/2021 | Rushton et al. |
| 2021/0099363 | A1 | 4/2021 | Leemet et al. |

FOREIGN PATENT DOCUMENTS

| | | |
|---|---|---|
| KR | 101987664 B1 | 6/2019 |
| WO | 2018203634 A1 | 11/2018 |

OTHER PUBLICATIONS

"Multi-Cloud Budgeting and Chargeback in Xi Beam" retrieved from the internet retrieved on Apr. 6, 2023; <URL: https://www.nutanix.com/blog/multi-cloud-chargeback-budgeting>.

"How to Manage and Optimize Costs of Public Cloud IaaS and PaaS" retrieved from the internet, retrieved on Apr. 6, 2023; <URL: https://www.gartner.com/en/documents/3982411>.

"Overview" retrieved from the internet, retrieved on Apr. 6, 2023; <URL: https://www.fingent.com/usecases/artificial-intelligence-for-faster-project-cost-estimation/>.

"Cloud Cost Pro Instant savings with ML-powered multi-cloud cost optimization and FinOps" retrieved from the internet, retrieved on Apr. 30, 2024; <URL: https://tinyurl.com/ypu4642y>.

"AWS Billing and Cost Management User Guide Version 2.0", Jun. 24, 2021, XP093211311, Retrieved from Internet (URL: https://web.archive.org/web/20210624134921mp_/https://docs.aws.amazon.com/awsaccountbilling/latest/aboutv2/awsaccountbilling-aboutv2.pdf).

Malhotra et al., "How to manage cost overruns in your AWS multi-account environment—Part 1", May 6, 2021, XP093211377, Retrieved from Internet (URL: https://aws.amazon.com/blogs/mt/manage-cost-overruns-part-1/).

Malhotra et al., "How to manage cost overruns in your AWS multi-account environment—Part 2", May 6, 2021, XP093211378, Retrieved from Internet (URL: https://aws.amazon.com/blogs/mt/manage-cost-overruns-part-2/).

"Amazon Cloud Watch User Guide—first 400 pages", Jul. 6, 2021, XP093211303, Retrieved from Internet (URL: https://web.archive.org/web/20210706131513/https://docs.aws.amazon.com/AmazonCloudWatch/latest/monitoring/acw-ug.pdf).

"Amazon Cloud Watch User Guide—pp. 401-756", Jul. 6, 2021, XP093211303, Retrieved from Internet (URL: https://web.archive.org/web/20210706131513/https://docs.aws.amazon.com/AmazonCloudWatch/latest/monitoring/acw-ug.pdf).

"AWS Cost and Usage Reports", Jul. 5, 2021, XP093211316, Retrieved from Internet (URL: https://web.archive.org/web/20210705074935mp_/https://docs.aws.amazon.com/cur/latest/userguide/cur-user-guide.pdf).

* cited by examiner

── 3300

Monthly Budget & Threshold Status

| Budget Information | Budget Period | Add Funds |
|---|---|---|
| Account #*: 266978453057<br>Account Name*: test-account-3 | Start Date*: 12-15-2023   End Date*: 12-15-2023<br>[Search] | [Additional] [Override] |

Budget Summary

| Budget-Name | Budget-Type | Start Date | End Date | POP (Months) | Amount |
|---|---|---|---|---|---|
| Budget-12 | Base | 12-01-2023 | 1-31-2024 | 2 | 30 |
| Budget-12 | Override | 12-15-2023 | 12-31-2023 | 1 | 3 |
| Budget-12 | Additional | 12-15-2023 | 12-25-2023 | 1 | 6 |
| Budget-12 | Modified | 12-15-2023 | 1-15-2023 | 2 | -8 |

Monthly Budget & Threshold Details

| Budget name | Months | Fund Distribution ||||| Threshold ||| Budget Threshold Amount |||| Monthly Spending || Last Refresh Details ||
|---|---|---|---|---|---|---|---|---|---|---|---|---|---|---|---|---|---|
| | | POP Period | Initial Funds Distribution | Additional Funds | Override Amount | Total Funds | Soft Cap Triggered | Hard-Cap Triggered | Override Flag Set | Pre Rated Amount | Prorated Threshold Amount (65%) | Prorated Threshold Amount (80%) | New Threshold Amount (100%) | Actual Spending | Budget Left | Modified Budget Status | Last Refresh Date |
| Budjet-12 | DEC-2023 | 1 | 11.07 | 5.00 | 3 | 8.00 | Yes | | Yes | 19.07 | 12.40 | 15.26 | 19.07 | 13.909 | 5.16 | Success | 12-15-2023 |
| Budget-12 | DEC-2023 | 2 | 7.84 | | | | | | | | | | | | | | |

FIG. 33

Update Schedule

Schedule Name*
Varcons_Net_Hours

| Account# | Account Name |
|---|---|
| 3422467857303 | test-prod-account-2 |

Update

METHODS, SYSTEMS, APPARATUSES, AND DEVICES FOR FACILITATING MANAGING BUDGETS FOR CLOUD ACCOUNTS

REFERENCE TO RELATED APPLICATIONS

This application claims the benefit of U.S. Provisional Patent Application No. 63/553,995, titled "METHODS AND SYSTEMS FOR FACILITATING CLOUD BUDGET MANAGEMENT BASED ON ARTIFICIAL INTELLIGENCE", filed Feb. 15, 2024, which is incorporated by reference herein in its entirety. In addition, this application is a continuation in part of U.S. patent application Ser. No. 18/298,177, filed Apr. 10, 2023. The U.S. patent application Ser. No. 18/298,177 is a continuation in part of PCT/US21/48091, filed Aug. 27, 2021, which claims the benefit of U.S. Provisional Patent Application No. 63/230,416, filed Aug. 6, 2021, each of which is incorporated by reference herein in its entirety.

FIELD OF THE INVENTION

Generally, the present disclosure relates to the field of data processing. More specifically, the present disclosure relates to methods, systems, apparatuses, and devices for facilitating managing budgets for cloud accounts.

BACKGROUND OF THE INVENTION

In the dynamic landscape of the digital era, cloud computing has emerged as a game-changer in how organizations handle their operations and resources. The evolution of cloud computing has spotlighted its remarkable scalability and accessibility, features that have significantly bolstered operational capabilities across industries. However, this technological advancement has also nurtured a 'set-and-forget' mentality among organizations, leading to widespread mismanagement of cloud resources. Coupled with the illusion of inexhaustible cloud resources, this mindset frequently results in substantial operational inefficiencies. These inefficiencies lead to excessive allocation of computing power, underuse of resources, and a notable lack of oversight in tracking how resources are used. Consequently, organizations are trapped in a situation where unnoticed costs gradually increase and become significant financial burdens. Such costs, often unnoticed until they swell into significant overruns, are a key factor in what is known as billion-dollar cloud waste, quietly amplifying financial strains on organizations and eroding their fiscal health.

Cloud Service Providers (CSPs) offer easy-to-use, developer-centric tools and services, enhancing productivity and innovation. However, developers often prioritize convenience over cost, leading to the usage of more resources than necessary for projects, which can increase expenses and deepen ecosystem lock-in. This trend exacerbates the challenges, making adopting an innovative approach to cloud resource management even more crucial.

Today's landscape demands a holistic strategy beyond mere resource allocation for cloud resource management. It requires rigorous monitoring, predictive analytics for demand forecasting, and dynamic adjustment capabilities to address these challenges effectively. Additionally, this approach is particularly beneficial for projects with fixed budgets, as it aids in executing within predictable spending limits, ensuring that financial planning is realistic and adhered to.

Therefore, there is a need for improved methods, systems, apparatuses, and devices for facilitating managing budgets for cloud accounts that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating managing budgets for cloud accounts, in accordance with some embodiments. Accordingly, the method may include a step of obtaining, using a processing device, at least one real-time account information associated with at least one cloud account of at least one cloud platform. Further, the method may include a step of analyzing, using the processing device, the at least one real-time account information using at least one machine learning model. Further, the at least one machine learning model may be configured for detecting at least one of a pattern, a trend, and an anomaly corresponding to a utilization of a cloud resource by the at least one cloud account. Further, the method may include a step of determining, using the processing device, at least one value of at least one parameter associated with the utilization of the cloud resource by the at least one cloud account. Further, the method may include a step of determining, using the processing device, at least one action required to be implemented for the at least one cloud account based on the determining of the at least one value of the at least one parameter. Further, the method may include a step of generating, using the processing device, at least one cloud account controlling command for implementing the at least one action based on the determining of the at least one action. Further, the method may include a step of transmitting, using a communication device, the at least one cloud account controlling command to at least one cloud service provider device associated with at least one cloud service provider. Further, the at least one cloud service provider provides the at least one cloud account. Further, the method may include a step of storing, using a storage device, the at least one real-time account information.

Further disclosed herein is a system for facilitating managing budgets for cloud accounts, in accordance with some embodiments. Accordingly, the system may include a processing device, a communication device, and a storage device. Further, the processing device may be configured for obtaining at least one real-time account information associated with at least one cloud account of at least one cloud platform. Further, the processing device may be configured for analyzing the at least one real-time account information using at least one machine learning model. Further, the at least one machine learning model may be configured for detecting at least one of a pattern, a trend, and an anomaly corresponding to a utilization of a cloud resource by the at least one cloud account. Further, the processing device may be configured for determining at least one value of at least one parameter associated with the utilization of the cloud resource by the at least one cloud account. Further, the processing device may be configured for determining at least one action required to be implemented for the at least one cloud account based on the determining of the at least one value of the at least one parameter. Further, the processing device may be configured for generating at least one cloud account controlling command for implementing the at least one action based on the determining of the at least one action. Further, the communication device may be communicatively coupled with the processing device. Further, the communication device may be configured for transmitting the at least one cloud account controlling command to at least one cloud service provider device associated with at least one cloud service provider. Further, the at least one cloud service provider provides the at least one cloud account. Further, the storage device may be communicatively coupled with the processing device. Further, the storage device may be configured for storing the at least one real-time account information.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 33 is a screenshot of a Monthly Budget & Threshold Status interface 3300 of a software application for managing budgets for cloud accounts, in accordance with some embodiments.

FIG. 37 is a screenshot of an Update Schedule interface 3700 of a software application for facilitating managing budgets for cloud accounts, in accordance with some embodiments.

FIG. 39 is a screenshot of a Create Holiday List interface 3900 of the software application, in accordance with some embodiments.

FIG. 40 is a screenshot of an Edit Standard Schedule interface 4000 of the software application, in accordance with some embodiments.

FIG. 41 is a screenshot of an Override Schedule interface 4100 of the software application, in accordance with some embodiments.

DETAILED DESCRIPTION OF THE INVENTION

Figure 1:
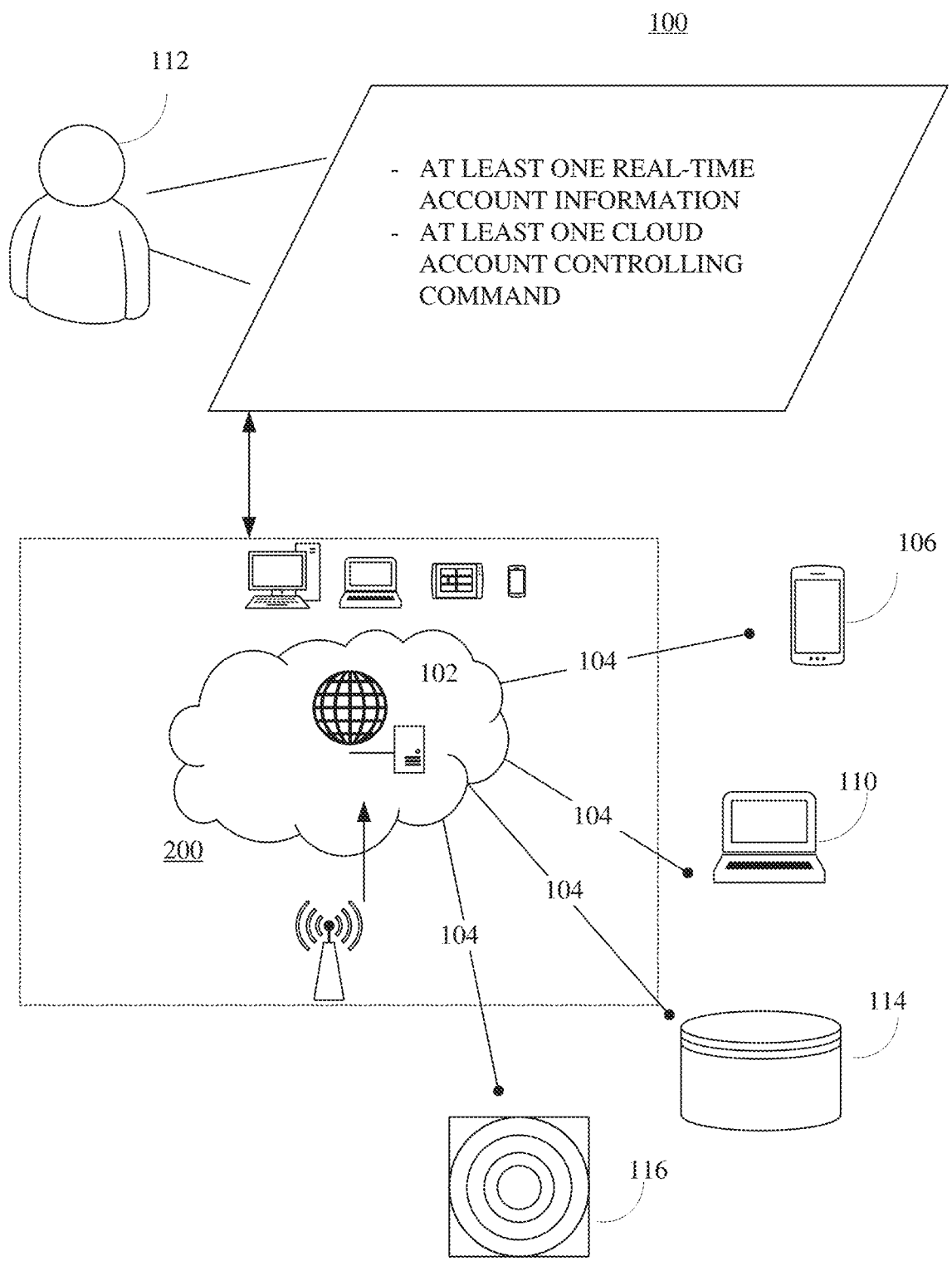
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating managing budgets for cloud accounts, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state (e.g. motion, direction of motion, orientation, speed, velocity, acceleration, trajectory, etc.) of the device corresponding to the performance of the one or more steps, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes systems, methods, apparatuses, and devices for facilitating managing budgets for cloud accounts. Further, the managing of the budgets may include controlling the budgets for the cloud accounts.

Further, the present disclosure describes a system and a method for facilitating controlling and managing cloud usage costs incurred by cloud accounts due to their utilization of various cloud resources, such as computing power, databases, storage, and other services. The disclosed system may include a centralized cloud usage-cost management system of setting up one or more cloud account budgets, multi-level Threshold, Alerting and/or controlling and monitoring the usage cost, limiting resource usage by a given threshold, and facilitating Information Technology (IT) cloud budget planning. The disclosed system may be configured to control multiple cloud account budgets across multiple cloud providers interactively over the defined period from a centralized interface. The disclosed system may be configured to set up the allocated budget for the cloud account for a given period or financial year set by the enterprise budget team. The System monitors the budget and controls the cloud usage cost to help the organization manage cloud usage costs on the allocated budget for the given period or execute fixed price cloud usage-cost projects. The System monitors monthly usage costs and sends alerts to the administrator and/or product/application owner if the usage costs exceed threshold levels on the cloud usage cost. Further, the disclosed system may be configured to control the cloud usage cost and not to initiate further cloud resources unless account usage cost is brought back to below threshold levels or overriding set thresholds by adding funds or exceptions. Further, the disclosed system may be configured to provide Artificial Intelligence (AI)/Machine Learning (ML) based budget estimation for any given period or fiscal year based on similar workloads and/or enterprise historical usage-cost data. This estimation is used for IT cloud budget planning, forecast cloud usage costs, and cloud cost and budget management across cloud accounts. Further, the disclosed system may be configured to generate various reports on the show back and/or chargeback, IT cloud budget planning, budget planner, AI-based multi-cloud cost savings recommendation, etc.

Further, the disclosed system may be associated with a centralized cloud budget planner. The disclosed system may be associated with a unified management console to plan, manage, and control cloud usage cost spending of products or cloud applications from development to Operation and Maintenance (O&M). The disclosed system is configurable to set up multi-level budget thresholds and alerts across all the cloud accounts to notify if the set budget cost reached the threshold on any given period. Suppose the set budget reached a critical threshold. In that case, the system may restrict from spinning of more cloud resources in that cloud account or subscription unless terminating the existing resources, which are already influencing usage cost to bring below the set critical threshold level for that period or overriding set thresholds by adding funds or exceptions. Cloud usage costs may surge beyond the allocated budget threshold for various reasons. Developers or application teams run multiple environments without shutting down unwanted environments or run numerous test resources or spin oversized resources, or maybe forgotten resources, etc. These unwanted resources may ramp up the usage cost, preventing recovery of the metered cost, which impacts project execution, and deliverables, and creates funding chaos.

Further, the disclosed system may be configured to allow overriding the budget amount during any given period due to changes in application design or requirements or funding or any negations to override the critical threshold point, allowing the reset to new threshold levels. If a project or product requires restructuring the whole budget based on the application design changes, the system may reconfigure the budget at any time.

Further, the disclosed system may be configured to plan, manage, and control the allocated budget for the project or product cloud accounts and maintain the applications over the multi-cloud infrastructure ecosystem. Further, the disclosed system may be configured to collect all the organization's cloud accounts from the different cloud providers' master/payer accounts, classify the organizational accounts based on the Cloud Service Providers (CSP), and associate the product or project information with the accounts, and maps the associated charge code. Through a unified console, the disclosed system may be configured to create a budget plan for an account, manage a budget plan, and create a new budget plan for the entire portfolio of cloud accounts for a given period or fiscal year. Budget and cost control systems can be implemented on any virtual machine, or server, or provided as software as a service from a remote server as a managed service. The system has a unified interface to log in and manage the entire enterprise's multi-cloud accounts, cost control, and budget planning system. The unified interface console can be accessed through an Internet web browser from a computer device, mobile phone, tablet, or any device with a compatible internet web browser.

Before access to the system, a user may log in to the system through a unified interface. As discussed before, administrative (admin) users, finance users, cloud infrastructure users, project/product/application users, or any stakeholder users can access the system. By default, one admin user exists for the initial system setup and configuration. The system allows a different type of user access to be created based on the duties as per information technology data security industry standard requirements. The system allows categorizing the users by admin, technical, and viewer, based on the access type that the individual access policies are attached to the different users. Admin users can access and set all the system-level configurations, page default, field default values, drop-down lists, data feed, cloud cross-account access, configure budget data, create users, and reset user passwords. Admin users also have all other users' permissions by default. Technical users can add, edit, update cloud accounts, set up a budget for an account, data feed, budget planner for the given period or fiscal year, report, and dashboard. The viewer user can view the shared dashboard, generate the reports, search, and view cloud-account information and budget information.

To set up a budget and/or budget planning or cost control for a cloud account, at least one cloud account, related business product/project information, and cloud vendor or provider or reseller information should exist. First, cloud service provider, vendor, or reseller information is collected before importing respective cloud accounts and enterprise product information. The system allows capturing cloud service provider, vendor, or reseller information. The required vendor information is captured and can include, but is not limited to, vendor-name, contract period, contract number, service provider, task, scope, markup, admin fees, discount, credits, and status. This vendor information is automatically mapped to the vendor's name associated with the cloud accounts. If captured vendor details from the cloud account do not have the correct information, the system enables a manual mapping of the vendor information. This manual mapping takes precedence over automapping.

Cloud account information may be captured by manually entering each account information through the cloud account information entry page or by bulk import interface. Required cloud-account information is captured and can include, but is not limited to, account number, account-name, account-status, cloud service provider, vendor/reseller name, creation date, organization group, join method, etc. For bulk account information, imports can be uploaded through Comma-Separated Values (CSV) format files. This bulk account information is retrieved and exported from resellers' master or payer accounts or can be created manually in a CSV format. If an account is already present during bulk account import, those accounts are not imported, and the system creates a rejected duplicate list for further review.

Most organizations have a broader Business Product Components classification to view the budget and IT spending by business area, components, portfolio, product, product line, cyber identification (ID), etc. The system also allows to input organization-specific bulk product information import via CSV format. The system captures enterprise-specific business product information through the product information entry page. The required product/project information is captured and can include, but is not limited to, project ID, Project, business area, business unit, portfolio, product line, product owner, master system technical lead, cost center, etc. These system field names are dynamically configurable to align with enterprise or agency-specific business field names or naming standards through admin login. Once the accounts and business product information are captured in the system, the system automatically maps the product name associated with the cloud account using the account name. For example, when the cloud account name is not aligned with the business product name or any changes in the business-naming conventions, the system allows manual mapping of the product name to account ID. Manual mapping overrides auto mapping to avoid ambiguity.

Further, the system allows input of any vendor's markups, administration fees, discounts, and credits associated and/or negotiated from the vendor, reseller, or cloud service provider. These fees, discounts, and credits are part of budget formulation on top of cloud service provider usage costs. To accurately forecast budget planning and monitoring budget burndown rate, the system allows vendor fees and discounts to be included in part of budget planning and cost control on cloud accounts. By enabling markup, discounts, and credits as part of the budget formulation, the system accurately tracks the organization's cloud IT spending.

Further, the system has the feature to normalize the billing and utilize the data to remove duplicate tags, misspelled tags, assign missing tags to categorize, resources grouping, resource automation, security management, resource triggers, alerts, group products, and map the resources to product or project the resources belong to. This feature aligns with organization resource tag classification if there are any misaligned or untagged tags resources to track accurate budget and cost tracking. Further, the disclosed system may be configured to allow adding additional tags to track by environment, vendor, external/internal, etc., to help track budget spending by the environment, vendor, external/internal, etc. Further, the disclosed system may be configured to allow to enter tag-mapping manually or bulk upload through to a tag and mapping interface.

Advanced charge code mapping allows tracking the budget and burn rate of the product or project by the project, environment, phases, and releases by weekly, monthly, yearly, and even by Agile Sprints levels. These financial reports are also to be used for the showback or chargeback. Further, the disclosed system may be configured to allow entering the organization specific charge code through the chargeback interface. The required charge code information is captured and can include, but is not limited to, project name, program name, account, start date, end date, etc.

After capturing cloud accounts, vendor information, and product information, the system is ready to create a budget for the cloud accounts and/or generate a budget plan for any given period. The system allows the creation of a budget for an account for a given period and/or create a budget plan for a given period or fiscal year. To create a budget for an account, an account from the existing account list is chosen, and budget details are entered including, but not limited to, start date, end date, allocated or computed budget amount for the period, warning threshold, and critical threshold. Once all required budget information is entered, the system may generate a monthly budget plan for the account before pushing the budget information relevant to the cloud service provider account. The budget is validated and submitted to enforce the budget governance on that cloud account. Once the budget is submitted, the system may generate a schedule via the budget scheduler module to push the budget schedule to the respective cloud account. On the cloud account side, once the cloud account receives new or changes in the budget schedule, the serverless budget governance agent may execute the budget schedule and set all required budget parameters to that cloud account. After successful budget governance is set to the account, the agent validates and sends the budget status back to the budget and cost control system to make sure the budget values set at the cloud account align with the budget values set on the system. After receiving the status, the budget scheduler validates the feedback received from the cloud account versus the budget schedule in the system. If there is any misalignment from the budget set at the cloud account, the budget scheduler engine pushes the schedule again. The schedule engine tries several times before raising the deviation or error notice at the panel or in the schedule status report. If the budget schedule engine does not receive feedback from the cloud account, the schedule engine tries multiple times before raising an alert or notice at the interface panel and marks that budget as failed to set.

Once the budget is set, the schedule engine periodically pulls the budget information from all the cloud accounts to make sure the budget information aligns with the budget set in the system. If any deviation is found, the budget scheduler pushes the schedule to that account to align with a set value. If there is any budget information access issue from the cloud account, the system sends alerts and generates an error report for validation and auditing purposes. This validation process helps to identify any changes in the cloud component, network-related issues, any deviation or manipulated budget at an account level, compromised account, or policy changes that caused budget and cost control to break. Any component or service may break due to the dynamic nature of the cloud service provider's managed resources, services, and/or any changes that occurred at the infrastructure level. Deviation from the budget set at the system compared to account-level budget due to manipulation or compromised cloud account can also be identified.

Further, the budget and cost control system allows configuring two levels of thresholds based on control preference. For example, the multi-level warning threshold can be set to send warning alerts on the budget amount spent. The critical threshold can be set to send a critical alert on the budget amount spent. An add-on feature on the critical threshold setting restricts the spin of more resources to control the cost until the usage cost consumption goes below the set critical threshold value. This feature is more beneficial for the development environment to keep cost control on the projected budget burn rate on the allocated funds. For example, if a warning threshold is set at 70% on the allocated account budget, the system sends the warning alert to the respective team when the usage hits 70%. If a critical threshold is set at 90% on the allocated account budget, a critical alert is sent when the usage hits 90%. Suppose the critical threshold along with the resource restricts feature is enabled. In that case, the system sends a critical alert and stops spinning more resources on that account to control the cost until the usage cost consumption goes below the set critical threshold value.

Further, the system allows changing the budget which has been already created or in place for any changes in the project funding, budget schedules, and architectural changes that affect the usage cost and override the critical threshold for the given period. If there are any changes in the project funding or budget, the system allows updating the new amount on the existing budget. If there is a change in the schedule and the amount, the system enables make those changes, and those updated budget schedules are pushed to the appropriate account. One of the system's main features is to enter the override amount on the critical threshold that has been triggered. For example, a critical alert is triggered when the budget burn-rate reaches 90% of the monthly set budget, the cloud account is restricted from spinning more resources. In this scenario, the system allows overriding of the budget amount by adding the budget amount for that month. This feature avoids a deadlock scenario on the cloud account to override resource spin restriction. There are several common scenarios in the development environment to spin more resources than required which are not anticipated during the project planning and design phase. Here are a few scenarios that burn up the allocated monthly budget: (1) underestimating resources or capacity needed during the design phase, (2) forgetting resources that are not noticed, which are being charged, and consume the allocated budget, (3) spinning oversized resources than required for testing purposes, and (4) creating too many test resources and/or resource stacks that are not shut down and are not required.

Further, the disclosed system may be configured to allow the creation of a budget planner for the fiscal year or any given period. This budget planner monitors budget burndown cost, sends threshold alerts, controls cloud usage cost, and also restricts the cloud account to not allow more resources to be brought up to avoid usage costs beyond the allocated budget. In the system, budget planning can be created in three methods, namely, (1) creating a budget plan for an individual account through a budget planning interface, (2) creating a new budget plan from the previously existing budget year/period plan, or (3) creating a new budget plan through a bulk upload through CSV format for the entire or part of all the cloud accounts. The second method may include creating a new budget plan from the previously existing budget year/period plan through the budget planner interface page. By entering the new start and end dates for all accounts, the system allows selectively to change dates and other values like threshold, the budget amount, and so on for individual accounts. Once the new budget plan is published, the system enables it to save and/or save and publish. The new budget is active based on the start and end dates mentioned in the plan. Further, the third method may include creating a new AI-based forecasted budget estimation plan based on historical or last year's cost consumption through the budget planner interface page. By entering the new start and end dates for all accounts, the system allows selectively change dates and other values like threshold, the budget amount, and so on for individual accounts. Once the new AI-based forecasted budget plan is updated, the system enables it to save and/or save and publish. The new budgeting is active based on the start and end dates mentioned in the plan.

Further, in an embodiment, the disclosed system may be configured to upload the bulk budget plan through CSV format for all cloud accounts or some cloud accounts. The existing budget for all cloud accounts is exported in CSV format. Then, the exported file is opened, and the new start and end dates are edited as well as the threshold percentage, the budget amount, and other values for the cloud accounts. The updated budget file is then imported into the system to publish the new budget. Further, in an embodiment, the disclosed system may be configured to create a budget plan in the CSV file for the cloud accounts that need to control budget and usage costs. To create a bulk budget plan for the cloud accounts, the cloud-account numbers and budget details are entered including, but not limited to, start date, end date, allocated budget amount for the period, warning-threshold in percentage, and critical-threshold in percentage. The newly created CSV file is the uploaded to the system and saved before publishing the Budget. Furthermore, the system generates various finance, show back/chargeback, and IT budget plan reports, which play a crucial role in IT planning, cloud IT cost distribution, cloud infrastructure cost of ownership, and auditing. The system uses a ML algorithm to generate AI-based budget estimates for the next budget based on the previous year's or period usage cost consumption.

Regarding cloud IT budget planning, analysts and managers have to reach out to various teams to pull the historical cloud usage-cost data for Total Cost of Ownership (TCO) analysis for the cloud IT planning. Capacity and forecast estimation need to be calculated for the application or project to compute accurate IT budget formulation. These calculations are often manual which can be time and resource consuming. To avoid this, the disclosed system may be configured to eliminate all these manual processes by providing AI-based budget estimate recommendations. The system also provides the provision to include markups, discounts, and credits from vendors and/or cloud resellers. This allows the system to provide the exact budget estimate recommendations required for the given period. In addition to AI-based budget estimate recommendations, the system can automatically generate cloud account budget estimation, forecasting, and planning for the next budget period or fiscal year. The engine for the AI-based budget estimate recommendations can be built using commercially available services offered by cloud service providers or third-party vendors, or through proprietary systems developed in-house. Further, AI estimation services can utilize one or models generated using different methods including, but not limited to, machine learning, deep learning, predictive analytics, natural language processing, and intelligent data discovery. The different models for cost forecasting can be tuned from historical usage-cost data captured by the system on the cloud accounts. The system computes the data generated by the AI estimation service to provide budget estimation forecast recommendations for the given period or next budget cycle. Further, the disclosed system may be configured to generate several reports using the report and analytical engine. Using an analytical engine, the user can create and interact with visuals and tell data-driven stories. Some data points represent a significant event, and others represent a random occurrence. The analysis uncovers which data is worth investigating, based on what driving factors (key drivers) contributed to the event.

Further, the system has several cloud cost control features to control the cloud usage cost within the allocated fixed budget that the users can set through a unified cost control interface. This feature enables the organization to control the cost of fixed budget projects, applications, or services within the allocated funds. This cost management feature also enables control of cloud usage costs within the allocated or available budget and shuts down the cloud resources when not necessary. This unified interface eliminates the tedious job of logging into individual accounts and manually shutdown resources across multiple clouds to stop cloud resources to save on usage-cost. Using this unified interface, users can set or change the budget, budgeting period for the project/application, dynamically change the startup, and selectively shut down any cloud resources based on the enterprise working hours, service level requirements (SLAs), or stop the resources as necessary.

Further, the main feature of the system is to remotely control usage costs by throttling endpoints on how much the enterprise wants to spend the funds or budget on a given period to provide services. This feature enables the organization to control how much customers can utilize the enterprise contents and/or services without hogging the application bandwidth or interrupting other customers who want to use the same services and not bring down the entire application. This handy feature for the organization enables control over funds and throttles the data miners on publicly disseminated information like historical labor statistics data, census data, research and national archives data, patent and trademark data, media content delivery, bulk download contents, etc.

The system also has an integrated visualization dashboard. The visualization dashboard is a graphical representation of data. A dashboard is a read-only snapshot of an analysis to share with other users for reporting purposes. A dashboard preserves the analysis configuration at the time of publishing, including filtering, parameters, controls, and sort order. The data used for the analysis is dynamic, and the visualization dashboard reflects the current data in the data sets used by the analysis. The system visualization dashboard consists of several visualization pages with associated reports. Some of the reports include but are not limited to, billing summary, tagged/untagged services usage cost, budget monitoring, AI-based anomaly detection, budget burn rate, AI-based forecast, and AI-based multi-cloud, multi-account savings plan recommendation.

The billing summary includes a summary of consolidated cloud usage-cost at an organization level which shows usage-cost by account, associated project, and product as well as any chargeback over the selected period. Tagged/untagged services usage cost shows the usage of the different environments by accounts, by services with tags, or by untagged cloud resources (system, environment, business area, etc.). Budget monitoring includes high-level view of monitoring account usage by comparing it with the monthly budget allocated per account. The visuals show the comparison between the actual usage cost of an account versus the budget amount allocated to the account monthly. AI-based anomaly detection shows the outliers, spikes, or deviations in the usage cost or budget that fall outside a distribution pattern. Anomaly detection identifies the causations and correlations to enable users to make data-driven decisions. AI-based forecast shows key business metrics which are the costs for a forward period, which can be configured as per the requirement. Analytics insight is quick data interpretation that gives a high-level takeaway from the visuals the system creates. These insights enable the user to perform any computation, using customized wordings to provide context to the fields. AI-based multi-cloud, multi-account savings plan recommendation includes the most frequently used instance utilization types across all the cloud accounts breakdown by product/portfolio. These statistics help the organization generate purchase saving plan/reserved instance recommendations for targeted compute and database services across various cloud platforms. This approach facilitates substantial savings on on-demand multi-cloud resource costs compared to the costs of reserved compute purchases. Using these explorative analytics, the user can perform deep-dive analysis by drilling down to specific cloud resources, pricing, and other specifications. This offers the ability to monitor budget control, cost savings, and optimization. This also provides the flexibility in cost comparison between multi-clouds for long term investments and savings plans. Further, the disclosed system may be integrated with an enterprise active directory to set up email notifications. The disclosed system may be configured to send email notifications and alerts to various users and teams such as sending the budget summary alerts, multi-level soft and hard cap threshold alerts, burn-rate alerts, monthly finance reports, executive reports, etc.

Further, the present disclosure describes AI-based methods and systems for cloud budget management for optimizing financial oversight across cloud platforms. Tailored for federal sectors and corporations, the disclosed system features real-time tracking, forecasting, and optimization, integrated into a simplified workflow. This system ensures strategic resource allocation and adherence to budget constraints, enabling efficient and effective cloud spending management.

Further, the present disclosure describes CloudThrottle which is the cornerstone for cloud budget management, offering a sophisticated approach to navigating the complexities of cloud spending across multiple platforms and accounts. The CloudThrottle methodology is deeply intertwined with optimizing cloud resource utilization and minimizing unnecessary expenditures, thereby addressing the dual challenges of operational efficiency and fiscal discipline.

Further, the disclosed system may be associated with CloudThrottle's two fundamental design elements: Advanced ProActive Budget Monitoring and Management—for cloud resources and Cloud Storage (Object Storage, Block Storage, File Storage, Data Archives, Snapshots, Images, Volumes, data files) and ProActive Resource Management System.

Further enhancing its value, CloudThrottle may be instrumental in dealing with the intricacies of fixed price contracts across both government and commercial sectors while simultaneously ensuring efficient management of cloud resources. By aligning with the evolving and varied cloud usage demands of these sectors, CloudThrottle may be configured for maintaining predictable cloud-related expenses. This commitment to innovation in financial management allows CloudThrottle to not only fulfill but exceed the rigorous expectations arising from stringent budget constraints and the flexible needs of government and commercial bodies. Through its comprehensive approach, CloudThrottle stands as a testament to the adaptability and efficiency required in today's fast-paced cloud computing environment.

Further, automated and AI-powered Budget Management in CloudThrottle empowers organizations with enhanced cost efficiency, enabling precise control over cloud spending. Further, the disclosed system may be configured to provide improved financial oversight and adaptability, ensuring optimal resource allocation and strategic agility in cloud resource utilization.

Further, the CloudThrottle may be configured for facilitating budget management by integrating artificial intelligence (AI) into a cloud budgeting tool associated with the disclosed system. This integration focuses on using synthetic data alongside real budget historical data for early detection of budget anomalies.

Concept Overview: In this example, Annual Budget: Set at $120,000. Monthly Cap: Limited to 80% of the standard $10,000 monthly allocation, equating to $8,000. Daily Spending Limit: Calculated at approximately $275 per day, based on dividing the $8,000 monthly cap by an average of 29 days, taking an average.

Implementing Synthetic Data Generation for AI Training:

Generating Synthetic Data: CloudThrottle generates a dataset that reflects various spending patterns, including typical daily expenses, sudden spikes, and gradual increases. This dataset is designed to simulate the range of scenarios that might occur in real project management.

Training AI with Synthetic Data: Further, AI model associated with the disclosed system is trained using this synthetic dataset, enabling it to recognize standard spending patterns (around $275/day) and identify anomalies or unexpected spikes.

Incorporating Real Project Data: By blending real project data with the synthetic dataset, CloudThrottle's AI model refines its predictive capabilities, adapting to the unique characteristics of each project's spending patterns.

Further, the disclosed system may use AI for early detection. Further, the early detection encompasses:

Monitoring Daily Spending: The AI system continuously compares actual daily spending against both synthetic data patterns and the $275/day benchmark.

Identifying Anomalies: The AI is programmed to flag significant deviations from expected spending patterns, such as sudden spikes or consistently higher daily expenditures.

Early multi-level Warning System: These alerts serve as an early warning system, notifying project managers of potential budget issues before they become critical.

Advantages of AI Integration in CloudThrottle:

Customized to Project Specifics: The AI, trained on a diverse set of synthetic data, is adept at adapting to various project spending patterns, regardless of the project's budgeting and SDLC stages.

Proactive Budget Management: This approach empowers proactive budget control, allowing for timely adjustments before reaching the monthly cap, set in this example at 80% or incurring overspending.

Data Enrichment: In cases where historical data is limited, synthetic data enriches the AI's training, enhancing its effectiveness as a budget analysis tool from the start.

By leveraging synthetic data generation to train the disclosed AI model, CloudThrottle offers a robust and effective strategy for early detection in budget management. This innovative approach allows the AI to learn from a broad spectrum of spending scenarios, applying this knowledge to monitor and analyze real project spending. Consequently, CloudThrottle enhances budget management by providing early alerts to potential issues, facilitating more informed and timely decision-making.

Further, the present disclosure describes a system, Cloud-Pause, configured for intelligent predictive cloud capacity management.

Further, the CloudThrottle may be configured for revolutionizing cloud cost management with advanced scheduling features. In the ever-evolving landscape of cloud computing, effective cost management remains a paramount concern for businesses worldwide. CloudThrottle emerges as a trailblazing solution, offering a comprehensive suite of features designed to optimize cloud resource usage and significantly reduce costs.

Tackling the Billion-Dollar Cloud Waste Challenge: CloudThrottle addresses a critical issue plaguing many organizations—the wastage of resources and funds due to idle cloud assets. A significant portion of the cloud budget drain can be attributed to development, testing, and internal-facing applications that are operational 24/7, despite not being required outside the development team's working hours.

CloudThrottle's initiative to combat the billion-dollar cloud waste challenge is not just a fiscal endeavor but also an environmentally conscious effort. CloudThrottle reduces the significant energy consumption and greenhouse gas emissions associated with these facilities. The solution lies not only in shifting towards renewable energy sources but also in innovating cooling methods, server usage, and data center design to enhance efficiency. Additionally, responsible e-waste management, prolonging hardware lifespan, and tackling the environmental costs of construction and chip scarcity are key aspects of this approach.

Further, CloudThrottle's initiative extends beyond fiscal responsibility, contributing to an environmentally conscious effort. By optimizing cloud resource usage, the disclosed system may lower energy consumption and greenhouse gas emissions, aligning with sustainable practices in Federal projects and beyond. Further, the present disclosure describes innovative cooling methods, efficient server usage, and responsible e-waste management, addressing the broader environmental impact of cloud computing. This commitment positions CloudThrottle as a leader in sustainable cloud management, balancing cost-effectiveness with environmental stewardship in Federal and large-scale projects.

Further, the present disclosure describes the Cloud-Throttle which is a paradigm shift in the domain of data processing, specifically tailored to the intricacies of cloud computing. CloudThrottle is an AI-powered platform designed to furnish a unified console for the orchestration and optimization of cloud budgets across diverse cloud platforms and multiple accounts. This innovation addresses the complex demands for stringent budget adherence, enhanced operational efficiency, and strategic financial planning within a singular, integrated framework, catering to the nuanced requirements of both federal sectors and corporations.

Further, the innovations and systems associated with the CloudThrottle are as follows:

ProActive Budget Alert System (ProBAS): A system configured within CloudThrottle for revolutionizing cloud financial management through the utilization of artificial intelligence to analyze spending patterns. This includes the acquisition and processing of both synthetic and real historical data to preemptively detect budget anomalies. The system is further configured for automated budget proration, rollover, and modifications, thereby ensuring precise and adaptable financial planning.

ProActive Resource Management System (ProRMS): A system integrated into CloudThrottle, leveraging AI-driven scheduling to optimize cloud resource utilization. The system is configured to identify peak and non-peak hours, adjusting resource availability accordingly. This minimizes unnecessary cloud costs and ensures efficient resource allocation based on actual operational needs.

CloudPause—Intelligent Predictive Cloud Capacity Management: An integral feature of CloudThrottle, this advanced scheduling functionality is designed to address the billion-dollar cloud waste challenge. By automating the enablement and disabling of cloud resources based on operational needs, CloudPause significantly reduces costs and contributes to environmental sustainability by lowering energy consumption and greenhouse gas emissions.

Advanced Budget Workflow System: At the core of CloudThrottle, this system is designed to streamline the management of cloud expenditures with advanced tools for real-time budget tracking, forecasting, and adjustments. Enhanced by artificial intelligence, it facilitates seamless coordination across budget planning, execution, and monitoring phases.

Holistic View and Control: CloudThrottle provides comprehensive control over cloud financial resources, simplifying the complexity inherent in cloud budget management. This system strengthens fiscal discipline and strategic resource allocation, ensuring cloud spending aligns strictly with organizational objectives and constraints.

AI-Powered Efficiency: The integration of AI within CloudThrottle ensures the accuracy of financial tracking and forecasting while adapting to unique spending patterns across various projects and platforms. This configuration enables more informed decision-making and strategic financial planning.

Sustainability and Efficiency: Beyond operational and financial efficiencies, CloudThrottle contributes to sustainable cloud management practices. It is configured to optimize resource usage, thereby reducing energy consumption and carbon footprint, and aligning financial management with environmental stewardship. It requires rigorous monitoring, predictive analytics for demand forecasting, and dynamic adjustment capabilities to address these challenges effectively. Additionally, this approach is particularly beneficial for projects with fixed budgets, as it aids in executing within predictable spending limits, ensuring that financial planning is realistic and adhered to. This ensures Cloud Cost or Cloud budget observability is at the forefront of Cloud-Throttle's design, enabling a proactive stance toward cloud budget management and operational efficiency.

Further, these embodiments illustrate CloudThrottle's commitment to providing an encompassing solution for cloud budget and resource management, with a focus on innovation, efficiency, and sustainability in the cloud computing domain.

Further, the present disclosure describes cost management comprising budget monitoring and management in cloud computing. In the dynamic world of cloud computing, effective management of cloud budgets is essential for any organization, and CloudThrottle emerges as a key solution. The primary challenges include managing untracked cloud expenses, controlling unexpected cost overruns, and optimizing resource allocation. Without diligent monitoring, these issues can lead to significant imbalances in cloud spending. Unchecked cloud expenses can accumulate unnoticed, while unforeseen overruns, though sometimes necessary, can disrupt the budget if left unmonitored. Similarly, inefficient allocation of cloud resources can lead to wasteful spending. Further, the CloudThrottle addresses these challenges head-on. Its advanced monitoring capabilities allow organizations to keep a precise track of cloud expenditures, manage costs effectively, and ensure optimal resource utilization. This tool is instrumental in maintaining financial discipline and supporting strategic objectives in cloud investments. Regular insights provided by CloudThrottle into spending patterns and financial trends enable businesses to proactively identify and address potential budgetary and resource allocation issues, ensuring the efficiency of cloud-based operations. In industries with strict financial management requirements, CloudThrottle proves to be even more valuable. Overall, CloudThrottle is indispensable for controlling cloud costs, enhancing operational efficiency, and ensuring the financial well-being of an organization in the ever-evolving cloud computing landscape. Further, CloudThrottle is a cutting-edge, cloud-agnostic platform specifically crafted to monitor and control cloud account budgets. Its primary objective is to provide organizations with deep insights into their cloud spending, enabling effective financial management in the cloud environment.

Further, the cost management in cloud computing may be associated with an initial setup process which includes API or any other mechanism integration. Further, the initial setup process may be associated with the following features:

Comprehensive connectivity: CloudThrottle is expertly integrated with the APIs of various cloud service providers. This integration is crucial for accessing up-to-date data on cloud account spending and budgetary allocations, ensuring accurate and real-time financial monitoring.

Security and compliance: The platform maintains a secure connection with cloud providers' APIs or any other mechanism, prioritizing data security and compliance with privacy standards. This secure integration allows for the reliable and safe transfer of financial data for monitoring and analysis.

Multi-cloud compatibility—diverse cloud service support: Recognizing the varied cloud environments in organizations, CloudThrottle is designed to be compatible with multiple cloud providers. It efficiently retrieves financial data from services such as AWS, Azure, Google Cloud Platform, etc., ensuring a comprehensive view of cloud spending across different platforms.

Unified financial management: This multi-cloud compatibility positions CloudThrottle as a versatile and essential tool for businesses that utilize a range of cloud services, providing a unified and coherent view of overall cloud account budgets.

Data retrieval configuration—Financial data collection: CloudThrottle is configured to routinely gather crucial data related to cloud account spending and budget allocations. This persistent collection is vital for ongoing budget control and strategic financial planning.

In-depth financial analysis: The platform adeptly processes detailed financial information, offering in-depth insights into spending patterns, and enabling organizations to manage their cloud budgets with greater precision and foresight.

Further, the cost management in cloud computing may be associated with data collection and aggregation. Further, the features of the data collection and aggregating are as follows:

Extensive financial data gathering: CloudThrottle collects detailed financial data across various cloud platforms. This aggregation is crucial for a complete overview of cloud account spending, including different types of expenses and usage patterns.

Integrated financial overview: The platform provides an integrated view of an organization's cloud spending, essential for effective budget management and strategic financial planning.

Further, the cost management in cloud computing may be associated with AI-supported analysis. Further, the features of the AI-supported analysis are as follows:

Machine learning for enhanced insights: While CloudThrottle utilizes machine learning algorithms, the focus remains on providing actionable insights into spending patterns and budget allocations, assisting in identifying significant financial trends and anomalies.

Predictive insights for future planning: The platform occasionally employs predictive analytics to anticipate future budget needs, aiding in proactive financial planning and efficient budget allocation.

Further, the cost management in cloud computing may be associated with establishing baseline metrics. Further, the features of the establishing baseline metrics are as follows:

Financial baseline establishment: CloudThrottle sets baseline metrics for cloud accounts, reflecting typical expenditure and budgeting patterns. These baselines serve as benchmarks for ongoing financial monitoring.

Responsive baseline updates: The baselines are updated in response to new financial data, ensuring they accurately represent current spending behaviors and budgetary conditions.

Further, the present disclosure describes cloud storage budget monitoring and management. In the dynamic realm of cloud computing, efficient and effective storage management is a critical aspect of any organization's IT strategy. The significance of storage monitoring and budget control is amplified by several common issues, such as orphaned volumes, excessive snapshots, and duplicate data, which, if not properly monitored, can cause storage costs to spiral out of control. Orphaned volumes, which are storage spaces detached from any active instance but still accruing charges, can silently inflate expenses. Similarly, the accumulation of multiple snapshots for backup and recovery purposes, while essential for data protection, can lead to redundant data storage and increased costs if not regularly reviewed and pruned. Duplicate data, often overlooked, can occupy valuable storage space unnecessarily, further straining the budget.

Effective storage monitoring and budget control are crucial for managing these issues. By implementing robust monitoring tools and practices, organizations can identify and eliminate orphaned volumes, manage snapshot lifecycles effectively, and detect duplicate data to optimize storage usage. This proactive approach is vital for maintaining data availability and ensuring business continuity. Regular tracking of storage usage and trends enables organizations to preemptively tackle potential issues such as capacity shortages and performance bottlenecks, ensuring the integrity and accessibility of critical business data. Additionally, in the context of regulatory compliance, where many industries have strict data storage, retention, and protection guidelines, effective storage management becomes even more crucial. In summary, diligent monitoring and management of storage resources are indispensable for controlling costs, enhancing performance, and securing data in the increasingly data-driven business landscape.

Further, the present disclosure describes a process flow for cloud storage budget monitoring and control. Further, the cloud storage budget monitoring is performed using CloudThrottle. Further, the CloudThrottle is a sophisticated, cloud-agnostic platform designed to monitor storage size and manage budgets across various cloud platforms. It offers businesses a comprehensive view of their cloud storage utilization across different providers. This capability enables informed decision-making, optimizing costs, and ensuring operational efficiency and data integrity. CloudThrottle's adaptability makes it ideal for businesses using diverse cloud services, including Amazon Web Services (AWS), Microsoft Azure, Google Cloud Platform (GCP), and other cloud service providers. Further, the CloudThrottle for cloud storage budget monitoring and control is meticulously integrated with the APIs or any other similar mechanism of multiple cloud services, essential for accessing real-time storage usage and billing data. Its setup process encompasses:

Cloud service providers' integration: CloudThrottle securely connects with cloud service providers' APIs or any other similar mechanism. It authenticates seamlessly, aligning with the security and privacy standards of various cloud providers, and fetches real-time data essential for accurate monitoring and analysis.

Multi-cloud compatibility: It is compatible with multiple cloud providers, ensuring efficient data retrieval from services like AWS S3, Azure Blob Storage, and others.

Data retrieval configuration: CloudThrottle is configured to regularly fetch key data about storage usage and costs. It adeptly handles the retrieval of detailed billing information for proactive budget management.

Read access setup: CloudThrottle maintains read-only access to storage services, ensuring data integrity and security. It can access necessary billing data without affecting other cloud service operations.

Further, features associated with a storage service inventory associated with the CloudThrottle are as follows:

Service cataloging: CloudThrottle automatically catalogs all storage services utilized in the connected cloud accounts, providing a comprehensive overview of storage assets.

Resource tagging: It effectively implements and utilizes resource tagging, categorizing storage resources by department, project, or other relevant factors for better management and reporting.

User Interface (UI) and dashboard: CloudThrottle features an intuitive UI, presenting essential storage metrics and financial data in a user-friendly format. Interactive dashboards are integrated into CloudThrottle, offering real-time visualization of storage usage and budget allocations.

Initial data analysis and baseline establishment: CloudThrottle conducts an initial assessment of storage and billing data to establish a baseline for ongoing monitoring. It identifies immediate opportunities for optimization and cost savings from the initial data analysis.

Further, the process flow for cloud storage budget monitoring and control may include data collection and aggregation. Further, the CloudThrottle initially gathers comprehensive storage and billing data across all connected cloud platforms. It aggregates this data, ensuring a holistic view that encompasses various storage types, usage patterns, and cost structures. Further, the data collection and aggregation may encompass:

AI-driven analysis: CloudThrottle employs advanced machine learning algorithms to analyze the aggregated data. These algorithms are designed to identify patterns, trends, and anomalies in storage usage and costs. The CloudThrottle uses predictive analytics to forecast future storage needs and potential cost implications. This helps in proactive capacity planning and budgeting.

Establishing baseline metrics: Based on the AI analysis, CloudThrottle establishes baseline metrics for each storage service. These baselines represent typical usage patterns and cost structures for an organization. The baseline acts as a reference point for ongoing monitoring and is dynamically updated as the AI system learns from new data.

Optimization opportunities comprise cost-saving insights and performance improvement recommendations.

Cost-saving insights: By analyzing historical data, CloudThrottle's AI identifies inefficiencies such as underutilized resources, overprovisioning, or expensive storage options that could be replaced with more cost-effective alternatives.

Performance improvement recommendations: The tool suggests optimization strategies, such as data tiering, compression, or archiving, to improve performance and reduce costs.

Automated reporting: CloudThrottle generates automated reports highlighting key findings from the AI analysis, including potential cost savings and areas needing attention. These reports are tailored to different stakeholders, providing actionable insights for IT managers, financial controllers, and executive leadership.

Continuous learning and adjustment: The AI component in CloudThrottle continuously learns from new data, refining its predictions and recommendations over time. The baseline metrics and optimization strategies are regularly updated to reflect the evolving storage landscape and organizational needs.

Integration with decision-making processes: CloudThrottle's AI-driven insights are integrated into the organization's decision-making processes, enabling data-backed strategies for cloud storage management. This integration helps in aligning storage practices with business objectives and budget constraints.

Further, the process flow may include real-time monitoring. Further, the real-time monitoring may encompass:

Dynamic data tracking: CloudThrottle is equipped with capabilities to monitor storage usage in real-time. It continuously tracks data across all connected cloud services, offering immediate visibility into storage dynamics.

Responsive dashboard: The real-time data is displayed on a user-friendly dashboard, providing an at-a-glance view of current storage states, facilitating quick decision-making and response.

Further, the process flow may include key metrics tracking. Further, the key metrics tracking may encompass:

Comprehensive metrics coverage: CloudThrottle meticulously tracks a range of key metrics, including storage capacity usage, read/write operations, and data transfer rates.

Custom metric selection: Users have the flexibility to choose and prioritize specific metrics they wish to track, aligning the monitoring process with their unique operational needs.

Further, the process flow may be associated with advanced budget management strategies. Further, the advanced budget management strategies may encompass:

Base Budget: Foundation of Financial Planning: CloudThrottle establishes a 'Base Budget' for each project on a cloud account, serving as the initial financial plan or allocation. This base budget is the benchmark against which all changes or modifications are measured.

Reference Point for Evaluation: It sets the framework for financial planning and decision-making, providing a key reference for evaluating performance and determining the need for adjustments or additional funding.

Budget Prorate: Accurate Tracking and Reporting: CloudThrottle automatically prorates budgets at the beginning of budget creation and at the end of every month. This proration ensures accurate tracking and reporting of the budgetary performance of cloud account/project spending.

Automated Budget Prorate: This feature involves proportionally allocating a budget based on a specific time period, adjusting the total budget amount to match the duration of the given period. It allows for precise monitoring of budgetary performance within specific timeframes.

Budget Rollover: Utilization of Unused Budgets: CloudThrottle implements an automated budget rollover system, where any unused or unspent portion of a budget from a cloud account is carried forward from one period to the next.

Preserving Financial Resources: Instead of resetting the budget to zero at the end of a specific time period, the remaining funds are conserved and made available for use in subsequent periods, ensuring that the unutilized cloud budget is not wasted but effectively allocated.

Further, the process flow may include alerts and notifications. Further, the alerts and notifications may encompass threshold-based alerts ranging from early warning signals to critical management alerts. Further, the threshold-based alerts may include multi-level soft trigger alerts and hard trigger alerts. CloudThrottle's preliminary warning alert or soft trigger alert activates when storage usage reaches an initial percentage of the expected monthly growth rate, serving as an early warning system and prompting review and potential adjustment of resource management strategies. As thresholds approach critical levels i.e. the hard trigger alert, set at critical thresholds such as 80% of the allocated growth rate for a project or cloud account, either enacts policy changes to restrict further storage additions, maintaining budget control, or a critical management alert notifies senior management and other key stakeholders, thus maintaining budget control and ensuring strict compliance with financial policies Further, the process flow may include budget overrides and additional funds. Further, the budget override and additional funds may encompass:

Budget override flag: Allows surpassing predefined hard caps on cloud accounts. Activation of this flag enables access to the full 100% allocation of monthly funds in the face of unexpected costs.

Budget Override Amount: Represents the additional funds granted to a project or cloud account for a particular month, over and above predefined budgetary limits.

Additional Funds and Budget Modification include allocation of extra financial resources and adapting to changing needs.

Allocation of Extra Financial Resources: Additional funds refer to extra financial resources allocated to augment the existing budget temporarily.

Adapting to Changing Needs: Budget modification in CloudThrottle caters to changes in project requirements, unforeseen circumstances, or shifts in priorities.

Further, the process flow may include implementing monitoring comprising real-time monitoring and key metrics tracking. Further, the real-time monitoring and key metrics tracking may include dynamic data analysis. CloudThrottle provides real-time monitoring and key metrics tracking, focusing on storage capacity, read/write operations, and data transfer rates for dynamic data analysis.

Further, the process flow may include historical data analysis comprising data storage and trend analysis. Further, the data storage and trend analysis may encompass long-term data management. Further, the long-term data management may include storing and analyzing historical data for trend analysis and forecasting, supporting strategic planning, and budgeting for cloud resources.

Further, the process flow may include optimization and reporting with AI integration comprising optimization strategies. Further, the optimization and reporting with AI integration may encompass:

Resource Optimization: CloudThrottle, with AI enabled, efficiently analyzes cloud storage or cloud resource utilization to identify underutilized resources. It provides practical recommendations for resizing or decommissioning these resources, aiding in optimal resource allocation without over-reliance on AI. The tool's AI component is calibrated to offer insights without overwhelming users, ensuring straightforward and actionable advice.

Cost Optimization: Utilizing AI to analyze usage patterns, CloudThrottle intelligently suggests transitioning data to more cost-effective storage solutions. This might include recommending lower-cost storage tiers for less accessed data or employing data optimization strategies. These AI-driven suggestions are designed to be intuitive and easily interpretable, enhancing the tool's usability while optimizing costs.

Further, the process flow may include budget management. Further, the budget management may encompass:

Budget Setting and Tracking: CloudThrottle enables users to set storage budgets and employs AI to provide a real-time overview of spending. The AI system assists in identifying trends and anomalies in expenditure against the budget, offering a nuanced financial perspective. The AI component enriches the budget tracking feature by adding an extra layer of predictive analytics without overwhelming the core functionality.

Forecasting Tools: The forecasting tools in CloudThrottle leverage AI to predict future costs based on historical trends and current data. This predictive capability is carefully balanced to provide accurate forecasts while ensuring ease of interpretation and decision-making.

Further, the process flow may include reporting. Further, the reporting may encompass:

Automated Reports: CloudThrottle generates automated reports, enhanced by AI, to provide insights into storage usage, budget performance, and optimization opportunities. The AI component enriches these reports with predictive analytics and trend analysis. These reports, while AI-enhanced, are presented in a user-friendly format, ensuring accessibility and understandability.

Custom Report Generation: Users can create custom reports with AI assistance to analyze specific aspects such as time period, project, or department. The AI helps in sorting and analyzing large datasets to deliver tailored reports.

Further, the present disclosure describes CloudPause for smart cloud capacity management. Further, the CloudPause includes CloudThrottle for revolutionizing cloud cost management with advanced scheduling features. In the ever-evolving landscape of cloud computing, effective cost management remains a paramount concern for businesses worldwide. CloudThrottle emerges as a trailblazing solution, offering a comprehensive suite of features designed to optimize cloud resource usage and significantly reduce costs. Here's an in-depth look at the innovative functionalities that make CloudThrottle an indispensable tool for modern enterprises.

Further, the present disclosure describes methods and systems for facilitating cloud budget management based on artificial intelligence. Further, the disclosed methods and systems relate generally to the field of data processing. More specifically, the disclosed methods and systems anchor themselves in the arena of cloud computing, spotlighting an avant-garde, comprehensive methodology for cloud budget management, in CloudThrottle. Further, the disclosed methods and systems introduce an artificial intelligence-powered unified console adept at orchestrating and optimizing cloud budgets across a variety of cloud platforms and numerous accounts. Specifically designed to meet the nuanced requirements of both federal sectors and corporations, CloudThrottle stands out for its ability to facilitate stringent budget adherence, enhance operational efficiency, and enable strategic financial planning, all within a singular, cohesive framework. Importantly, it is suited for all sizes of businesses and startups, aiming to achieve control over cloud costs and ensuring that organizations, regardless of their scale, can benefit from optimized cloud financial management. Cloud Cost or Cloud budget observability is at the forefront of CloudThrottle's design, enabling a proactive stance toward cloud budget management and operational efficiency.

Central to CloudThrottle is an advanced budget workflow system, ingeniously integrated to streamline the management of cloud expenditures. This system empowers users with sophisticated tools for real-time budget tracking, forecasting, and adjustments, leveraging AI to ensure accuracy and efficiency. The workflow enables seamless coordination between budget planning, execution, and monitoring phases, ensuring that cloud spending aligns with organizational objectives and constraints. By providing a holistic view and control over cloud financial resources, CloudThrottle not only simplifies the complexity of cloud budget management but also fortifies fiscal discipline and strategic resource allocation across federal and corporate cloud environments.

CloudThrottle is engineered to meet the specific needs of cloud budget management as required by the federal sector and corporations. It provides a unified console for managing cloud budgets across multiple clouds and accounts, simplifying the complexities of cloud budget management. This system offers a holistic view and control over cloud financial resources and strengthens fiscal discipline and strategic resource allocation across federal and corporate cloud environments. CloudThrottle represents a comprehensive solution designed to enable organizations to fully leverage cloud computing's potential by tackling hidden costs directly and enhancing operational efficiency. It ensures that expenditures are strategically aligned with organizational goals, navigating away from the pitfalls of unmanaged cloud spending and meeting the intricate requirements of managing cloud budgets on a unified platform across diverse cloud landscapes. This strategic alignment is crucial for the successful execution of fixed-price projects within predictable spending parameters, offering a clear pathway to achieving project objectives without the risk of budget overruns.

FIG. 1 is an illustration of an online platform 100 consistent with various embodiments of the present disclosure. By way of non-limiting example, the online platform 100 to facilitate managing budgets for cloud accounts may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
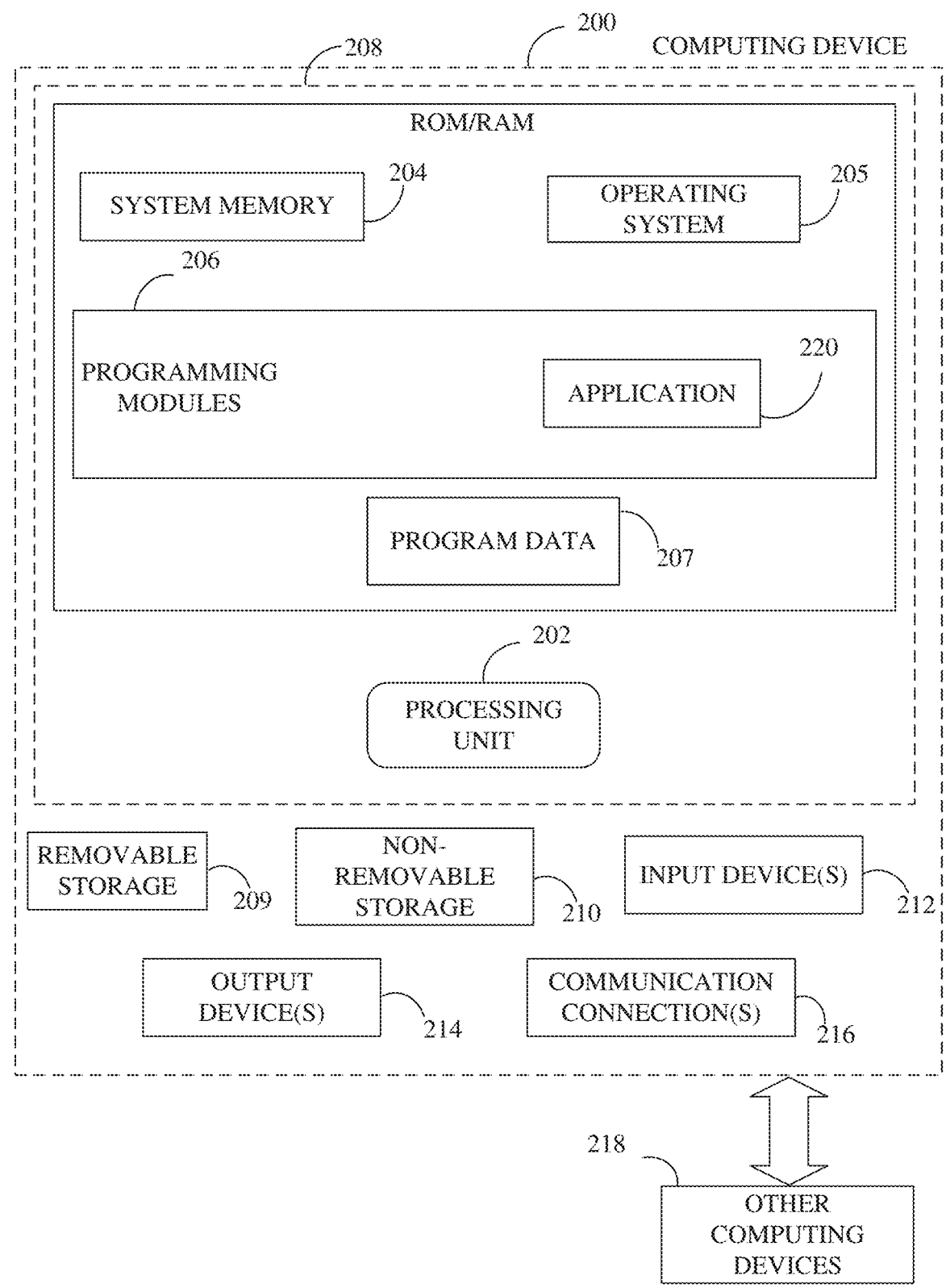
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include machine learning modules. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
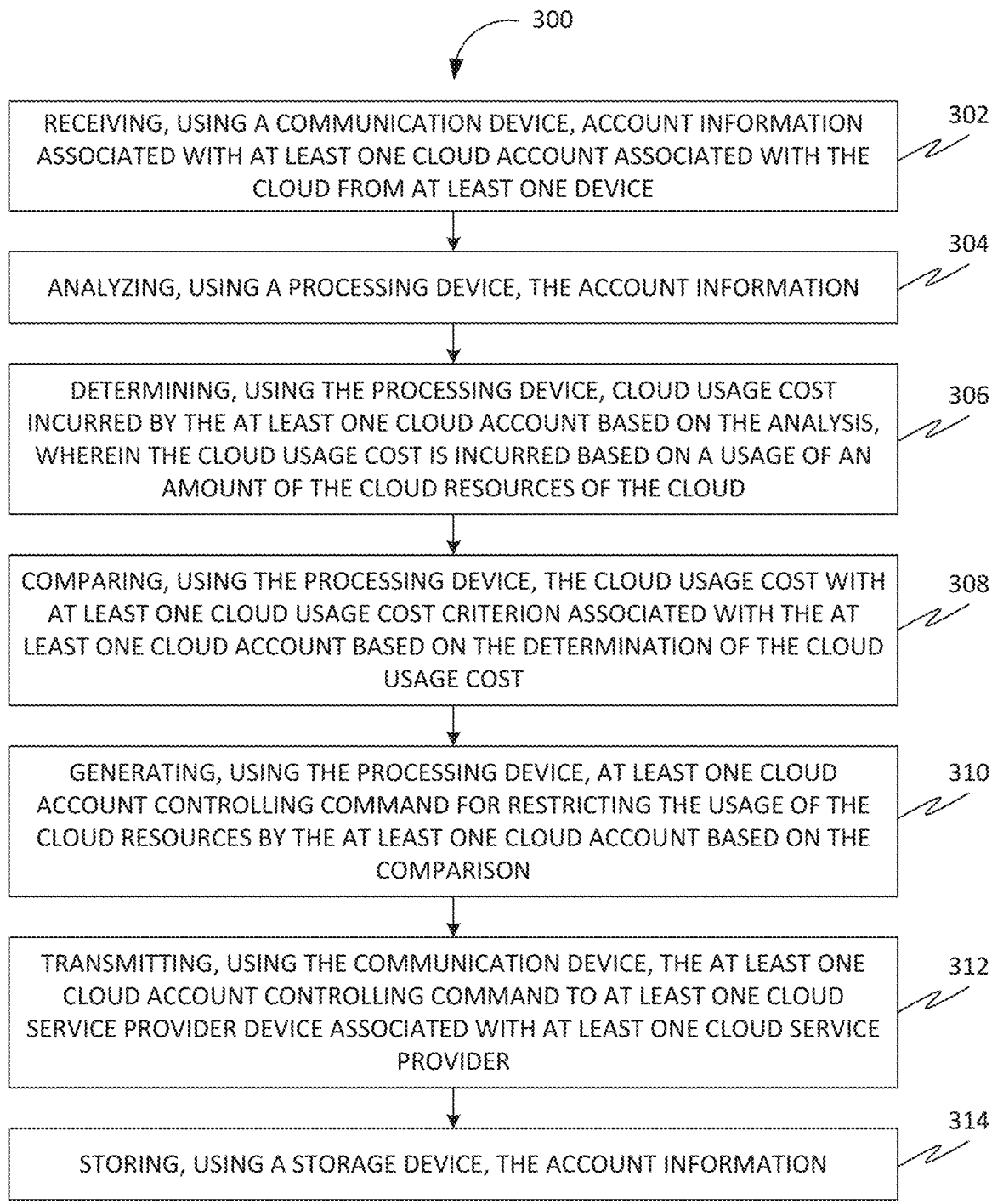
FIG. 3 is a flow chart of a method 300 for facilitating controlling and managing cloud usage costs incurred by cloud accounts for using cloud resources of a cloud server, in accordance with some embodiments.

FIG. 3 is a flow chart of a method 300 for facilitating controlling and managing cloud usage costs incurred by cloud accounts for using cloud resources of a cloud, in accordance with some embodiments. The method 300 may include a step 302 of receiving, using a communication device (such as a communication device 1002), real-time account information associated with one or more cloud accounts associated with the cloud from one or more devices. Further, the account information may include cloud resources usage information associated with a usage of the cloud resources by the one or more cloud accounts. The method 300 may include a step 304 of analyzing, using a processing device (such as a processing device 1004), the account information. Further, the method 300 may include a step 306 of determining, using the processing device, cloud usage cost incurred by the one or more cloud accounts based on the calculation. Further, the cloud usage cost is incurred based on the usage of the cloud resources of the cloud.

Further, the method 300 may include a step 308 of comparing, using the processing device, the cloud usage cost with cloud usage cost criterion associated with the one or more cloud accounts based on the calculation of the cloud usage cost. The method 300 may include a step 310 of generating, using the processing device, one or more cloud account controlling commands for restricting the usage of the cloud resources by the one or more cloud accounts based on the comparison. Further, the method 300 may include a step 312 of transmitting, using the communication device, the one or more cloud account controlling commands to one or more cloud service provider devices associated with the cloud service provider. Further, the one or more service provider devices restrict the usage of the cloud resources by the one or more cloud accounts based on the at least one cloud account controlling commands. Further, the method 300 may include a step 314 of storing, using a storage device (such as a storage device 1006), the account information.

In some embodiments, the restricting may include stopping or limiting the one or more cloud accounts from using additional amounts of the cloud resources during a second time period. The restricting may include initiating additional amounts of the cloud resources for the one or more cloud accounts during the second time period. The restricting may include terminating or limiting portions of the additional amounts of the cloud resource used by the one or more cloud accounts during the second time period. Further, the one or more cloud usage cost criterions may include one or more cloud usage cost endpoints. Further, the method 300 may include receiving, using the communication device, the one or more cloud usage cost endpoints associated with the one or more cloud accounts from one or more external devices. Further, the comparison of the cloud usage cost with the one or more cloud usage cost criterions may include comparing the cloud usage cost with the one or more cloud usage cost endpoints. Further, the generating of the one or more cloud account controlling commands for the restricting of the usage of the cloud resources by the one or more cloud accounts is based on the comparing of the cloud usage cost with the one or more cloud usage cost endpoints.

Figure 4:
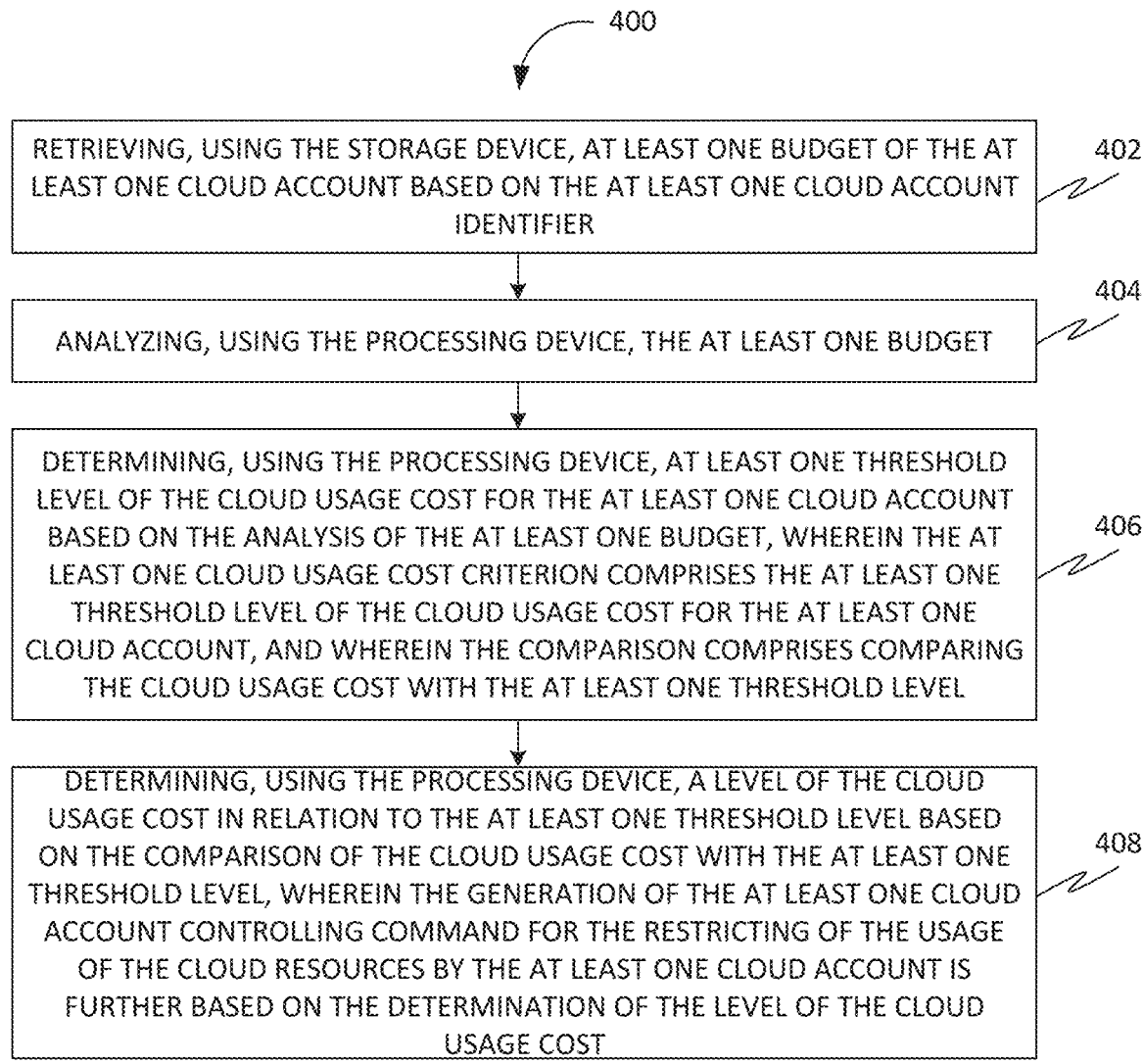
FIG. 4 is a flow chart of a method 400 for facilitating controlling and managing cloud usage costs incurred by cloud accounts for using cloud resources of a cloud server in which the method 400 may include determining a level of the cloud usage cost in relation to one or more threshold levels, in accordance with some embodiments.

FIG. 4 is a flow chart of a method 400 for facilitating controlling and managing cloud usage costs incurred by cloud accounts for using cloud resources of a cloud. The method 400 may include determining a level of the cloud usage cost in relation to one or more threshold levels, in accordance with some embodiments. Further, the account information may include one or more cloud account identifiers of the one or more cloud accounts. Further, at 402, the method 400 may include retrieving, using the storage device, one or more budgets of the one or more cloud accounts based on the one or more cloud account identifiers. Further, at 404, the method 400 may include analyzing, using the processing device, the one or more budgets. Further, at 406, the method 400 may include determining, using the processing device, one or more threshold levels of the cloud usage cost for the one or more cloud accounts based on the analysis of the one or more budgets. The one or more cloud usage cost criterions may include the one or more threshold levels of the cloud usage cost for the one or more cloud accounts. Further, the comparison may include comparing the cloud usage cost with the one or more threshold levels. Further, at 408, the method 400 may include determining, using the processing device, a level of the cloud usage cost in relation to the one or more threshold levels based on the comparison of the cloud usage cost with the one or more threshold levels. Further, the generating of the one or more cloud account controlling commands for the restricting of the usage of the cloud resources by the one or more cloud accounts is based on the determining of the level of the cloud usage cost.

Figure 5:
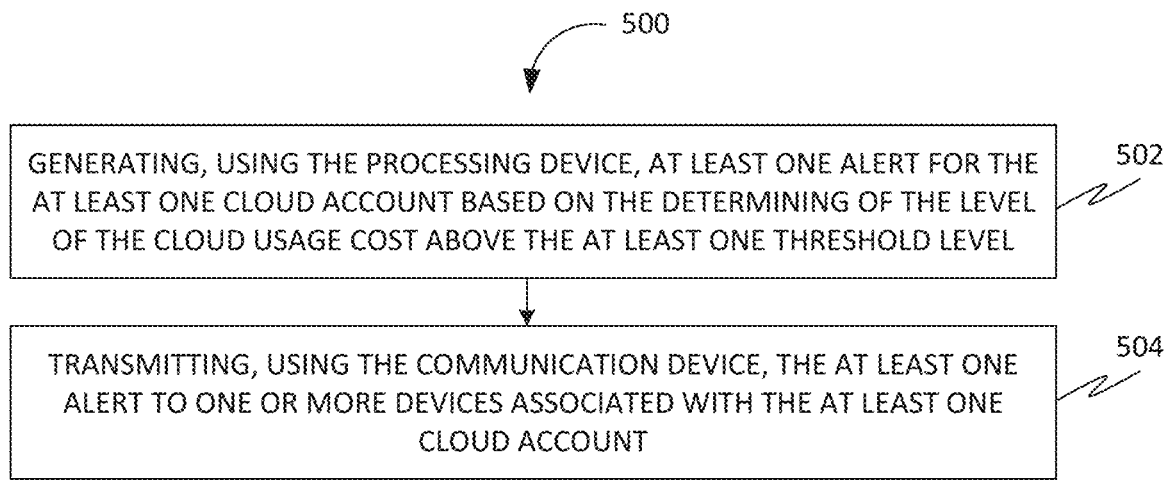
FIG. 5 is a flow chart of the method 500 for facilitating controlling and managing cloud usage costs incurred by cloud accounts for using cloud resources of a cloud server in which the method 500 may include transmitting the one or more alerts to one or more devices associated with the one or more cloud accounts, in accordance with some embodiments.

FIG. 5 is a flow chart of a method 500 for facilitating controlling and managing cloud usage costs incurred by cloud accounts for using cloud resources of a cloud. The method 500 may include transmitting the one or more alerts to one or more devices associated with the one or more cloud accounts, in accordance with some embodiments. Further, at 502, the method 500 may include generating, using the processing device, one or more alerts for the one or more cloud accounts based on the determination of the level of the cloud usage cost above the one or more threshold levels. Further, at 504, the method 500 may include transmitting, using the communication device, the one or more alerts to one or more devices associated with the one or more cloud accounts.

In some embodiments, the one or more threshold levels may include two or more threshold levels. Further, the determination of the level of the cloud usage cost above the one or more threshold levels may include determining the level of the cloud usage cost above a threshold level of the two or more threshold levels. Further, the generating of the one or more alerts may include generating an alert from two or more alerts for the one or more cloud accounts based on the determination of the level of the cloud usage cost above the threshold level of the two or more threshold levels.

Figure 6:
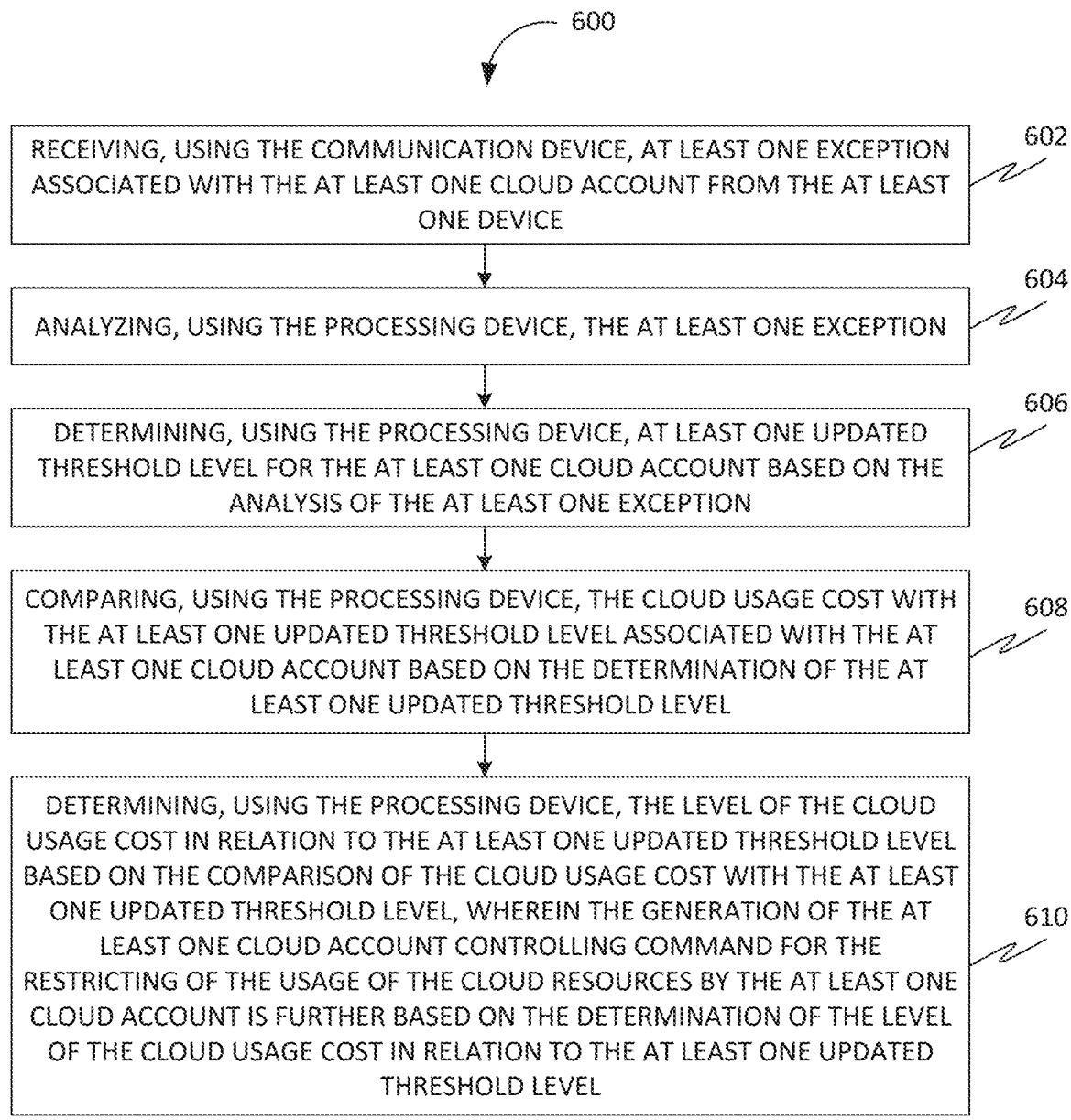
FIG. 6 is a flow chart of a method 600 for facilitating controlling and managing cloud usage costs incurred by cloud accounts for using cloud resources of a cloud server in which the method 600 may include determining the level of the cloud usage cost, in accordance with some embodiments.

FIG. 6 is a flow chart of a method 600 for facilitating controlling and managing cloud usage costs incurred by cloud accounts for using cloud resources of a cloud. The method 600 may include determining the level of the cloud usage cost, in accordance with some embodiments. Further, the method 600 may include a step 602 of receiving, using the communication device, one or more exceptions associated with the one or more cloud accounts from the one or more devices. The method 600 may include a step 604 of analyzing, using the processing device, the one or more exceptions. Further, the method 600 may include a step 606 of determining, using the processing device, one or more updated threshold levels for the one or more cloud accounts based on the analysis of the one or more exceptions. Further, the method 600 may include a step 608 of comparing, using the processing device, the cloud usage cost with the one or more updated threshold levels associated with the one or more cloud accounts based on the determination of the one or more updated threshold levels. Further, the method 600 may include a step 610 of determining, using the processing device, the level of the cloud usage cost in relation to the one or more updated threshold levels based on the comparison of the cloud usage cost with the one or more updated threshold levels. Further, the generating of the one or more cloud account controlling commands for the restricting of the usage of the cloud resources by the one or more cloud accounts is further based on the determination of the level of the cloud usage cost in relation to the one or more updated threshold levels.

Figure 7:
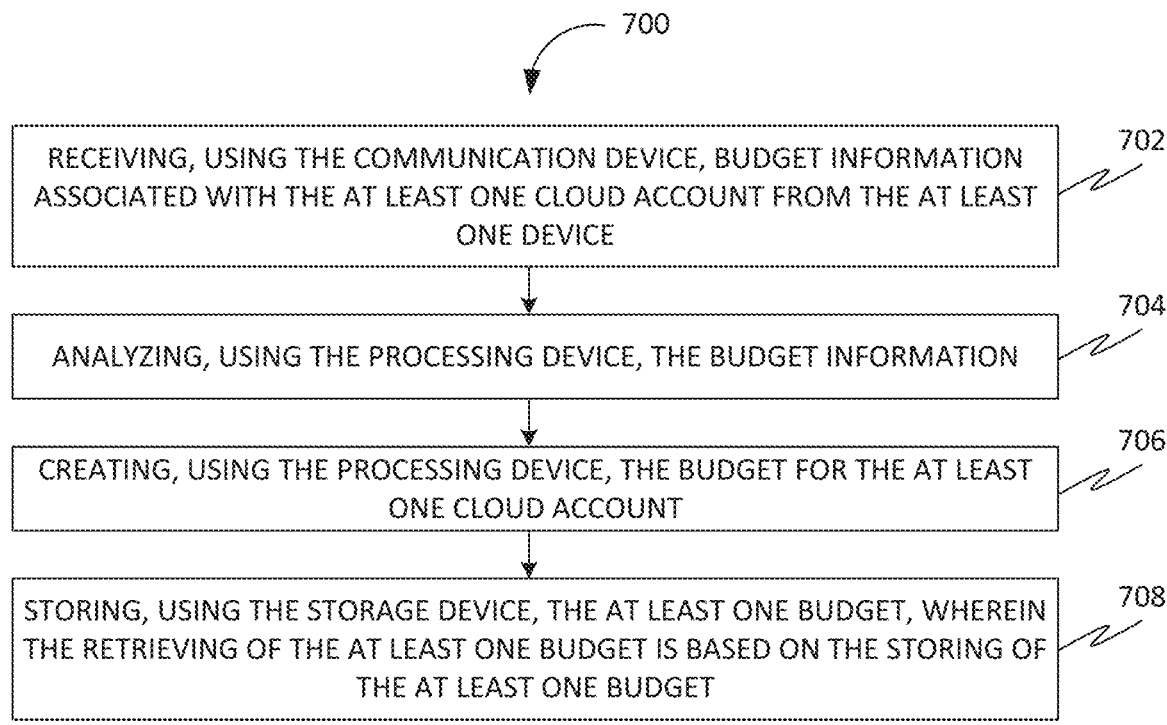
FIG. 7 is a flow chart of a method 700 for facilitating controlling and managing cloud usage costs incurred by cloud accounts for using cloud resources of a cloud server in which the method 700 may include creating the budget for the one or more cloud accounts, in accordance with some embodiments.

FIG. 7 is a flow chart of a method 700 for facilitating controlling and managing cloud usage costs incurred by cloud accounts for using cloud resources of a cloud. The method 700 may include creating the one or more budgets for the one or more cloud accounts, in accordance with some embodiments. Further, the method 700 may include a step 702 of receiving, using the communication device, budget information associated with the one or more cloud accounts from the one or more devices. The method 700 may include a step 704 of analyzing, using the processing device, the budget information. Further, the method 700 may include a step 706 of creating, using the processing device, the one or more budgets for the one or more cloud accounts. The method 700 may include a step 708 of storing, using the storage device, the one or more budgets. Further, the retrieving of the one or more budgets is based on the storing of the one or more budgets. Further, in some embodiments, the receiving of the budget information may include receiving the budget information from one or more budget planning interfaces of the one or more devices.

Further, in some embodiments, the one or more budget information may include one or more historical budgets of the one or more cloud accounts. Further, the analysis of the budget information may include analyzing the one or more historical budgets. Further, the creation of the one or more budgets is based on the analysis of the one or more historical budgets. Further, in some embodiments, the budget information may include historical cloud usage cost incurred by the one or more cloud accounts. Further, the analysis of the budget information may include analyzing the historical cloud usage cost using one or more ML algorithms. Further, the creation of the one or more budgets is based on the analyzing of the historical cloud usage cost.

Figure 8:
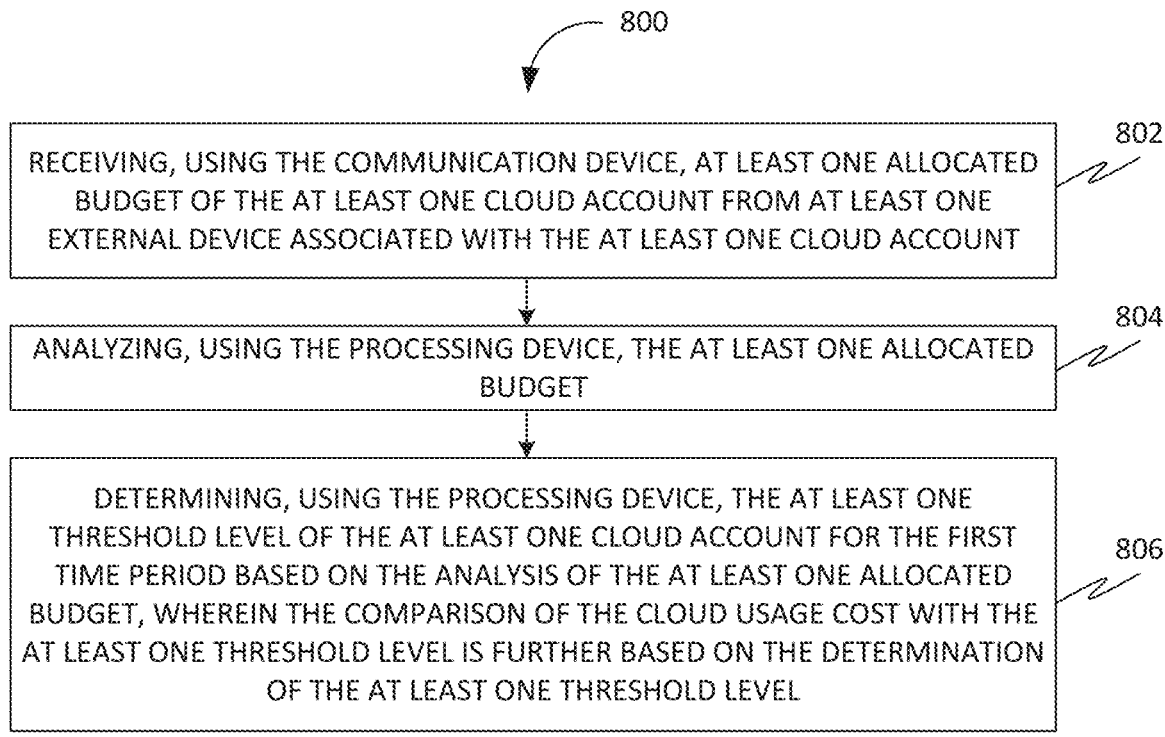
FIG. 8 is a flow chart of a method 800 for facilitating controlling and managing cloud usage costs incurred by cloud accounts for using cloud resources of a cloud server in which the method 800 may include determining the one or more threshold levels of the one or more cloud accounts, in accordance with some embodiments.

FIG. 8 is a flow chart of a method 800 for facilitating controlling and managing cloud usage costs incurred by cloud accounts for using cloud resources of a cloud. The method 800 may include determining the one or more threshold levels of the one or more cloud accounts, in accordance with some embodiments. Further, the method 800 may include a step 802 of receiving, using the communication device, one or more allocated budgets of the one or more cloud accounts from one or more external device associated with the one or more cloud accounts. The method 800 may include a step 804 of analyzing, using the processing device, the one or more allocated budgets. Further, the method 800 may include a step 806 of determining, using the processing device, the one or more threshold levels of the one or more cloud accounts for the first time period based on the analyzing of the one or more allocated budgets. Further, the comparing of the cloud usage cost with the one or more threshold levels may be based on the determination of the one or more threshold levels.

Figure 9:
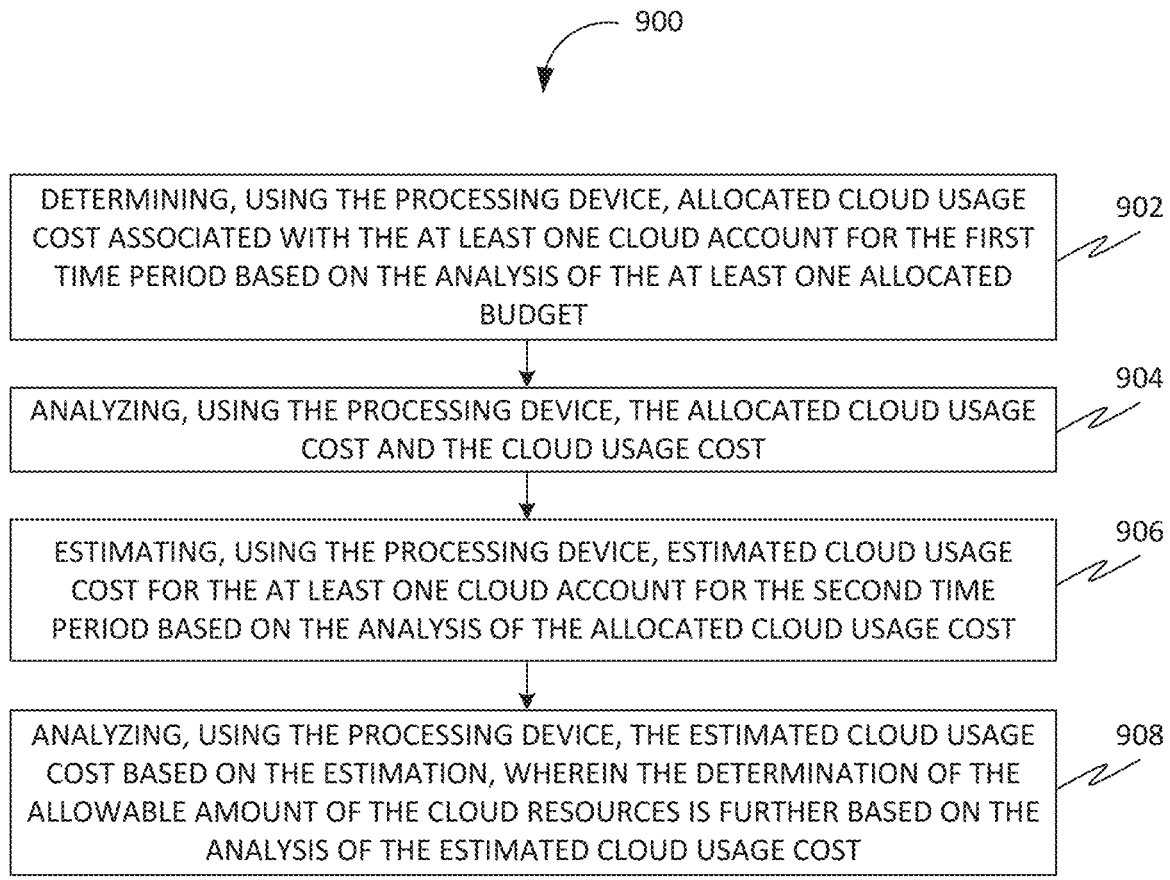
FIG. 9 is a flow chart of a method 900 for facilitating controlling and managing cloud usage costs incurred by cloud accounts for using cloud resources of a cloud server in which the method 900 may include analyzing the estimated cloud usage cost, in accordance with some embodiments.

FIG. 9 is a flow chart of a method 900 for facilitating controlling and managing cloud usage costs incurred by cloud accounts for using cloud resources of a cloud in which the method 900 may include analyzing the one or more estimated cloud usage cost, in accordance with some embodiments. Further, the method 900 may include a step 902 of determining, using the processing device, one or more allocated cloud usage cost associated with the one or more cloud account for the one or more first time period based on the analyzing of the one or more allocated budget. Further, the method 900 may include a step 904 of analyzing, using the processing device, the allocated cloud usage cost and the cloud usage cost. The method 900 may include a step 906 of estimating, using the processing device, estimated cloud usage cost for the one or more cloud accounts for a second time period based on the analysis of the allocated cloud usage cost. Further, the method 900 may include a step 908 of analyzing, using the processing device, the estimated cloud usage cost based on the estimation. Further, the determination of the allowable amount of the cloud resources may be based on the analysis of the estimated cloud usage cost.

Figure 10:
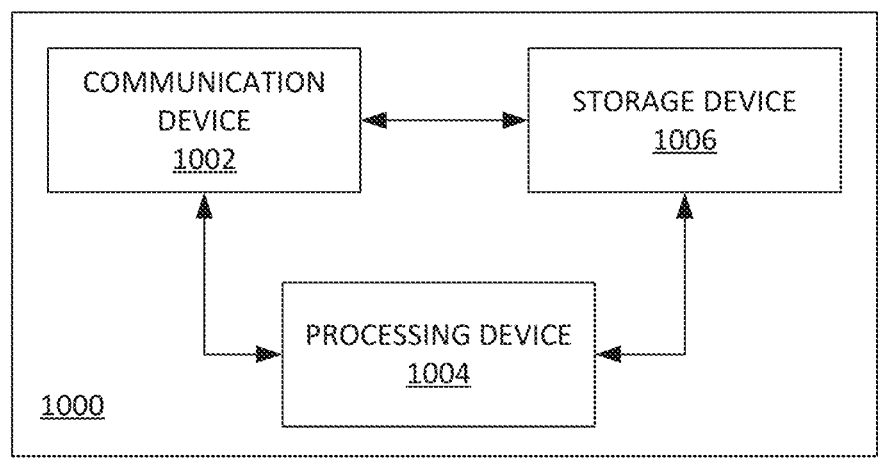
FIG. 10 is a block diagram of a system 1000 for facilitating controlling and managing cloud usage costs incurred by cloud accounts for using cloud resources of a cloud server, in accordance with some embodiments.

FIG. 10 is a block diagram of a system 1000 for facilitating controlling and managing cloud usage costs incurred by cloud accounts for using cloud resources of a cloud, in accordance with some embodiments. The system 1000 may include a communication device 1002, a processing device 1004, and a storage device 1006. The communication device 1002 may be configured for performing a step of receiving real-time account information associated with one or more cloud accounts associated with the cloud from one or more devices. Further, the account information may include cloud resources usage information associated with a usage of the cloud resources by the one or more cloud accounts. The communication device 1002 may be configured for performing a step of transmitting one or more cloud account controlling commands to one or more cloud service provider devices associated with one or more cloud service providers. Further, the one or more service provider devices restrict the usage of the cloud resources by the one or more cloud accounts based on the one or more cloud account controlling commands.

The processing device 1004 may be communicatively coupled with the communication device 1002. Further, the processing device 1004 may be configured for performing a step of analyzing the account information. The processing device 1004 may be configured for performing a step of determining cloud usage cost incurred by the one or more cloud accounts based on the analysis. Further, the cloud usage cost may be incurred based on the usage of one or more amounts of the cloud resources of the cloud. The processing device 1004 may be configured for performing a step of comparing the cloud usage cost with one or more cloud usage cost criterions associated with the one or more cloud accounts based on the determining of the cloud usage cost. Further, the processing device 1004 may be configured for performing a step of generating the one or more cloud account controlling commands for restricting the usage of the cloud resources by the one or more cloud accounts based on the comparison.

The storage device 1006 may be communicatively coupled with the processing device 1004. Further, the storage device 1006 may be configured for performing a step of storing the account information. The account information may include one or more cloud account identifiers of the one or more cloud accounts. Further, the storage device 1006 may be configured for retrieving one or more budgets of the one or more cloud accounts based on the one or more cloud account identifiers. Further, the processing device 1004 may be configured for analyzing the one or more budgets. The processing device 1004 may be configured for determining one or more threshold levels of the cloud usage cost for the one or more cloud accounts based on the analysis of the one or more budgets. Further, the one or more cloud usage cost criterions may include the one or more threshold levels of the cloud usage cost for the one or more cloud accounts. Further, the comparison may include comparing the cloud usage cost with the one or more threshold levels. Further, the processing device 1004 may be configured for determining a level of the cloud usage cost in relation to the one or more threshold levels based on the comparison of the cloud usage cost with the one or more threshold levels. Further, the generation of the one or more cloud account controlling commands for the restricting of the usage of the cloud resources by the one or more cloud accounts may be based on the determination of the level of the cloud usage cost.

Further, in some embodiments, the communication device 1002 may be configured for receiving budget information associated with the one or more cloud accounts from the one or more devices. The processing device 1004 may be configured analyzing the budget information. Further, the processing device 1004 may be configured for creating the one or more budgets for the one or more cloud accounts. The storage device 1006 may be configured for storing the one or more budgets. Further, the retrieving of the one or more budgets may be based on the storing of the one or more budgets. Further, in an embodiment, the receiving of the budget information may include receiving the budget information from one or more budget planning interfaces of the one or more devices.

Further, in an embodiment, the budget information may include one or more historical budgets of the one or more cloud accounts. The analysis of the budget information may include analyzing the one or more historical budgets. Further, the creation of the one or more budgets may be based on the analysis of the one or more historical budgets. In an embodiment, the budget information may include historical cloud usage cost incurred by the one or more cloud accounts. Further, the analysis of the budget information may include analyzing the historical cloud usage cost using one or more ML algorithms. Further, the creation of the one or more budgets may be based on the analysis of the historical cloud usage cost.

Further, in some embodiments, the one or more cloud usage cost criterions may include one or more cloud usage cost endpoints. The communication device 1002 may be configured for receiving the one or more cloud usage cost endpoints associated with the one or more cloud accounts from one or more external devices. Further, the comparison of the cloud usage cost with the one or more cloud usage cost criterions may include comparing the cloud usage cost with the one or more cloud usage cost endpoints. Further, the generation of the one or more cloud account controlling commands for the restricting of the usage of the cloud resources by the one or more cloud accounts may be further based on the comparison of the cloud usage cost with the one or more cloud usage cost endpoints. In some embodiments, the restriction may include stopping the one or more cloud accounts from using additional amounts of the cloud resources during the second time period. In some embodiments, the restriction may include initiating additional amounts of the cloud resource for the one or more cloud accounts during the second time period. In some embodiments, the restriction may include terminating or limiting one or more portions of the amounts of the cloud resource used by the one or more cloud accounts during the second time period.

In some embodiments, the processing device 1004 may be configured for performing a step of generating one or more alerts for the one or more cloud accounts based on the determination of the level of the cloud usage cost above the one or more threshold levels. Further, the communication device 1002 may be configured for performing a step of transmitting the one or more alerts to one or more devices associated with the one or more cloud accounts. In some embodiments, the one or more threshold levels may include two or more threshold levels. Further, the determining of the level of the cloud usage cost above the one or more threshold levels may include determining the level of the cloud usage cost above a threshold level of the two or more threshold levels. Further, the generation of the one or more alerts may include generating an alert from two or more alerts for the one or more cloud accounts based on the determination of the level of the cloud usage cost above the threshold level of the two or more threshold levels.

In some embodiments, the communication device 1002 may be configured for performing a step of receiving one or more exceptions associated with the one or more cloud accounts from the one or more devices. The processing device 1004 may be configured for performing a step of analyzing the one or more exceptions. Further, the processing device 1004 may be configured for performing a step of determining one or more updated threshold levels for the one or more cloud accounts based on the analysis of the one or more exceptions. The processing device 1004 may be configured for performing a step of comparing the cloud usage cost with the one or more updated threshold levels associated with the one or more cloud accounts based on the determination of the one or more updated threshold levels. Further, the processing device 1004 may be configured for performing a step of determining the level of the cloud usage cost in relation to the one or more updated threshold levels based on the comparison of the cloud usage cost with the one or more updated threshold levels. Further, the generating of the one or more cloud account controlling commands for the restricting of the usage of the cloud resources by the one or more cloud accounts may be further based on the determining of the level of the cloud usage cost in relation to the one or more updated threshold levels.

In some embodiments, the communication device 1002 may be configured for performing a step of receiving historical cloud usage data associated with the one or more cloud accounts from one or more external devices associated with the one or more cloud accounts. Further, the processing device 1004 may be configured for performing a step of analyzing the historical cloud usage data using one or more ML algorithms. The processing device 1004 may be configured for performing a step of estimating one or more budgets of the one or more cloud accounts for the first time period based on the analysis of the historical cloud usage data. Further, the processing device 1004 may be configured for performing a step of determining the one or more threshold levels of the one or more cloud accounts for the first time period based on the one or more budgets. Further, the comparison of the cloud usage cost with the one or more threshold levels may be based on the determination of the one or more threshold levels.

In some embodiments, the communication device 1002 may be configured for performing a step of receiving one or more allocated budgets of the one or more cloud accounts from one or more external devices associated with the one or more cloud accounts. Further, the processing device 1004 may be configured for performing a step of analyzing the one or more allocated budgets. Further, the processing device 1004 may be configured for performing a step of determining the one or more threshold levels of the one or more cloud accounts for the first time period based on the analysis of the one or more allocated budgets. Further, the comparing of the cloud usage cost with the one or more threshold levels may be based on the determining of the one or more threshold levels.

In some embodiments, the processing device 1004 may be configured for performing a step of determining allocated cloud usage cost associated with the one or more cloud accounts for the first time period based on the analysis of the allocated budget. Further, the processing device 1004 may be configured for performing a step of analyzing the allocated cloud usage cost and the cloud usage cost. Further, the processing device 1004 may be configured for performing a step of estimating estimated cloud usage cost for the one or more cloud accounts for the second time period based on the analysis of the allocated cloud usage cost. Further, the processing device 1004 may be configured for performing a step of analyzing the estimated cloud usage cost based on the estimation. Further, the determination of the allowable amount of the cloud resources may be based on the analyzing of the estimated cloud usage cost.

Figure 11:
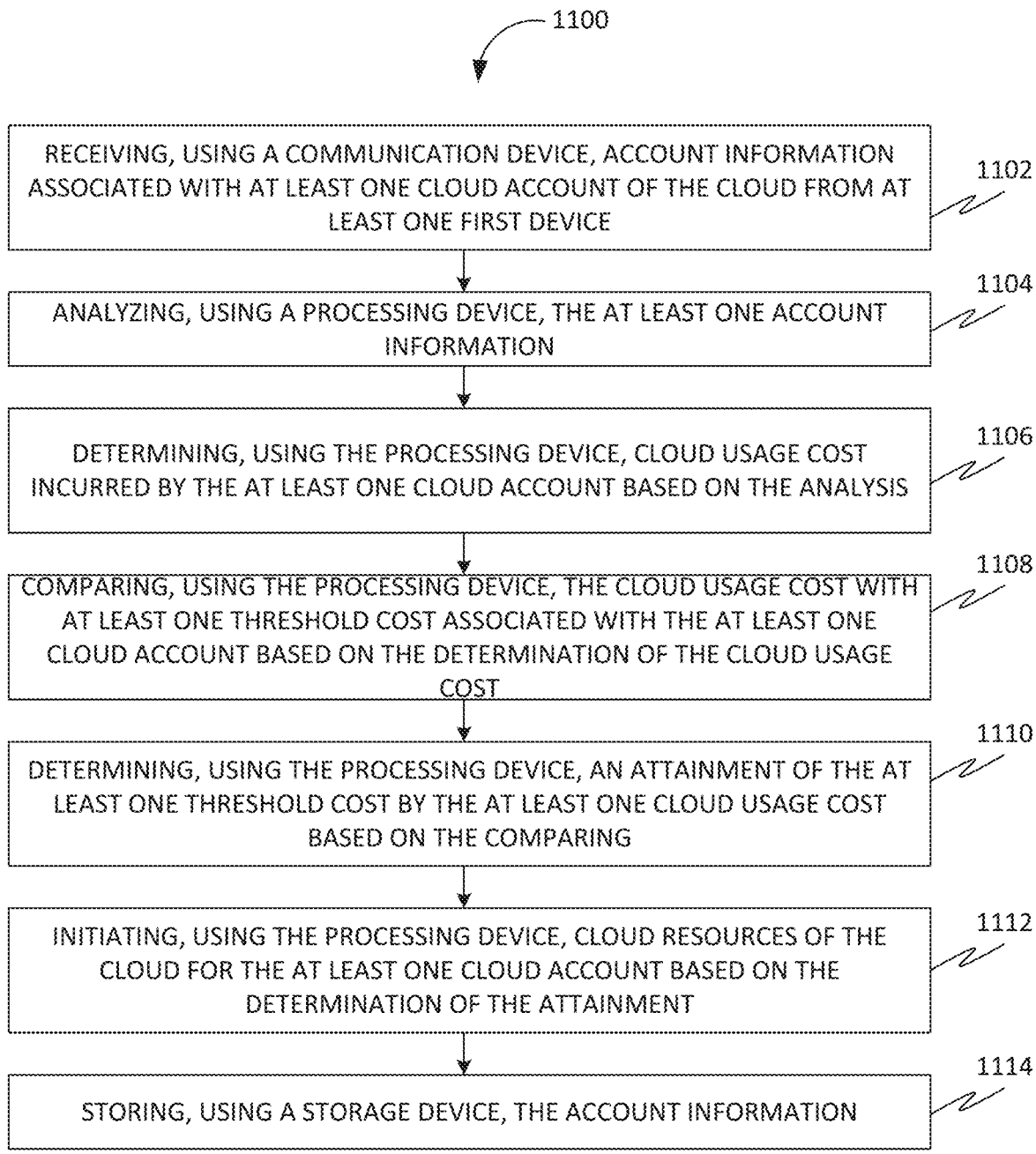
FIG. 11 is a flowchart of a method 1100 for facilitating, controlling, and managing cloud usage costs incurred by cloud accounts of a cloud server, in accordance with some embodiments.

FIG. 11 is a flowchart of a method 1100 for facilitating controlling and managing cloud usage costs incurred by cloud accounts of a cloud, in accordance with some embodiments. Accordingly, the method 1100 may include a step 1102 of receiving, using a communication device, account information associated with at least one cloud account of the cloud from at least one first device. Further, the method 1100 may include a step 1104 of analyzing, using a processing device, the account information. The method 1100 may include a step 1106 of determining, using the processing device, the cloud usage cost incurred by the cloud account based on the analysis. Further, the method 1100 may include a step 1108 of comparing, using the processing device, the cloud usage cost with at least one threshold cost associated with the cloud account based on the determination of the cloud usage cost. The method 1100 may include a step 1110 of determining, using the processing device, an attainment of the at least one threshold cost by the cloud usage cost based on the comparison. Further, the method 1100 may include a step 1112 of initiating, using the processing device, cloud resources of the cloud for the cloud account based on the determination of the attainment. The cloud resources may not be initiated for the cloud account if the cloud usage cost attains the at least one threshold cost. Further, the cloud resources may be initiated for the cloud account if the cloud usage cost does not attain the at least one threshold cost. The method 1100 may include a step 1114 of storing, using a storage device, the account information.

Figure 12:
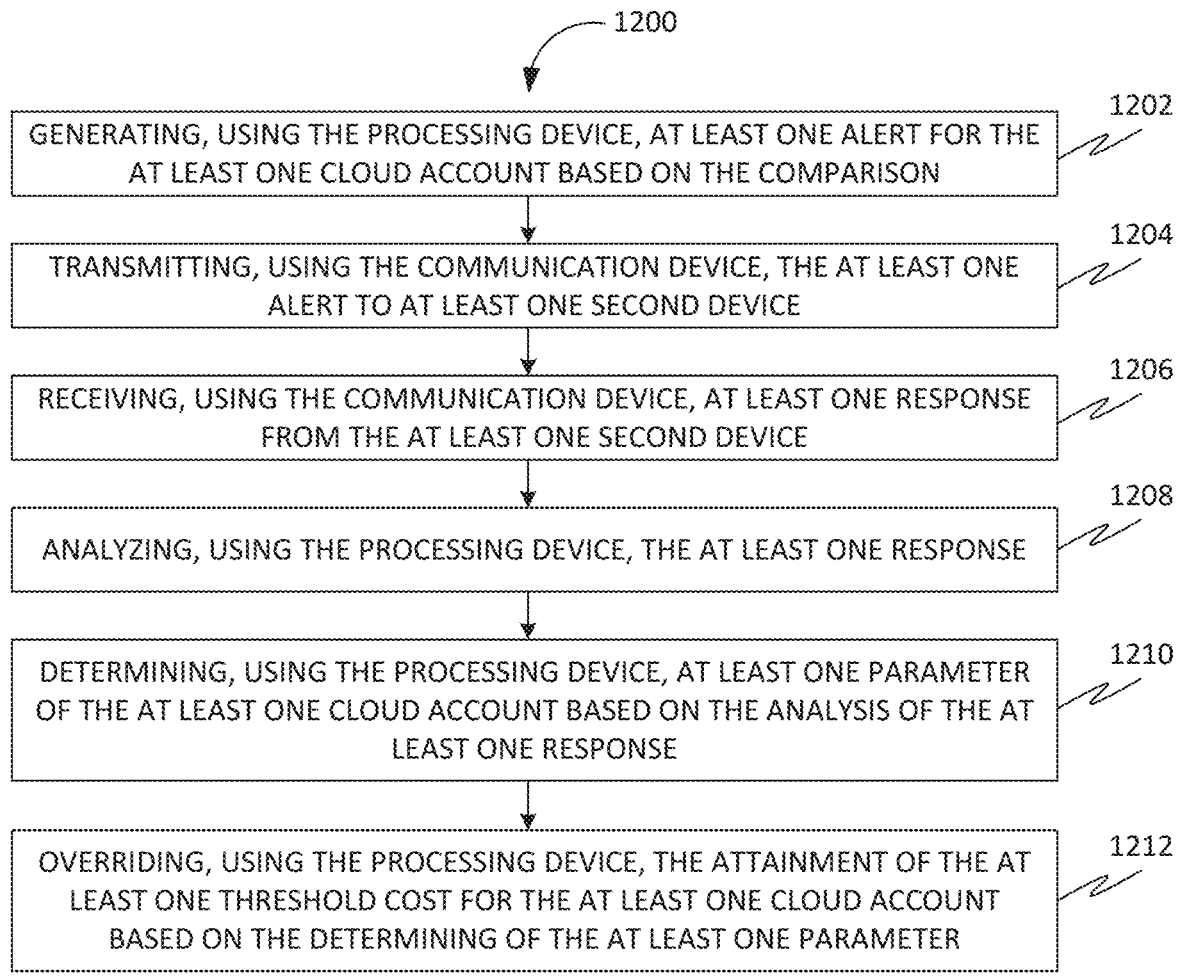
FIG. 12 is a flowchart of a method 1200 for facilitating overriding the attainment of the threshold cost by the at least one cloud usage cost, in accordance with some embodiments.

FIG. 12 is a flowchart of a method 1200 for facilitating overriding the attainment of the at least one threshold cost by the cloud usage cost, in accordance with some embodiments. Accordingly, the method 1200 may include a step 1202 of generating, using the processing device, at least one alert for the one cloud account based on the comparison. Further, the method 1200 may include a step 1204 of transmitting, using the communication device, the at least one alert to at least one second device. The method 1200 may include a step 1206 of receiving, using the communication device, at least one response from the at least one second device. Further, the method 1200 may include a step 1208 of analyzing, using the processing device, the at least one response. The method 1200 may include a step 1210 of determining, using the processing device, at least one parameter of the cloud account based on the analysis of the at least one response. Further, the method 1200 may include a step 1212 of overriding, using the processing device, the attainment of the at least one threshold cost for the cloud account based on the determination of the at least one parameter. Further, the initiating of the cloud resources for the cloud account may be based on the overriding.

Figure 13:
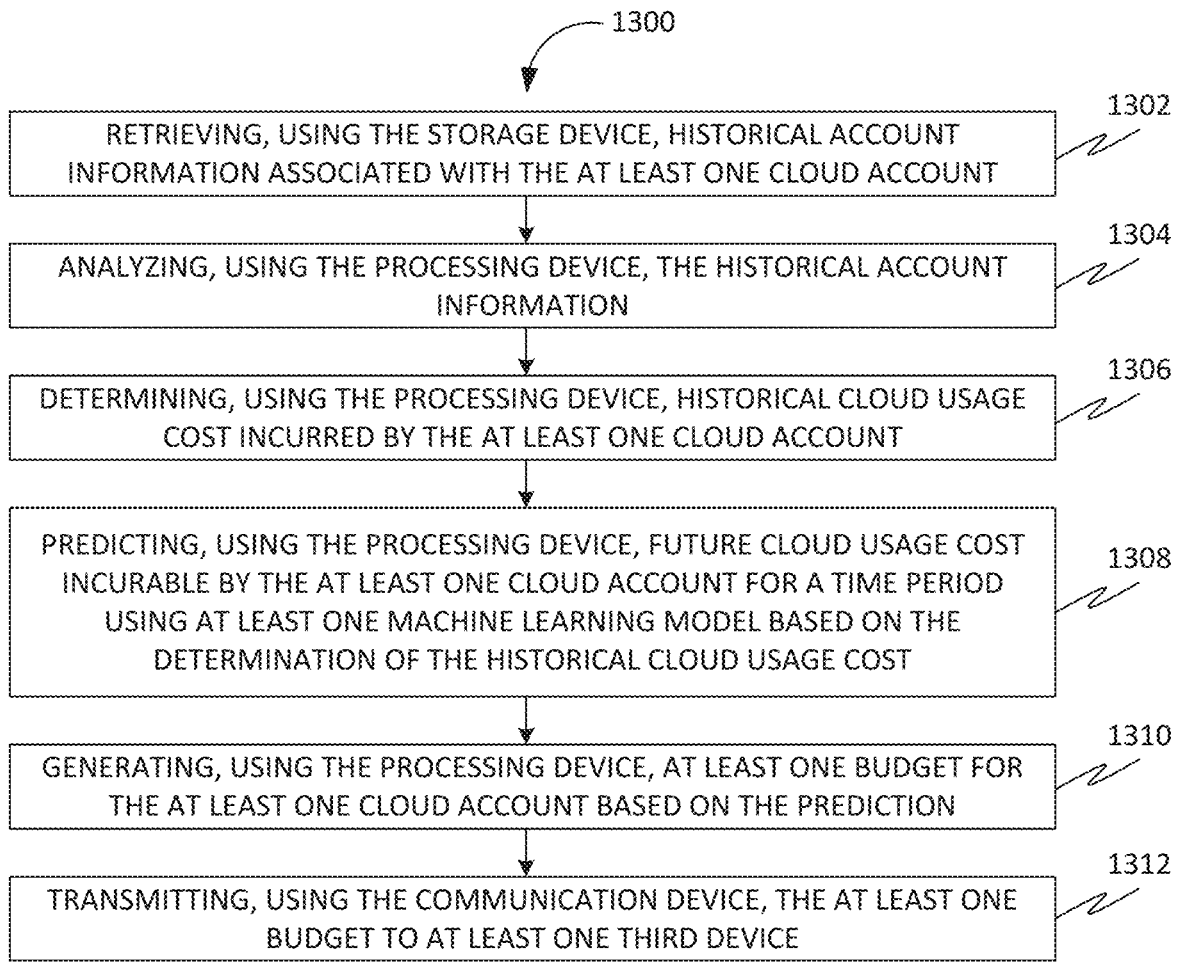
FIG. 13 is a flowchart of a method 1300 for estimating budgets for the cloud accounts of the cloud server, in accordance with some embodiments.

FIG. 13 is a flowchart of a method 1300 for facilitating generating of a budget for the cloud account, in accordance with some embodiments. Accordingly, the method 1300 may include a step 1302 of retrieving, using the storage device, historical account information associated with the at least one cloud account. Further, the method 1300 may include a step 1304 of analyzing, using the processing device, the historical account information. Further, the method 1300 may include a step 1306 of determining, using the processing device, historical cloud usage cost incurred by the at least one cloud account. Further, the method 1300 may include a step 1308 of predicting, using the processing device, future cloud usage cost incurrable by the at least one cloud account for a time period using at least one machine learning model based on the determination of the historical cloud usage cost. Further, the method 1300 may include a step 1310 of generating, using the processing device, at least one budget for the at least one cloud account based on the prediction. Further, the method 1300 may include a step 1312 of transmitting, using the communication device, the at least one budget to at least one third device.

Figure 14:
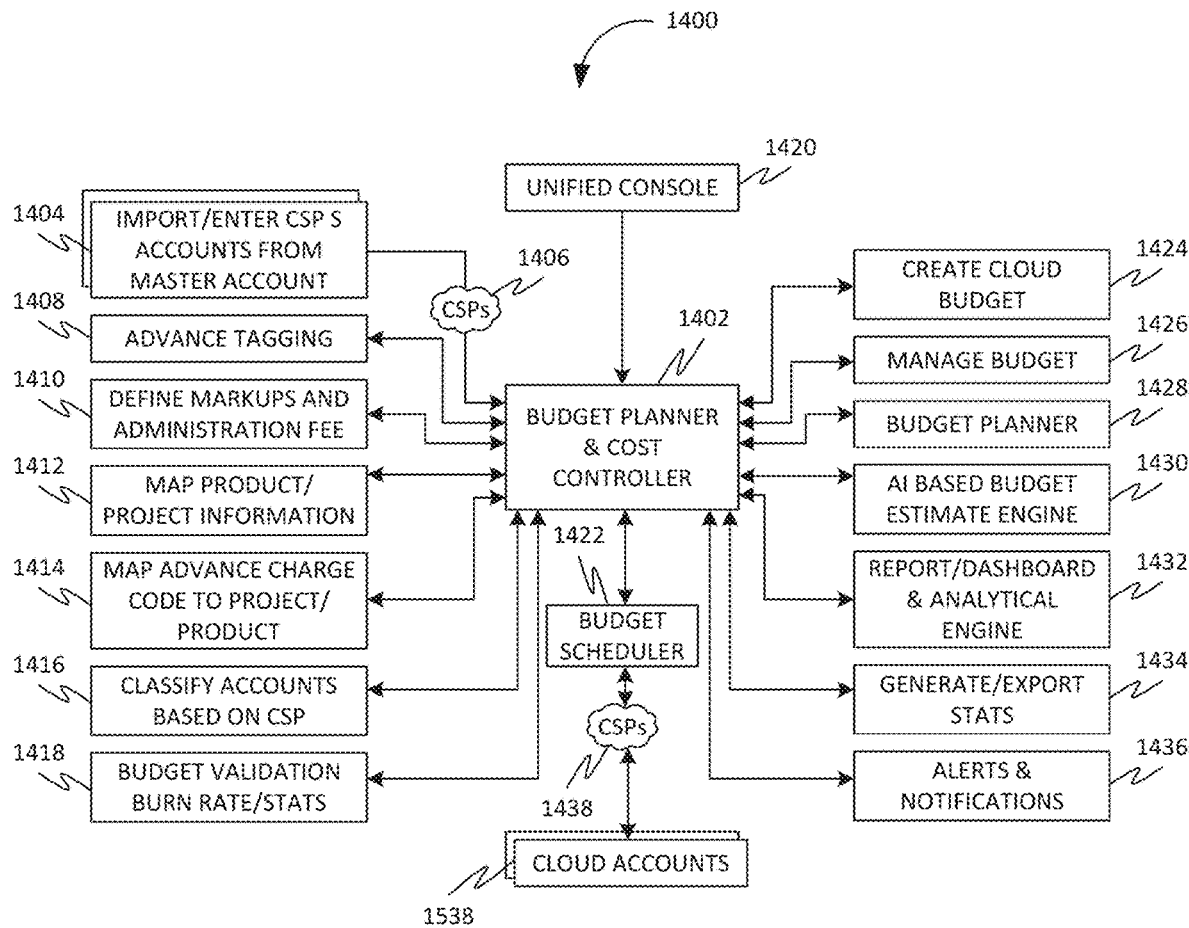
FIG. 14 is a block diagram of a system 1400 for creating, manage and planning a budget for any given period or fiscal year across all the accounts in the cloud server, in accordance with some embodiments.

FIG. 14 is a block diagram of a system 1400 for creating, managing, and planning a budget for any given period or fiscal year across all the accounts in the cloud, in accordance with some embodiments. Further, the system 1400 may include a budget planner and cost controller 1402. At 1404, the budget planner and cost controller 1402 imports/enters CSP's accounts from a master account using a CSP 1406. Further, at 1408, the budget planner and cost controller 1402 performs advance tagging. At 1410, the budget planner and cost controller 1402 define markups and administration fees. Further, at 1412, the budget planner and cost controller 1402 maps product/project information. At 1414, the budget planner and cost controller 1402 maps advance charge code to project/product. Further, at 1416, the budget planner and cost controller 1402 classifies accounts based on CSP. Further, at 1418, the budget planner and cost controller 1402 determines budget validation/burn rate/stats. The system 1400 may include a unified console 1420, a budget scheduler 1422, a create cloud budget 1424, a manage budget 1426, a budget planner 1428, an AI based budget estimate engine 1430, a report/dashboard and analytical engine 1432, a generate/export stats 1434, and alerts and notifications 1436. Further, the system 1400 generates a schedule via the budget scheduler 1422 to push the schedule to cloud accounts 1538 using a CSP 1438.

Figure 15:
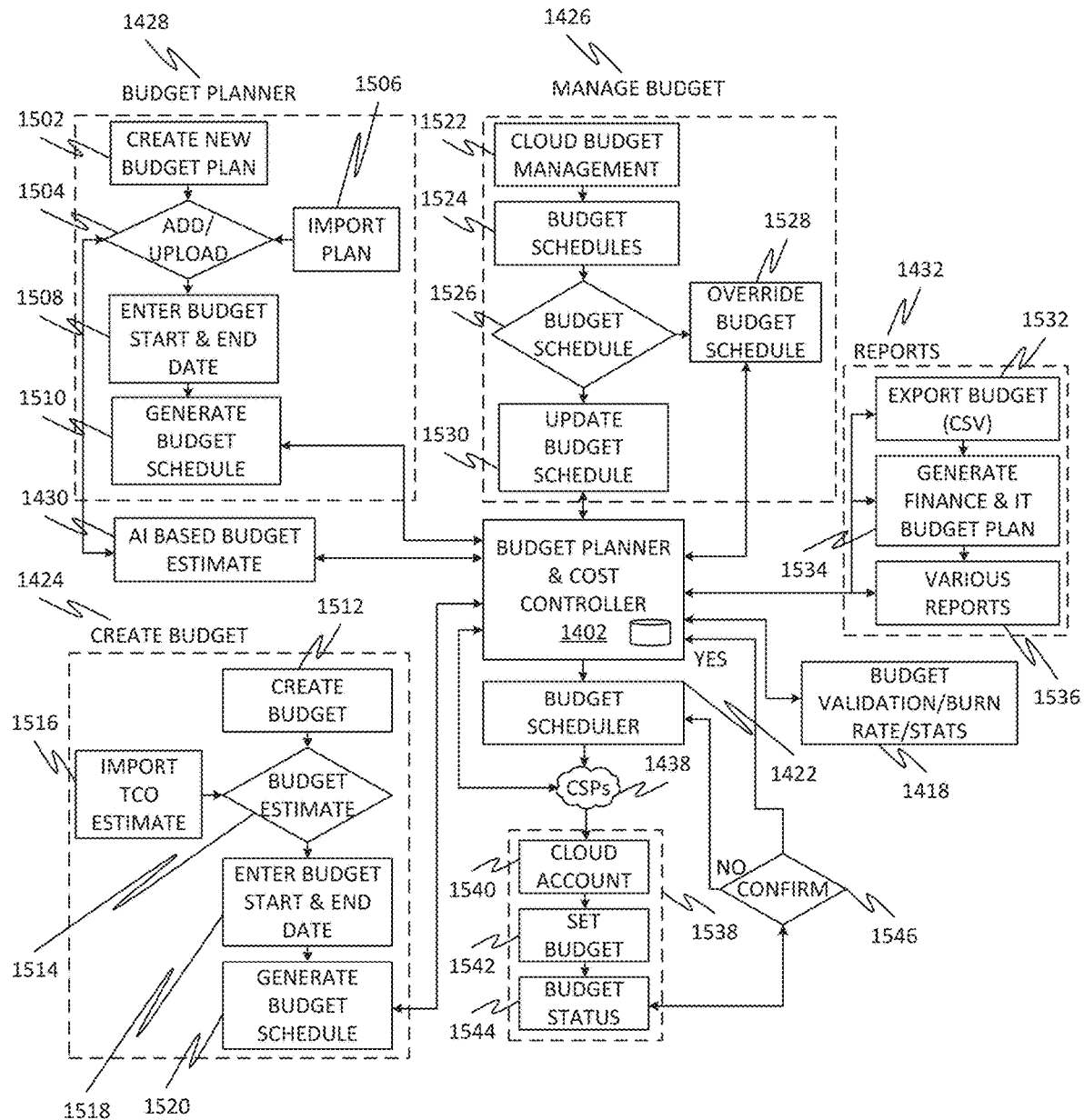
FIG. 15 is a flowchart of methods for creating, managing, and controlling the budget, budget schedules, and budget planning for the cloud accounts across multiple cloud service providers, in accordance with some embodiments.

FIG. 15 is a flow diagram of methods for creating, managing, and controlling the budget, budget schedules, and budget planning for the cloud accounts 1538 across multiple cloud service providers (CSP), in accordance with some embodiments. At 1502, the budget planner 1428 may include creating a new budget plan. Further, at 1504, the budget planner 1428 may include adding/uploading based on importing a plan 1506 or from the system generated budget plan from AI-based budget estimate engine 1430. Further, at 1508, the budget planner 1428 may include entering the budget's start and end dates. At 1510, the budget planner 1428 may include generating a budget schedule. Further, the budget planner and cost controller 1402 receives the budget schedule after the step 1510. At 1512, the create cloud budget 1424 may include creating a budget. Further, at 1514, the create cloud budget 1424 may include budget estimation based on importing TCO 1516. Further, at 1518, the create cloud budget 1424 may include entering the budget's start and end dates. Further, at 1520, the create cloud budget 1424 may include generating a budget schedule. Further, the budget planner and cost controller 1402 receives the budget schedule after the step 1520. Further, at 1522, the managed budget 1426 may include a cloud-based budget management. At 1524, the managed budget 1426 may include budget schedules. Further, at 1526, the managed budget 1426 may include a budget schedule. At 1528, the managed budget 1426 may include overriding the budget schedule based on the budget schedule 1526. Further, at 1530, the managed budget 1426 may include updating the budget schedule based on the budget schedule 1526. Further, the budget planner and cost controller 1402 receives the budget schedule after the step 1530. The budget planner and cost controller 1402 receives the budget schedule after the step 1528. Further, the report 1432 may include export budget (CSV) 1532, generate finance and IT budget plan 1534, and various reports 1536. Further, the cloud accounts 1538 may include cloud account 1540, set budget 1542, and budget status 1544. Further, the budget planner and cost controller 1402 and the budget scheduler 1422 receive the budget status 1544 via a step of 1546.

Figure 16:
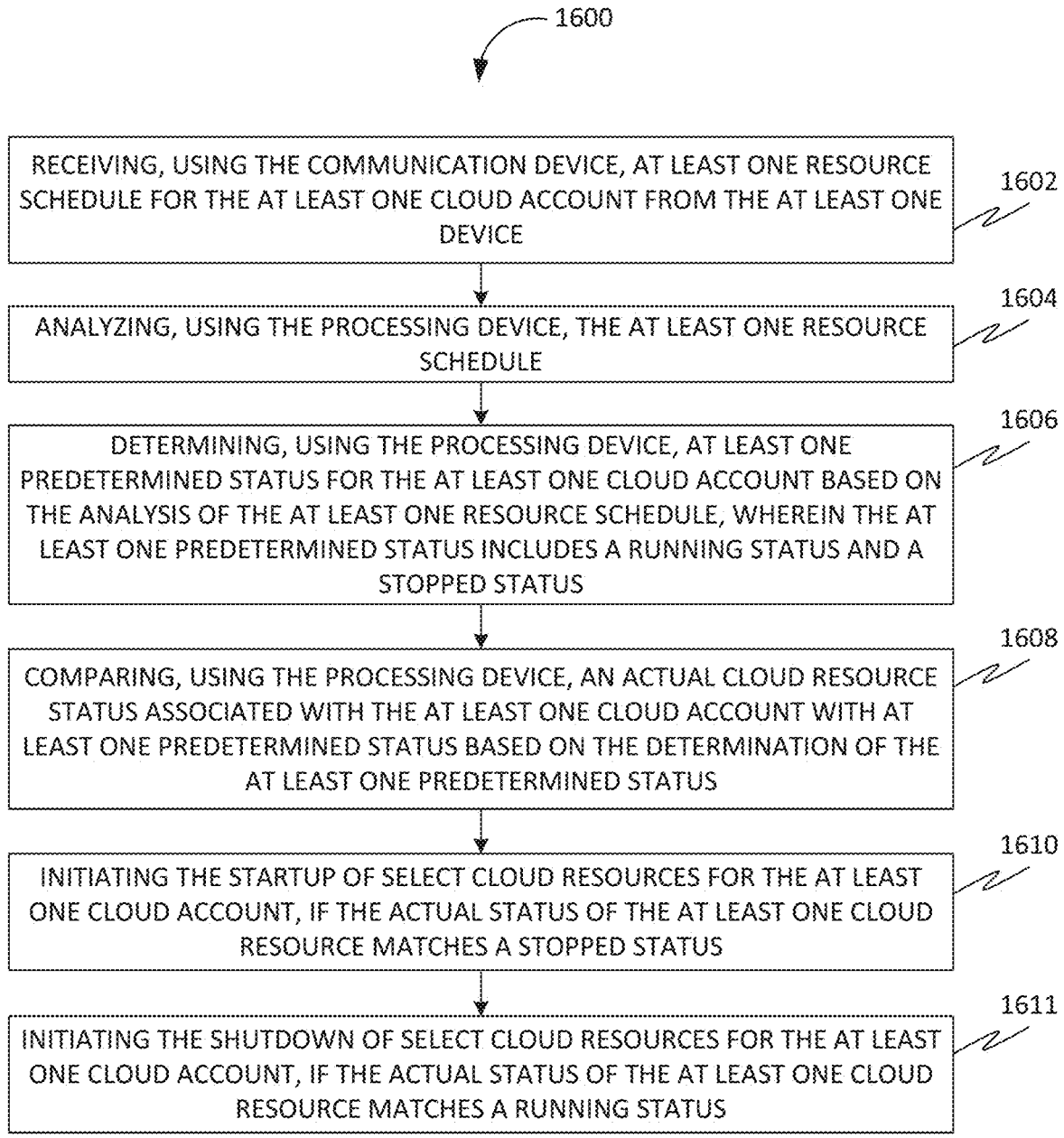
FIG. 16 is a flowchart of a method 1600 for dynamically terminating cloud resources when the cloud resources are not in use, in accordance with some embodiments.

FIG. 16 is a flowchart of a method 1600 for dynamically stopping cloud resources when the cloud resources are not in use, in accordance with some embodiments. Accordingly, the method 1600 may include a step 1602 of receiving, using the communication device, at least one resource schedule for the at least one cloud account from the at least one device. The method 1600 may include a step 1604 of analyzing, using the processing device, the at least one resource schedule. Further, the method 1600 may include a step 1606 of determining, using the processing device, at least one predetermined status for the at least one cloud account based on the analysis of the at least one resource schedule, wherein the at least one predetermined status includes a running status and a stopped status. The method 1600 may include a step 1608 of comparing, using the processing device, an actual cloud resource status associated with the at least one cloud account with at least one predetermined status based on the determination of the at least one predetermined status. In addition, the method 1600 may include a step 1610 of initiating the startup of select cloud resources for the at least one cloud account, if the actual status of the at least one cloud resource matches a stopped status. Alternatively, the method 1600 may also include a step 1611 of initiating the shutdown of select cloud resources for the at least one cloud account, if the actual status of the at least one cloud resource matches a running status.

In the preferred embodiment, the at least one resource schedule may correspond to predetermined working hours associated with the at least one cloud account, wherein the running status corresponds to working hours within the range of the predetermined working hours, and wherein the stopped status corresponds to non-working hours outside the range of the predetermined working hours. In other words, if the cloud resources are not running during predetermined working hours, the cloud resources can be dynamically started if the cloud resources have not been manually started. If the cloud resources are running during predetermined non-working hours, the cloud resources can be dynamically stopped to save cloud usage cost if the cloud resources are not manually stopped.

In an alternate embodiment, the at least one resource schedule corresponds to predetermined service level requirements (SLAs) associated with the at least one cloud account, wherein the running status corresponds to service levels within the range of SLAs, and wherein the stopped status corresponds to service levels outside the range of SLAs. In other words, if the usage of cloud resources by the cloud account falls within the SLAs, the cloud resources can be dynamically brought up and running if the cloud resources have not been manually started. Further, the cloud resources can be dynamically stopped if the usage of cloud resources by the cloud account falls outside the predetermined SLAs.

Figure 17:
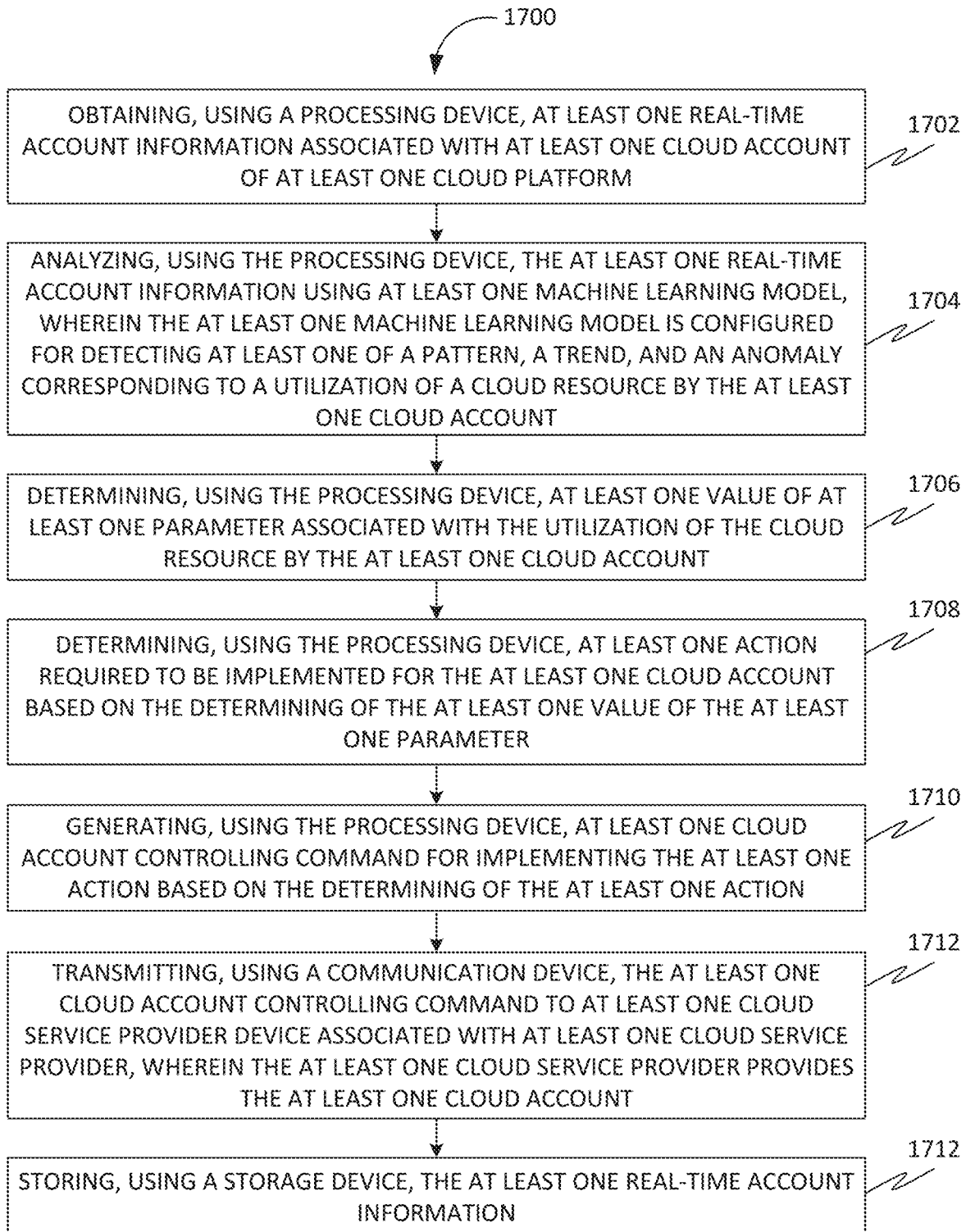
FIG. 17 is a flowchart of a method 1700 for facilitating managing budgets for cloud accounts, in accordance with some embodiments.

FIG. 17 is a flowchart of a method 1700 for facilitating managing budgets for cloud accounts, in accordance with some embodiments. Accordingly, at 1702, the method 1700 may include obtaining, using a processing device, at least one real-time account information associated with at least one cloud account of at least one cloud platform. Further, the at least one real-time account information may include information associated with a usage of one or more cloud resources by the at least one cloud account. Further, the one or more cloud resources may include a cloud storage resource. Further, the at least one real-time account information may include information associated with a usage of a budget allocated to the at least one cloud account. Further, the at least one real-time account information may include a cloud usage information. Further, the at least one cloud platform hosts the at least one cloud account. Further, the at least one real-time account information may include storage data, resource data, billing data, financial data, etc., associated with the at least one cloud account. Further, the obtaining of the at least one real-time account information may be based on an integration with at least one application programming interface (API) or any other mechanism of one or more cloud service providers associated with the at least one cloud platform. Further, the obtaining of the at least one real-time account information may include fetching the at least one account information in real time.

Further, at 1704, the method 1700 may include analyzing, using the processing device, the at least one real-time account information using at least one machine learning model. Further, the at least one machine learning model may be trained using at least one machine learning algorithm, at least one artificial intelligence (AI) algorithm, etc. Further, the at least one machine learning model may be an artificial intelligence (AI) model. Further, the at least one machine learning model may be configured for detecting at least one of a pattern, a trend, and an anomaly corresponding to a utilization of a cloud resource by the at least one cloud account. Further, at least one of the pattern, the trend, and the anomaly may be detected in the at least one real-time account information. Further, the pattern may include a spending pattern associated with the budget allocated to the at least one cloud account, a usage pattern (such as cloud usage pattern, cloud resource usage pattern, etc.) associated with the cloud resource allocated to the at least one cloud account, a financial pattern associated with a financial of the at least one cloud account, a demand pattern associated with a demand for the cloud resource, an operational pattern associated with an operation of the at least one cloud account, a budget pattern, etc. Further, the pattern may be associated with a cloud usage pattern information. Further, the trend may include a spending trend associated with the budget allocated to the at least one cloud account, a financial trend associated with the financial, etc. Further, the anomaly may include an overutilization of the cloud resource, an underutilization of the cloud resource, an overspending of the budget, an underspending of the budget, a spike in a usage of the cloud resource and the budget allocated to the at least one cloud account, a budget anomaly, etc.

Further, at 1706, the method 1700 may include determining, using the processing device, at least one value of at least one parameter associated with the utilization of the cloud resource by the at least one cloud account. Further, the at least one parameter may include an operational parameter associated with the cloud resource, a resource utilization metric, a storage metric, a key metric (such as storage capacity usage, read/write operations, data transfer rates, etc.), an expenditure (daily expenditure), etc. Further, the at least one parameter may include a compliance with data privacy standards, including but not limited to General Data Protection Regulation (GDPR) and Health Insurance Portability and Accountability Act (HIPAA).

Further, at 1708, the method 1700 may include determining, using the processing device, at least one action required to be implemented for the at least one cloud account based on the determining of the at least one value of the at least one parameter. Further, the at least one action may include restricting a spinning of an additional cloud resource to the at least one cloud account, implementing one or more cost saving measures for the at least one cloud account, overriding a preset percentage consumption on the budget of the at least one cloud account, adding an additional fund to the budget of the at least one cloud account, restricting cloud resource provisioning for the at least one cloud account, etc.

Further, at 1710, the method 1700 may include generating, using the processing device, at least one cloud account controlling command for implementing the at least one action based on the determining of the at least one action.

Further, at 1712, the method 1700 may include transmitting, using a communication device, the at least one cloud account controlling command to at least one cloud service provider device associated with at least one cloud service provider. Further, the at least one cloud service provider provides the at least one cloud account. Further, the at least one cloud service provider device may include a server, a cloud server, a storage gateway appliance, a storage gateway device, a network attached storage (NAS) device, a load balancer, a networking device, etc.

Further, at 1714, the method 1700 may include storing, using a storage device, the at least one real-time account information. Further, the storing of the at least one real-time account information complies with global data privacy standards.

In further embodiments, the method 1700 may include aligning, using the processing device, one or more budget management processes with one or more regulatory requirements and one or more contractual practices applicable to federal and commercial contracting, thereby facilitating compliance with prevailing one or more acquisition regulations and enabling effective management of various contract types, including fixed-price contracts. Further, the method 1700 may include generating, using the processing device, a user interface for displaying real-time financial data including expenditures, budget allocations, and resource utilization metrics, enabling users to make informed decisions regarding cloud cost management and resource allocation.

In further embodiments, the method 1700 may include predicting, using the processing device, at least one requirement associated with the at least one cloud account based on the at least one value of the at least one parameter. Further, the determining of the at least one action may be based on the at least one requirement. Further, the at least one requirement may include a resource requirement associated with the at least one cloud account, a project requirement of a project associated with the at least one cloud account, an operational requirement of an operation associated with the at least one cloud account, a budgetary requirement of the budget for the at least one cloud account, a regulatory requirement associated with an expenditure of the at least one cloud account, etc.

Figure 18:
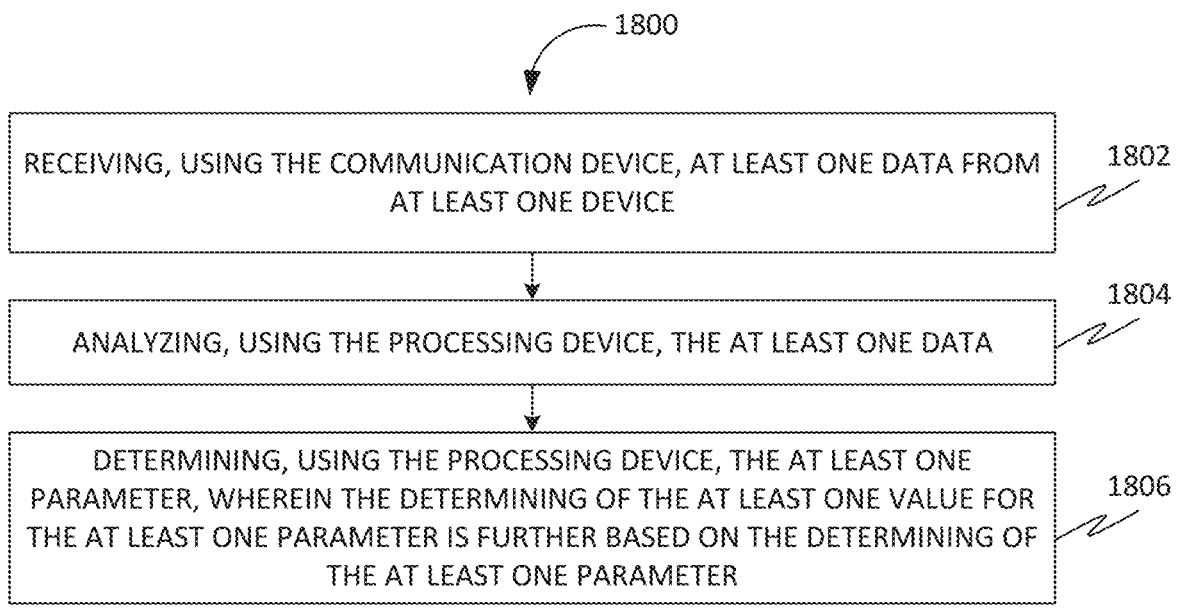
FIG. 18 is a flowchart of a method 1800 for facilitating managing budgets for cloud accounts, in accordance with some embodiments.

FIG. 18 is a flowchart of a method 1800 for facilitating managing budgets for cloud accounts, in accordance with some embodiments. Accordingly, at 1802, the method 1800 may include receiving, using the communication device, at least one data from at least one device. Further, the at least one data may include a feedback of at least one user associated with the at least one cloud account. Further, the at least one device may include a smartphone, a tablet, a laptop, a computer, and so on that may be associated with at least one user. Further, the at least one user may include an individual, an institution, and an organization. Further, the at least one device may include a client device, a user device, a computing device, a sensor, etc. Further, the at least one data may include data associated with cloud cost management, budget adjustments, cloud resource allocation, etc.

Further, at 1804, the method 1800 may include analyzing, using the processing device, the at least one data.

Further, at 1806, the method 1800 may include determining, using the processing device, the at least one parameter. Further, the at least one parameter may include one or more user-defined parameters. Further, the one or more user-defined parameters may include specific cloud services, budgetary thresholds, and financial goals. Further, the determining of the at least one value for the at least one parameter may be based on the determining of the at least one parameter.

Figure 19:
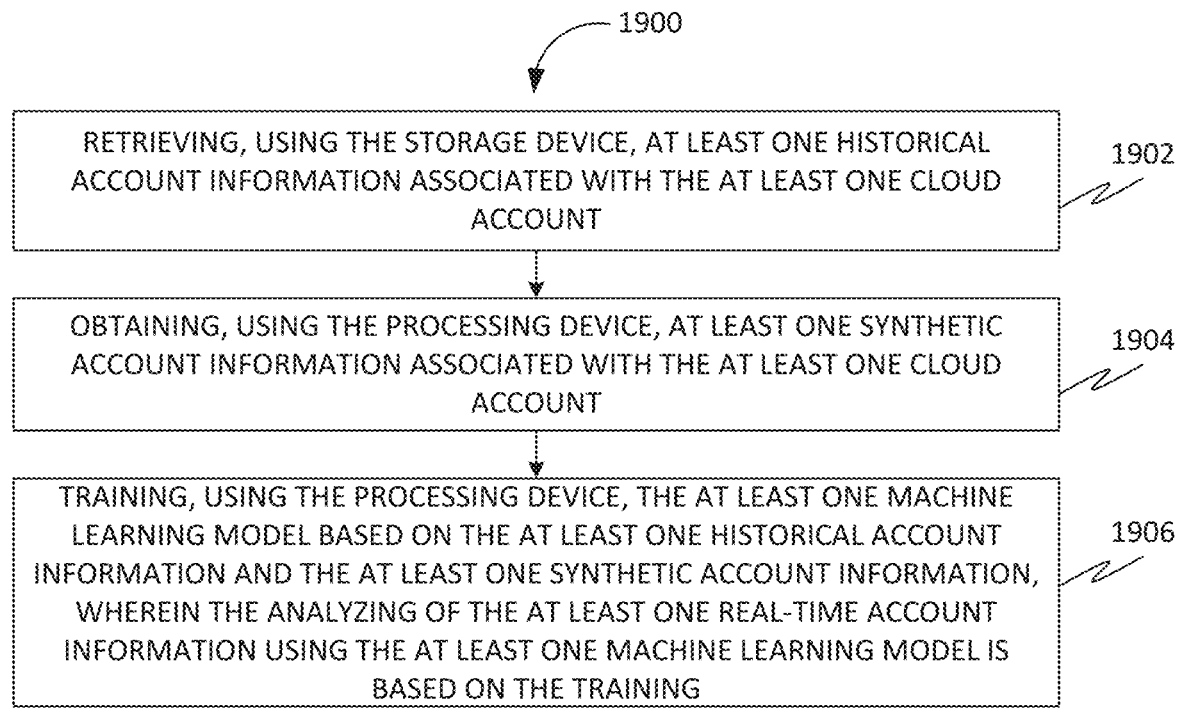
FIG. 19 is a flowchart of a method 1900 for facilitating managing budgets for cloud accounts, in accordance with some embodiments.

FIG. 19 is a flowchart of a method 1900 for facilitating managing budgets for cloud accounts, in accordance with some embodiments. Accordingly, at 1902, the method 1900 may include retrieving, using the storage device, at least one historical account information associated with the at least one cloud account. Further, the at least one historical account information may include historical data, historical financial data, historical budget data, historical usage data, historical cloud usage data, historical spending data, etc. Further, the at least one historical account information may be associated with a historical usage of the cloud resource.

Further, at 1904, the method 1900 may include obtaining, using the processing device, at least one synthetic account information associated with the at least one cloud account. Further, the at least one synthetic account information may include synthetic data. Further, the synthetic data may include a dataset that reflects various spending patterns, including typical daily expenses, sudden spikes in spending, and gradual increases in spending. Further, the dataset is designed to simulate a range of scenarios that might occur in real project management. Further, the obtaining of the at least one synthetic account information may include generating the at least one synthetic account information may be based on a statistical analysis of the at least one historical account information. Further, the statistical analysis may include distribution analysis, correlation analysis, time series analysis, among other methods. Further, the at least one synthetic account information may be generated using at least one machine learning model using the at least one historical account information. Further, the at least one machine learning model detects at least one a pattern and a trend in the at least one historical account information. Further, the at least one machine learning model generates the at least one synthetic account information based on at least one the pattern and the trend. Further, the at least one machine learning model may include a Generative Adversarial Network (GAN), a Variational Autoencoder (VAE), or any other advanced data modeling technologies.

Further, at 1906, the method 1900 may include training, using the processing device, the at least one machine learning model based on the at least one historical account information and the at least one synthetic account information. Further, the analyzing of the at least one real-time account information using the at least one machine learning model may be based on the training. Further, the at least one machine learning model may include a trained machine learning model.

Figure 20:
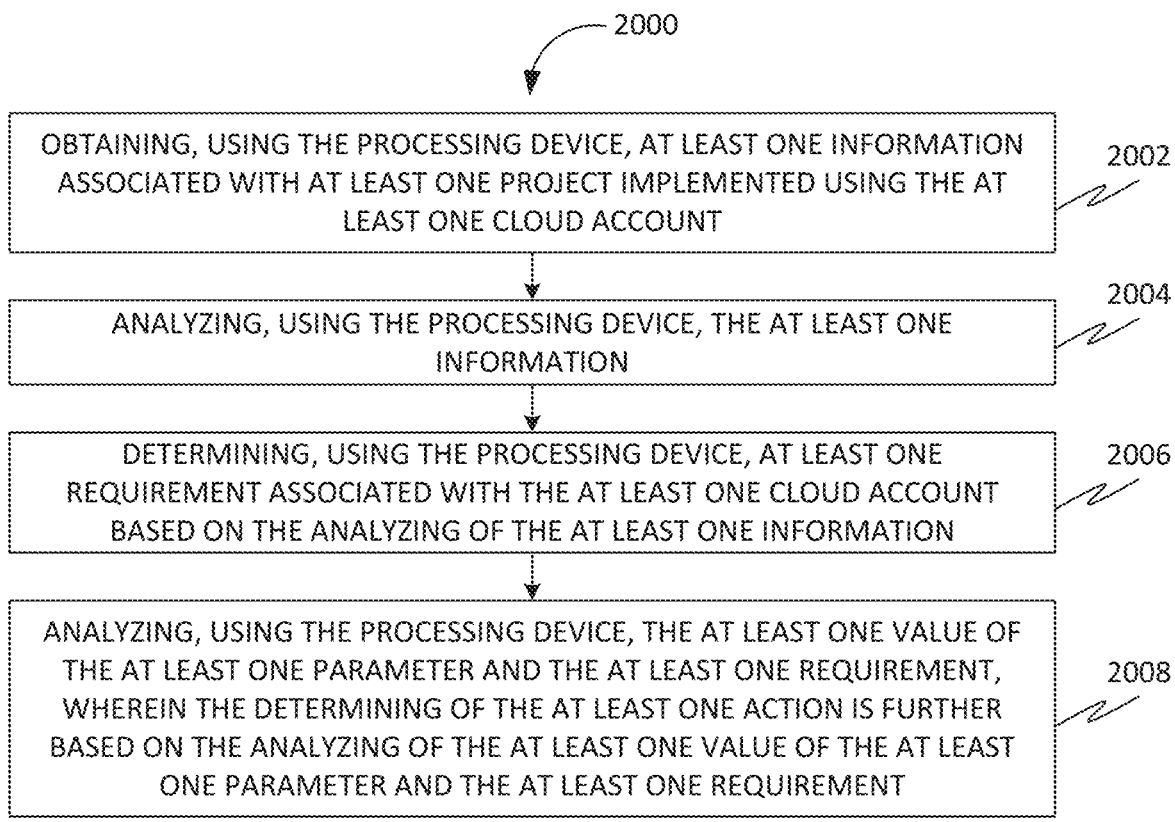
FIG. 20 is a flowchart of a method 2000 for facilitating managing budgets for cloud accounts, in accordance with some embodiments.

FIG. 20 is a flowchart of a method 2000 for facilitating managing budgets for cloud accounts, in accordance with some embodiments. Accordingly, at 2002, the method 2000 may include obtaining, using the processing device, at least one information associated with at least one project implemented using the at least one cloud account. Further, the at least one information may include an objective, a goal, a practice, a contract, a scope, a budget, a period, a duration, a project type, etc., associated with the at least one project. Further, the at least one information may include project data.

Further, at 2004, the method 2000 may include analyzing, using the processing device, the at least one information.

Further, at 2006, the method 2000 may include determining, using the processing device, at least one requirement associated with the at least one cloud account based on the analyzing of the at least one information. Further, the at least one requirement may include a project requirement.

Further, at 2008, the method 2000 may include analyzing, using the processing device, the at least one value of the at least one parameter and the at least one requirement. Further, the determining of the at least one action may be based on the analyzing of the at least one value of the at least one parameter and the at least one requirement.

Figure 21:
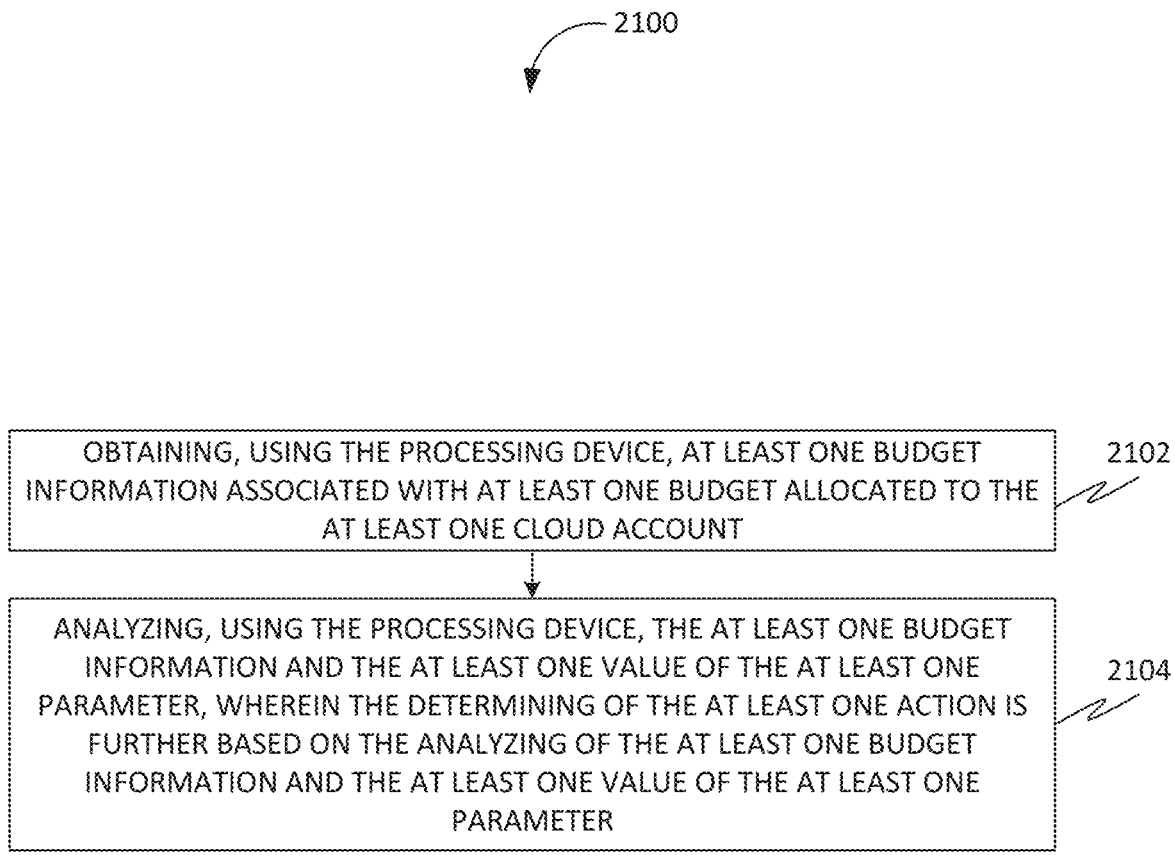
FIG. 21 is a flowchart of a method 2100 for facilitating managing budgets for cloud accounts, in accordance with some embodiments.

FIG. 21 is a flowchart of a method 2100 for facilitating managing budgets for cloud accounts, in accordance with some embodiments. Accordingly, at 2102, the method 2100 may include obtaining, using the processing device, at least one budget information associated with at least one budget allocated to the at least one cloud account.

Further, at 2104, the method 2100 may include analyzing, using the processing device, the at least one budget information and the at least one value of the at least one parameter. Further, the determining of the at least one action may be based on the analyzing of the at least one budget information and the at least one value of the at least one parameter.

Figure 22:
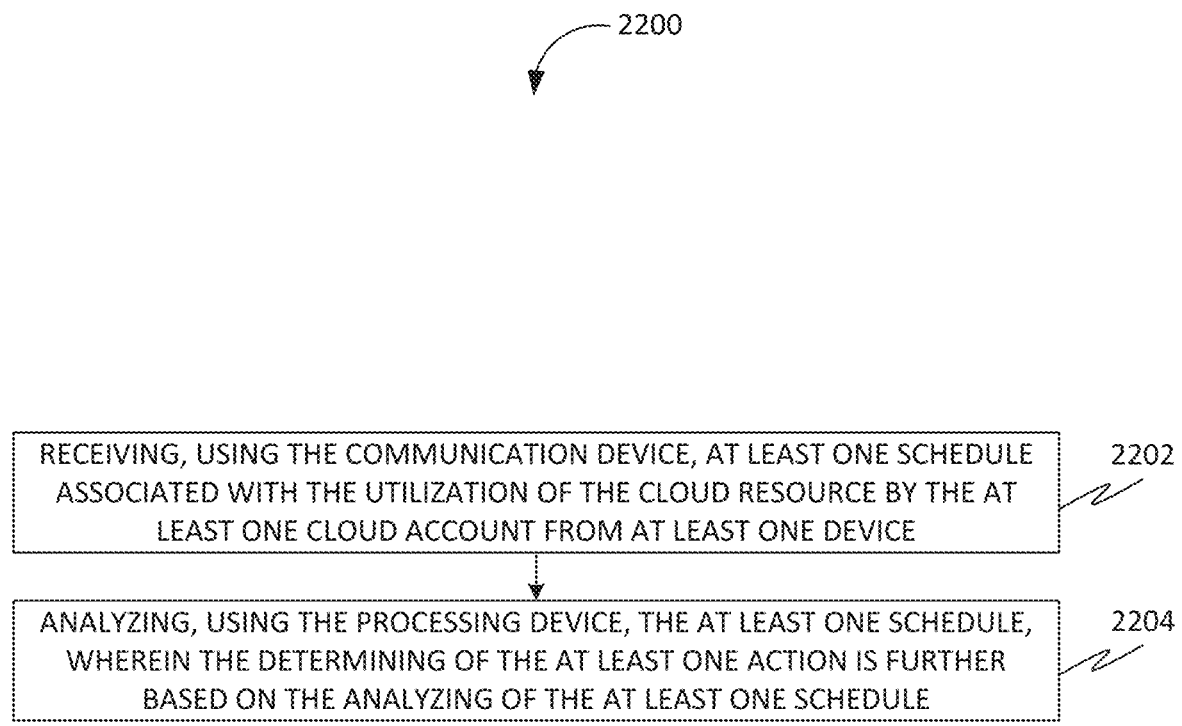
FIG. 22 is a flowchart of a method 2200 for facilitating managing budgets for cloud accounts, in accordance with some embodiments.

FIG. 22 is a flowchart of a method 2200 for facilitating managing budgets for cloud accounts, in accordance with some embodiments. Accordingly, at 2202, the method 2200 may include receiving, using the communication device, at least one schedule associated with the utilization of the cloud resource by the at least one cloud account from at least one device. Further, the at least one schedule may include an operational schedule, a holiday schedule, a cloud resource schedule, a preset schedule, a custom schedule, etc.

Further, at 2004, the method 2200 may include analyzing, using the processing device, the at least one schedule. Further, the determining of the at least one action may be further based on the analyzing of the at least one schedule.

Figure 23:
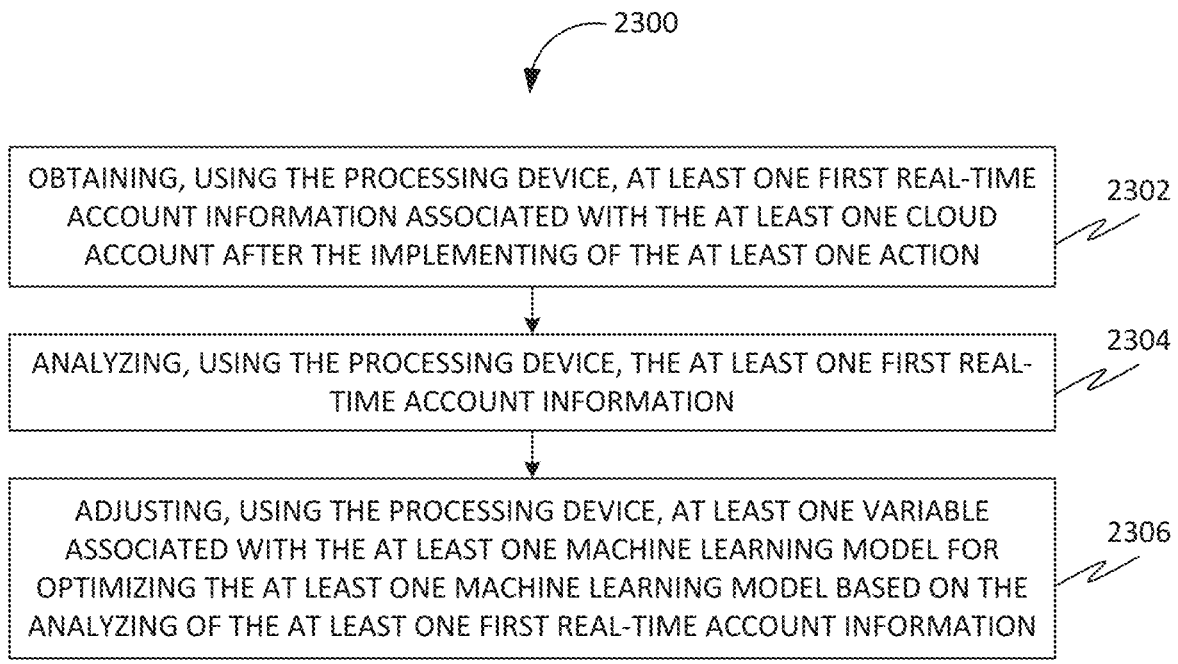
FIG. 23 is a flowchart of a method 2300 for facilitating managing budgets for cloud accounts, in accordance with some embodiments.

FIG. 23 is a flowchart of a method 2300 for facilitating managing budgets for cloud accounts, in accordance with some embodiments. Accordingly, at 2302, the method 2300 may include obtaining, using the processing device, at least one first real-time account information associated with the at least one cloud account after the implementing of the at least one action. Further, the at least one first real-time account information may include information associated with a usage of the cloud resource after the implementing of the at least one action.

Further, at 2304, the method 2300 may include analyzing, using the processing device, the at least one first real-time account information.

Further, at 2306, the method 2300 may include adjusting, using the processing device, at least one variable associated with the at least one machine learning model for optimizing the at least one machine learning model based on the analyzing of the at least one first real-time account information. Further, the at least one variable may include model parameters (weights), hyperparameters, optimizing algorithms, etc. associated with the at least one machine learning model.

Figure 24:
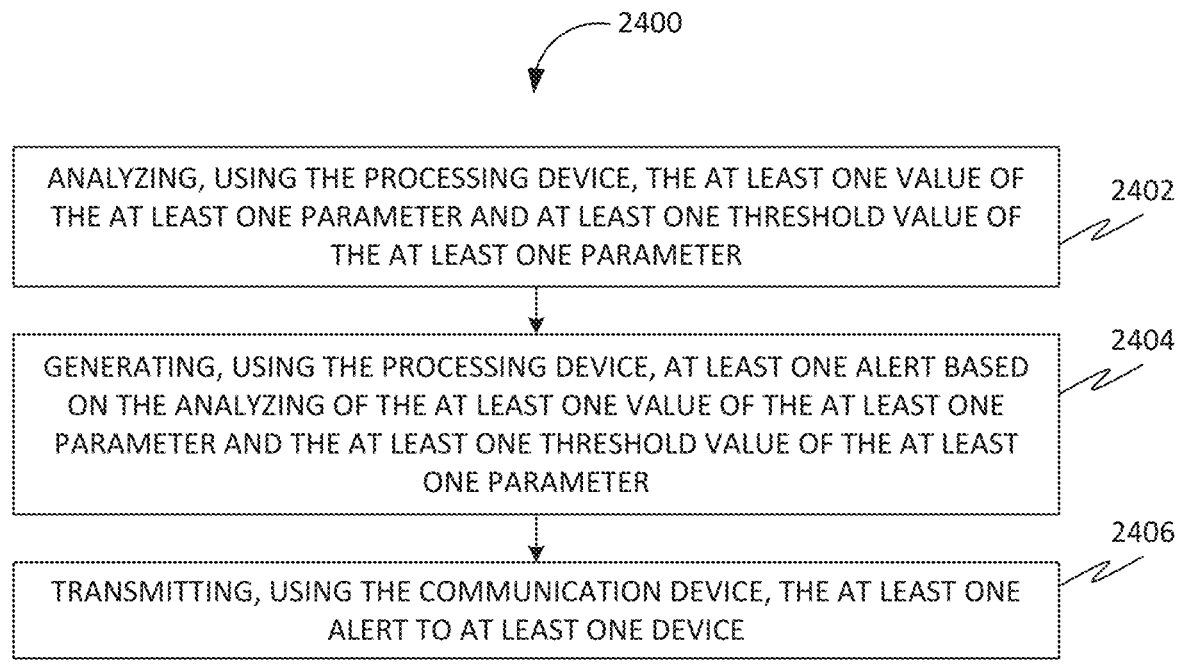
FIG. 24 is a flowchart of a method 2400 for facilitating managing budgets for cloud accounts, in accordance with some embodiments.

FIG. 24 is a flowchart of a method 2400 for facilitating managing budgets for cloud accounts, in accordance with some embodiments. Accordingly, at 2402, the method 2400 may include analyzing, using the processing device, the at least one value of the at least one parameter and at least one threshold value of the at least one parameter.

Further, at 2404, the method 2400 may include generating, using the processing device, at least one alert based on the analyzing of the at least one value of the at least one parameter and the at least one threshold value of the at least one parameter.

Further, at 2406, the method 2400 may include transmitting, using the communication device, the at least one alert to at least one device.

Figure 25:
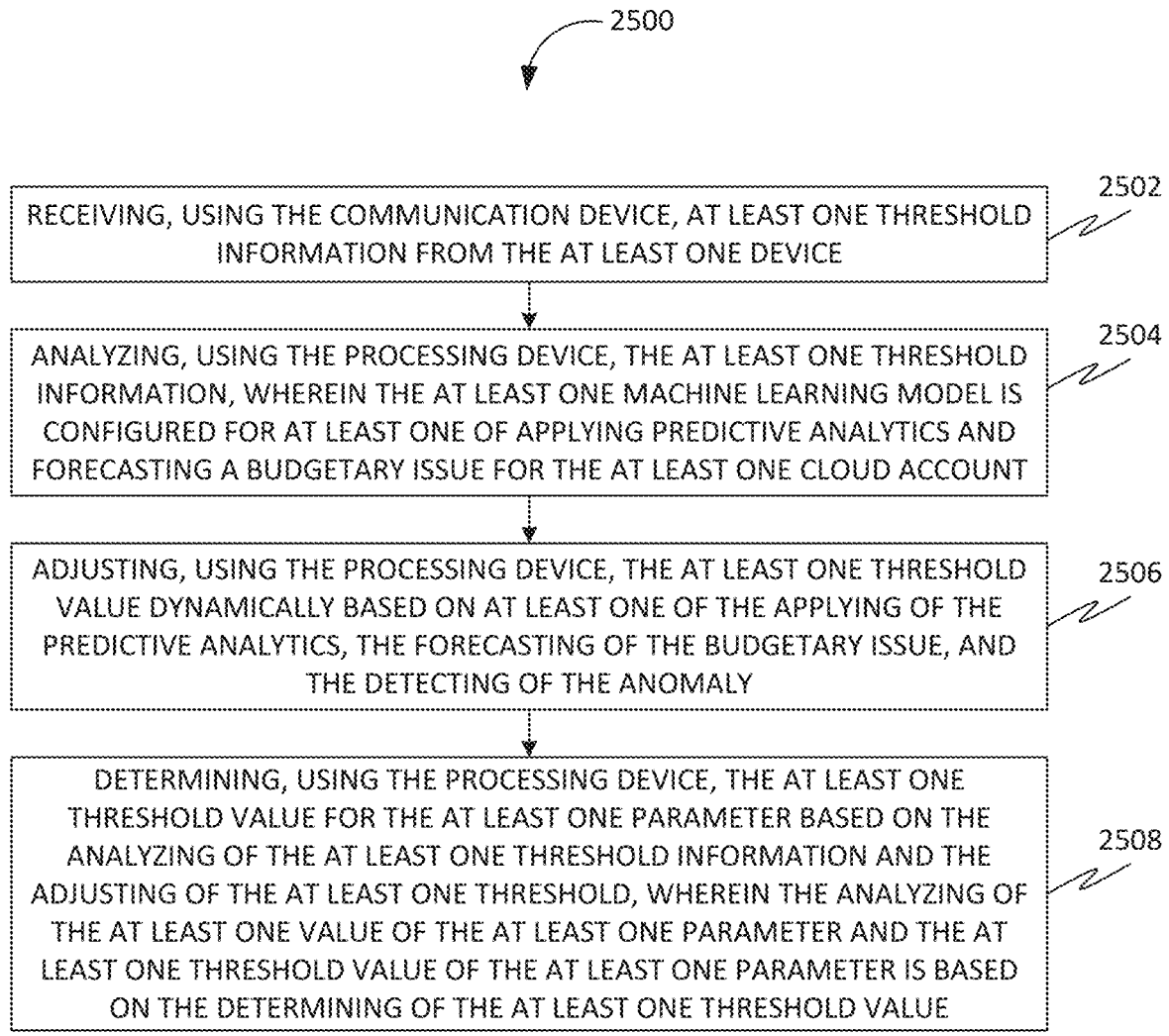
FIG. 25 is a flowchart of a method 2500 for facilitating managing budgets for cloud accounts, in accordance with some embodiments.

FIG. 25 is a flowchart of a method 2500 for facilitating managing budgets for cloud accounts, in accordance with some embodiments. Accordingly, at 2502, the method 2500 may include receiving, using the communication device, at least one threshold information from the at least one device. Further, the at least one threshold information may include one or more predefined criteria associated with the utilization of the budget and thresholds of the financial of the at least one cloud account.

Further, at 2504, the method 2500 may include analyzing, using the processing device, the at least one threshold information using the at least one machine learning model. Further, the at least one machine learning model may be configured for at least one of applying predictive analytics and forecasting a budgetary issue for the at least one cloud account.

Further, at 2506, the method 2500 may include adjusting, using the processing device, the at least one threshold value dynamically based on at least one of the applying of the predictive analytics, the forecasting of the budgetary issue, and the detecting of the anomaly.

Further, at 2508, the method 2500 may include determining, using the processing device, the at least one threshold value for the at least one parameter based on the analyzing of the at least one threshold information and the adjusting of the at least one threshold value. Further, the at least one threshold value may primarily include a soft cap, a hard cap, or other specified forms as required. Further, the analyzing of the at least one value of the at least one parameter and the at least one threshold value of the at least one parameter may be based on the determining of the at least one threshold value.

Figure 26:
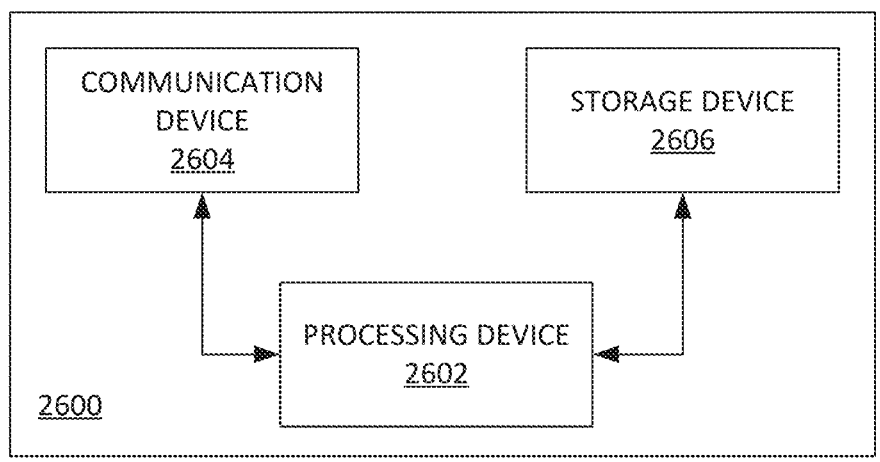
FIG. 26 is a block diagram of a system 2600 for facilitating managing budgets for cloud accounts, in accordance with some embodiments.

FIG. 26 is a block diagram of a system 2600 for facilitating managing budgets for cloud accounts, in accordance with some embodiments. Accordingly, the system 2600 may include a processing device 2602, a communication device 2604, and a storage device 2606.

Further, the processing device 2602 may be configured for obtaining at least one real-time account information associated with at least one cloud account of at least one cloud platform. Further, the processing device 2602 may be configured for analyzing the at least one real-time account information using at least one machine learning model. Further, the at least one machine learning model may be configured for detecting at least one of a pattern, a trend, and an anomaly corresponding to a utilization of a cloud resource by the at least one cloud account. Further, at least one of the pattern, the trend, and the anomaly may be detected in the at least one real-time account information. Further, the processing device 2602 may be configured for determining at least one value of at least one parameter associated with the utilization of the cloud resource by the at least one cloud account. Further, the processing device 2602 may be configured for determining at least one action required to be implemented for the at least one cloud account based on the determining of the at least one value of the at least one parameter. Further, the processing device 2602 may be configured for generating at least one cloud account controlling command for implementing the at least one action based on the determining of the at least one action.

Figure 27:
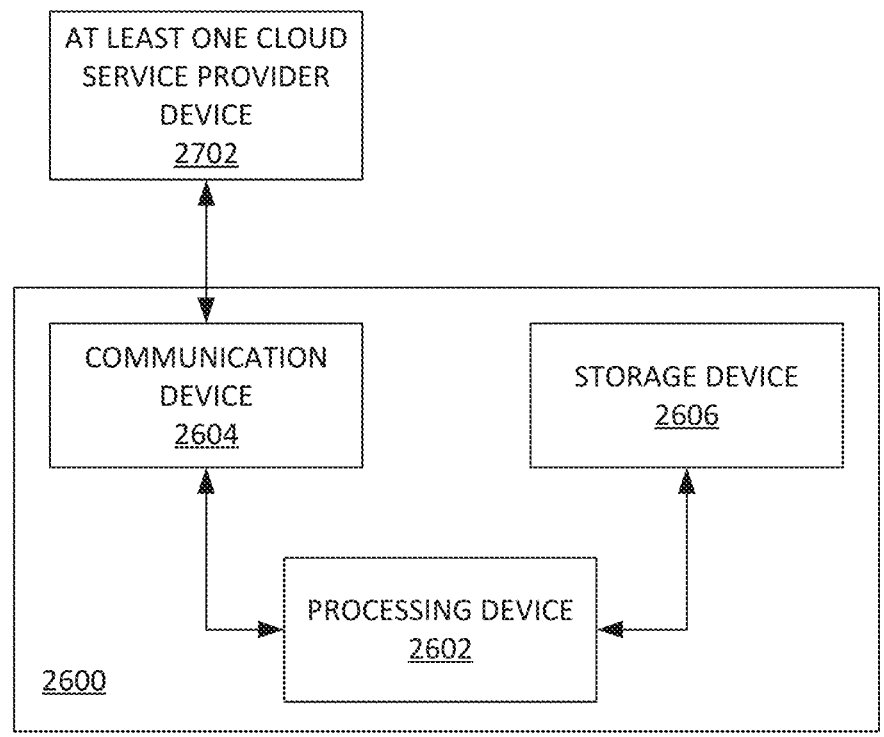
FIG. 27 is a block diagram of the system 2600, in accordance with some embodiments.

Further, the communication device 2604 may be communicatively coupled with the processing device 2602. Further, the communication device 2604 may be configured for transmitting the at least one cloud account controlling command to at least one cloud service provider device 2702, as shown in FIG. 27, associated with at least one cloud service provider. Further, the at least one cloud service provider provides the at least one cloud account.

Further, the storage device 2606 may be communicatively coupled with the processing device 2602. Further, the storage device 2606 may be configured for storing the at least one real-time account information.

Figure 28:
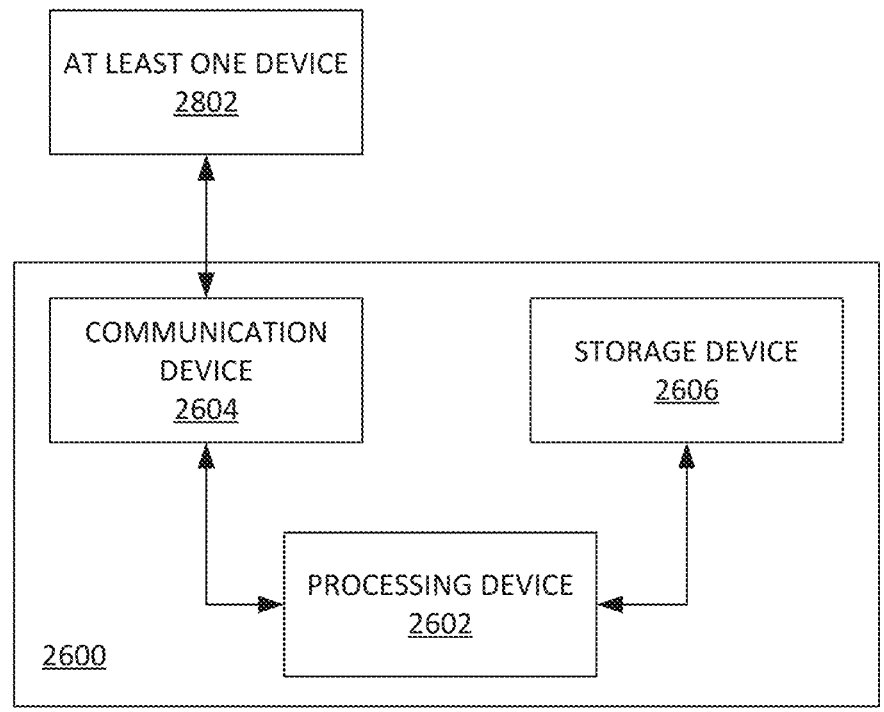
FIG. 28 is a block diagram of the system 2600, in accordance with some embodiments.

Further, in some embodiments, the communication device 2604 may be configured for receiving at least one data from at least one device 2802, as shown in FIG. 28. Further, the processing device 2602 may be configured for analyzing the at least one data. Further, the processing device 2602 may be configured for determining the at least one parameter. Further, the determining of the at least one value for the at least one parameter may be based on the determining of the at least one parameter.

Further, in some embodiments, the storage device 2606 may be configured for retrieving at least one historical account information associated with the at least one cloud account. Further, the processing device 2602 may be configured for obtaining at least one synthetic account information associated with the at least one cloud account. Further, the processing device 2602 may be configured for training the at least one machine learning model based on the at least one historical account information and the at least one synthetic account information. Further, the analyzing of the at least one real-time account information using the at least one machine learning model may be based on the training.

Further, in some embodiments, the processing device 2602 may be configured for predicting at least one requirement associated with the at least one cloud account based on the at least one value of the at least one parameter. Further, the determining of the at least one action may be based on the at least one requirement.

Further, in some embodiments, the processing device 2602 may be configured for obtaining at least one information associated with at least one project implemented using the at least one cloud account. Further, the processing device 2602 may be configured for analyzing the at least one information. Further, the processing device 2602 may be configured for determining at least one requirement associated with the at least one cloud account based on the analyzing of the at least one information. Further, the processing device 2602 may be configured for analyzing the at least one value of the at least one parameter and the at least one requirement. Further, the determining of the at least one action may be based on the analyzing of the at least one value of the at least one parameter and the at least one requirement.

Further, in some embodiments, the processing device 2602 may be configured for obtaining at least one budget information associated with at least one budget allocated to the at least one cloud account. Further, the processing device 2602 may be configured for analyzing the at least one budget information and the at least one value of the at least one parameter. Further, the determining of the at least one action may be based on the analyzing of the at least one budget information and the at least one value of the at least one parameter.

Further, in some embodiments, the communication device 2604 may be configured for receiving at least one schedule associated with the utilization of the cloud resource by the at least one cloud account from the at least one device 2802. Further, the processing device 2602 may be configured for analyzing the at least one schedule. Further, the determining of the at least one action may be further based on the analyzing of the at least one schedule.

Further, in some embodiments, the processing device 2602 may be configured for obtaining at least one first real-time account information associated with the at least one cloud account after the implementing of the at least one action. Further, the processing device 2602 may be configured for analyzing the at least one first real-time account information. Further, the processing device 2602 may be configured for adjusting at least one variable associated with the at least one machine learning model for optimizing the at least one machine learning model based on the analyzing of the at least one first real-time account information.

Further, in some embodiments, the processing device 2602 may be configured for analyzing the at least one value of the at least one parameter and at least one threshold value of the at least one parameter. Further, the processing device 2602 may be configured for generating at least one alert based on the analyzing of the at least one value of the at least one parameter and the at least one threshold value of the at least one parameter. Further, the communication device 2604 may be configured for transmitting the at least one alert to the at least one device 2802.

Further, in an embodiment, the communication device 2604 may be configured for receiving at least one threshold information from the at least one device 2802. Further, the processing device 2602 may be configured for analyzing the at least one threshold information using the at least one machine learning model. Further, the at least one machine learning model may be configured for at least one of applying predictive analytics and forecasting a budgetary issue for the at least one cloud account. Further, the processing device 2602 may be configured for adjusting the at least one threshold value dynamically based on at least one of the applying of the predictive analytics, the forecasting of the budgetary issue, and the detecting of the anomaly. Further, the processing device 2602 may be configured for determining the at least one threshold value for the at least one parameter based on the analyzing of the at least one threshold information and the adjusting of the at least one threshold value. Further, the analyzing of the at least one value of the at least one parameter and the at least one threshold value of the at least one parameter may be based on the determining of the at least one threshold value.

FIG. 27 is a block diagram of the system 2600, in accordance with some embodiments.

FIG. 28 is a block diagram of the system 2600, in accordance with some embodiments.

Figure 29:
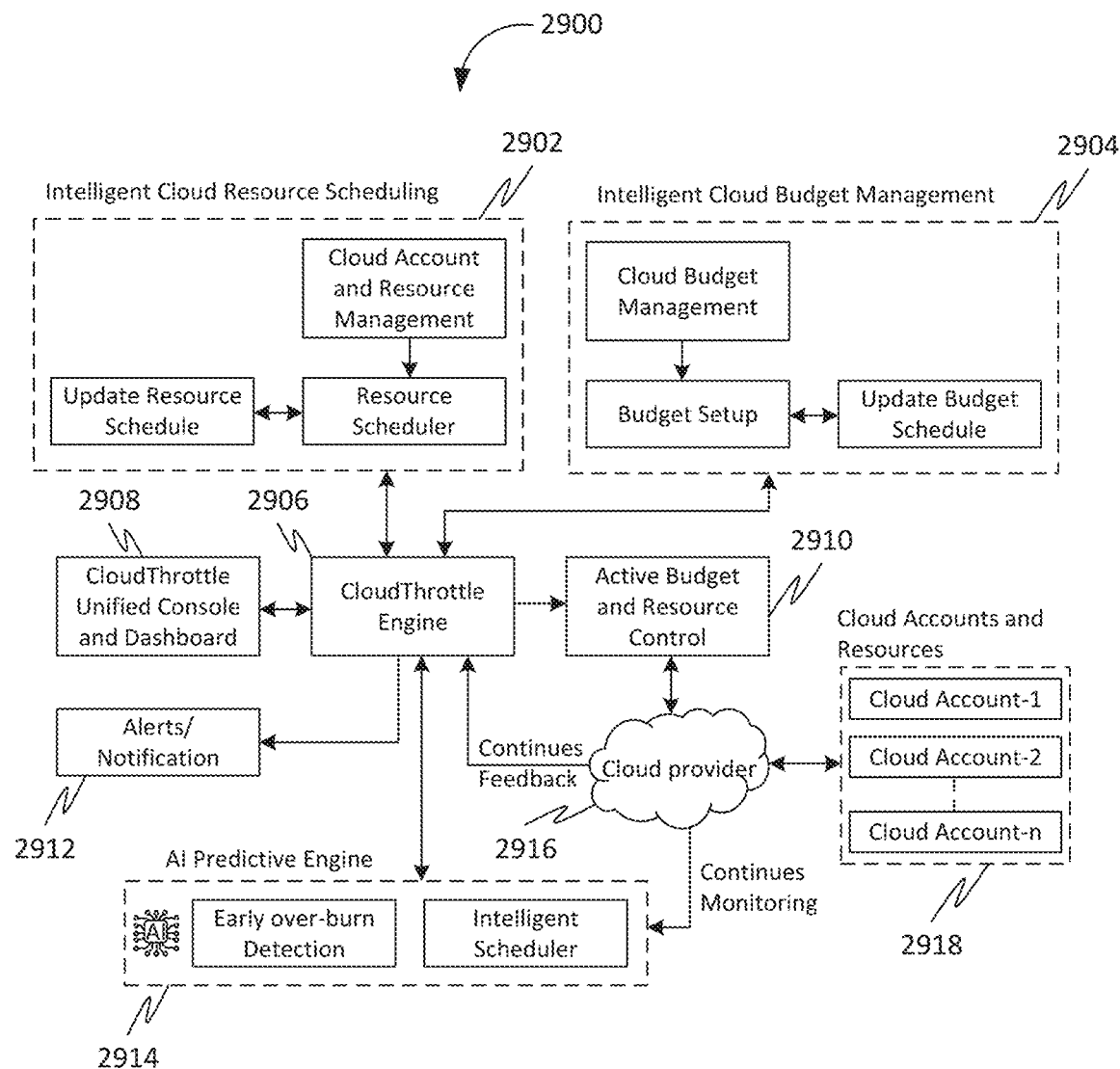
FIG. 29 is a block diagram of a system 2900 for facilitating managing budgets for cloud accounts, in accordance with some embodiments.

FIG. 29 is a block diagram of a system 2900 for facilitating managing budgets for cloud accounts, in accordance with some embodiments. Accordingly, the system 2900 may include an intelligent cloud resource scheduling unit 2902, an intelligent cloud budget management unit 2904, a CloudThrottle engine 2906, a CloudThrottle console and dashboard 2908, an active budget and resource control unit 2910, an alerts/notification display unit 2912, an AI predictive engine 2914, a cloud provider 2916, and cloud accounts and resources 2918.

Further, the system 2900 may be associated with the CloudThrottle. Further, the system 2900 may be associated with a process. Further, the process may include API or any other mechanism integration. Further, the API or any other similar mechanism integration encompasses:

Comprehensive Connectivity: CloudThrottle integrates seamlessly with the APIs of various cloud service providers or any other similar mechanisms. This integration is vital for accessing current cloud account spending and budget data, ensuring accurate real-time financial monitoring. For example: When an organization uses AWS, Azure, and Google Cloud, CloudThrottle connects to each service's API or an equivalent mechanism to fetch the latest financial data, providing a real-time overview of expenditures across these platforms.

Security and Compliance: The platform ensures secure connections with cloud providers' APIs or any other mechanism, emphasizing data security and adherence to privacy standards. This is crucial for the safe and reliable transfer of sensitive financial data. Example: CloudThrottle employs encryption and compliance measures like GDPR and HIPAA when transferring financial data from cloud services, ensuring data integrity and security.

Multi-Cloud Compatibility—Diverse Cloud Service Support: CloudThrottle's ability to integrate with multiple cloud providers offers businesses a unified view of their cloud spending, regardless of the cloud services they use. Example: A business using both AWS and Azure can view consolidated financial reports on CloudThrottle, simplifying budget monitoring across different cloud environments.

Data Retrieval Configuration—Financial Data Collection: Persistent Data Collection: CloudThrottle is configured to routinely collect essential data related to cloud account spending and budget allocations. This continuous data collection is critical for effective budget control and strategic financial planning. Example: CloudThrottle automatically consistently collects information on expenditures and budget utilization, enabling continuous monitoring and timely adjustments.

Figure 30:
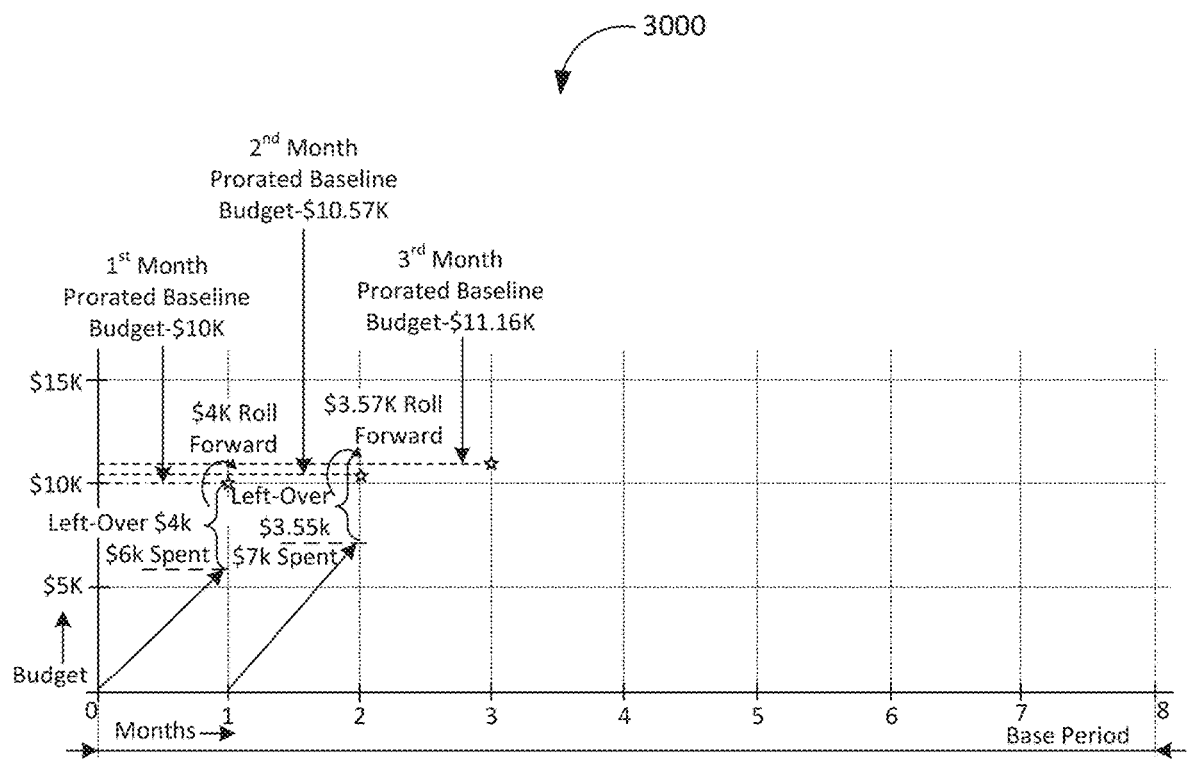
FIG. 30 is a graphical representation 3000 of a computation of a budget for a cloud account, in accordance with some embodiments.

FIG. 30 is a graphical representation 3000 of a computation of a budget for a cloud account, in accordance with some embodiments.

Base Budget: Refers to the initial or foundational financial plan or allocation amount for a specific project on a Cloud account. It serves as the starting point for budgeting and as a benchmark against any changes or modifications. The base budget sets the framework for financial planning and decision-making, providing a reference point for evaluating performance and determining the need for adjustments or additional funding.

Budget Prorate: CloudThrottle automatically prorates at the beginning of budget creation and during the end of every month, which allows for accurate tracking and reporting of budgetary performance of Cloud account/project spending.

Automated Budget Prorate: Budget proration involves proportionally allocating a budget based on a specific time period. It is used when a budget does not align precisely with a standard period, such as a fiscal year or calendar month. The total budget amount is divided or adjusted to match the duration of the given time period. Budget proration allows for accurate tracking and reporting of budgetary performance within specific timeframes. Example: If a budget is set for $120,000 for a 12-month period, the monthly budget proration would allocate $10,000 for each month.

This concept allows for more accurate tracking and reporting of budgetary performance within specific timeframes, providing a clearer picture of Cloud expenditures and enabling better decision-making.

Budget proration helps when there are changes or adjustments to the original budget during the course of a specific period. In such cases, the revised budget is prorated and allocated accordingly to reflect the updated financial plan. By utilizing the budget prorate concept, organizations can ensure that financial resources are allocated and managed appropriately, facilitating better control and visibility over their budgetary processes.

Budget Rollover: CloudThrottle automatically rollover any unused or unspent portion of a budget from the Cloud Account from one period to the next. Instead of resetting the budget to zero at the end of a specific time period, any remaining funds are carried forward and made available for use in subsequent periods. This ensures that the unutilized cloud budget is not lost but can be allocated and utilized effectively.

Budget rollover provides several benefits to organizations, including:

Continuity: Budget rollover allows for a seamless transition between budget periods, ensuring continuity in financial planning and resource allocation. It avoids disruptions caused by sudden budget resets and provides stability for ongoing projects and initiatives.

Efficient Resource Utilization: Carrying forward unused funds enables organizations to maximize the utilization of available resources. It allows for better planning and allocation of funds, especially for long-term projects that require consistent funding across multiple periods.

Improved Accuracy: Budget rollover enhances accuracy in financial forecasting and planning. By carrying forward the remaining budget, organizations can make more informed decisions based on actual spending patterns and adjust future budgets accordingly.

Strategic Flexibility: Budget carryover provides flexibility in adjusting budgets to align with changing business needs or priorities. Organizations can allocate carried-over funds to new initiatives, address unforeseen expenses, or capitalize on emerging opportunities.

Avoidance of "Use It or Lose It" Mentality: Budget rollover discourages a "use it or lose it" mentality, where departments or teams rush to spend their remaining budget at the end of a period to avoid losing funds. It promotes a more strategic and thoughtful approach to budget utilization throughout the year. Consider an example where a company has allocated an annual cloud budget of $120,000 for a cloud account, which breaks down to $10,000 per month. At the end of the first month, the actual cloud spending is only $8,000, leaving $2,000 unused. In a budget rollover scenario, this remaining $2,000 would be carried forward to the next budget period. Consequently, instead of starting with a fresh total budget of $110,000 for the remaining 11 months ($120,000−$10,000=$110,000), the total budget would be adjusted to $112,000 ($110,000+$2,000 from the unused funds), which equates to approximately $10,182 per month for the remaining 11 months ($112,000/11 months).

Moving on to the second month, if the actual spending amounts to $6,000, this leaves a surplus of $4,000 (not accounting for the previously rounded amount). This remaining $4,000 will be carried forward to the subsequent budget period, now spanning the remaining 10 months. Instead of starting with a fresh budget of $100,000 ($120,000−($10,000+$10,000)=$100,000), the adjusted total budget will be $106,000 ($112,000−$6,000 spent in the second month), which translates to $10,600 per month for the remaining 10 months ($106,000/10 months). In this way, CloudThrottle budget rollover ensures that the unutilized funds from previous periods are carried forward, allowing for more efficient allocation of resources and flexibility in budget management.

Figure 31:
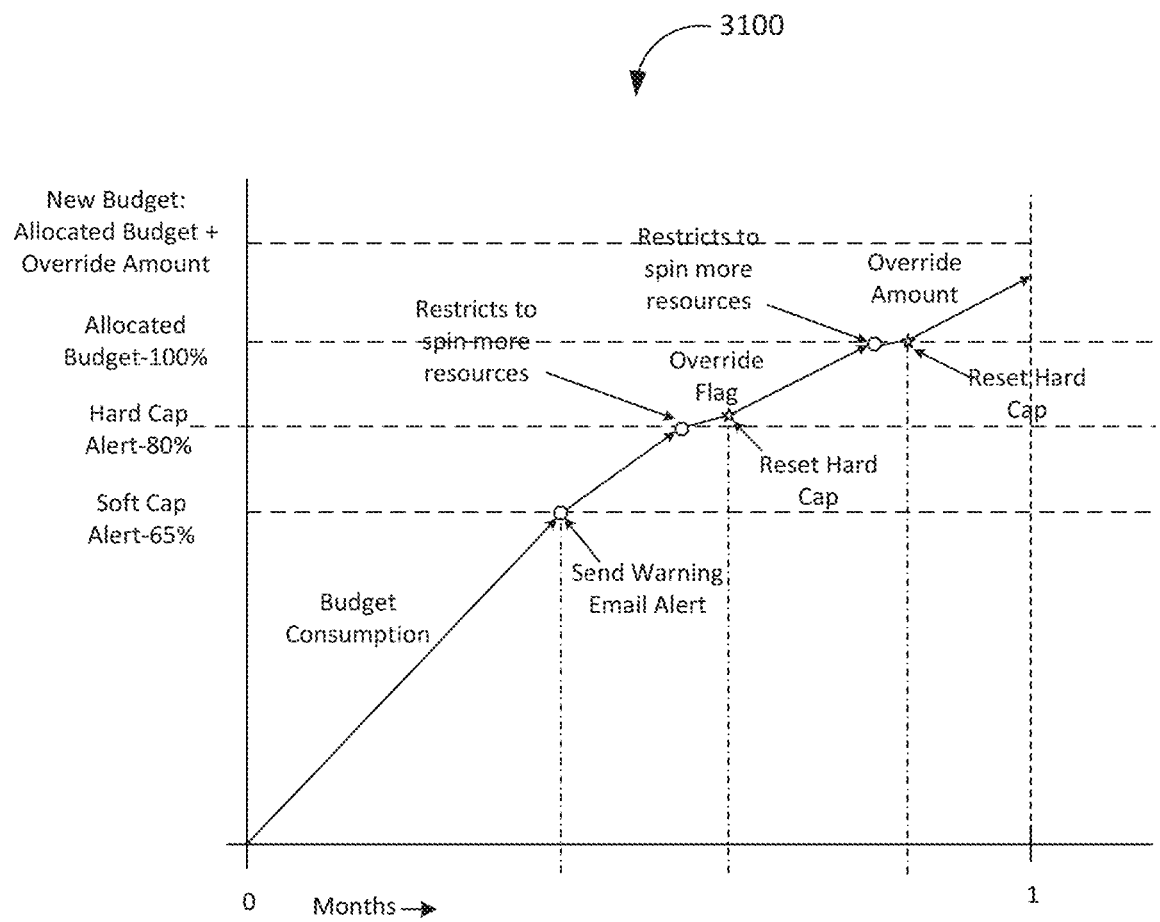
FIG. 31 is a graphical representation 3100 of a triggering of the budget for the cloud account and an overriding of the triggering of the budget, in accordance with some embodiments.

FIG. 31 is a graphical representation 3100 of a triggering of the budget for the cloud account and an overriding of the triggering of the budget, in accordance with some embodiments.

Budget Triggers and Thresholds: An essential component of effective financial management strategies. They serve as tools to monitor, evaluate, and control Cloud account budgets.

Budget triggers, seamlessly incorporated into the built-in workflow management system, are predefined events or conditions that initiate targeted actions or interventions in the budgeting process. These triggers are usually connected to the actual percentage spent from the monthly budget allocation and activate at set thresholds. Upon activation, they not only prompt stakeholders to scrutinize the current financial situation and assess its impact on the budget but also serve as a cautionary signal to the Project or Product team. This warning encourages the team to closely monitor trending budget expenditures, ensuring proactive measures are taken to maintain financial stability and alignment with the overarching organizational objectives.

Advisory Threshold (Soft-Cap) and Control Limit (Hard-Cap): Advisory Threshold and Control Limit are concepts associated with budget thresholds, representing different levels of limits or boundaries within budget management:

Advisory Threshold (Soft-Cap): A soft cap is a threshold that indicates a warning level or guideline within the Cloud budget. When the budget reaches or exceeds the Advisory Threshold, it signals that closer attention and monitoring are required. It prompts stakeholders to review spending patterns, reassess resource allocation, and take proactive measures to prevent further deviations or potential budget overruns. The Advisory Threshold provides flexibility for adjustments and proactive management. Additionally, in addition to the Advisory Threshold, multiple alert levels can be implemented, such as a Preliminary Warning Level for early awareness and an Urgent Action Level for immediate response requirements, each defined by specific percentage or absolute value thresholds.

Advisory Threshold (Soft-Cap) Example: Suppose a company establishes an Advisory Threshold of 65% for the monthly budget of an account to oversee and regulate cloud spending. When the monthly Cloud Spending approaches or exceeds this Advisory Threshold of 65%, it activates warning alerts to prompt scrutiny, evaluation, and alignment with the overall budget objectives. These alerts may escalate through various levels of urgency, triggering different responses tailored to the severity of the budget approach or exceedance.

Control Limit (Hard-Cap): On the other hand, a Control Limit represents a strict limit or boundary that must not be exceeded under any circumstances. It is an absolute maximum or ceiling on an allocated monthly budget. When the budget reaches or exceeds the Control Limit, it triggers immediate actions, such as restricting spinning more Cloud Resources, implementing cost-saving measures or it may simply serve to alert senior management and other key stakeholders, to evaluate the situation and decide on further steps. This flexibility ensures that executive decisions can be made based on current business priorities and conditions, potentially including approval to override preset percentage consumption on the monthly budget or to secure additional funding. Control Limits are put in place to enforce strict budgetary controls and prevent excessive cloud spending or financial risks.

Control Limit (Hard-Cap) Example: In this scenario, the company sets a Control Limit of 80% on the monthly budget for an account, which acts as the maximum limit for Cloud Spending. If the project expenses reach or exceed the 80% threshold, CloudThrottle restricts further resource allocation or may simply notify senior management and other key stakeholders, for immediate review. This allows for a tailored response, depending on the severity and context of the budget exceedance, whether that involves halting non-essential activities, renegotiating contracts, overriding the 80% cap, or securing additional funds if necessary.

Figure 32:
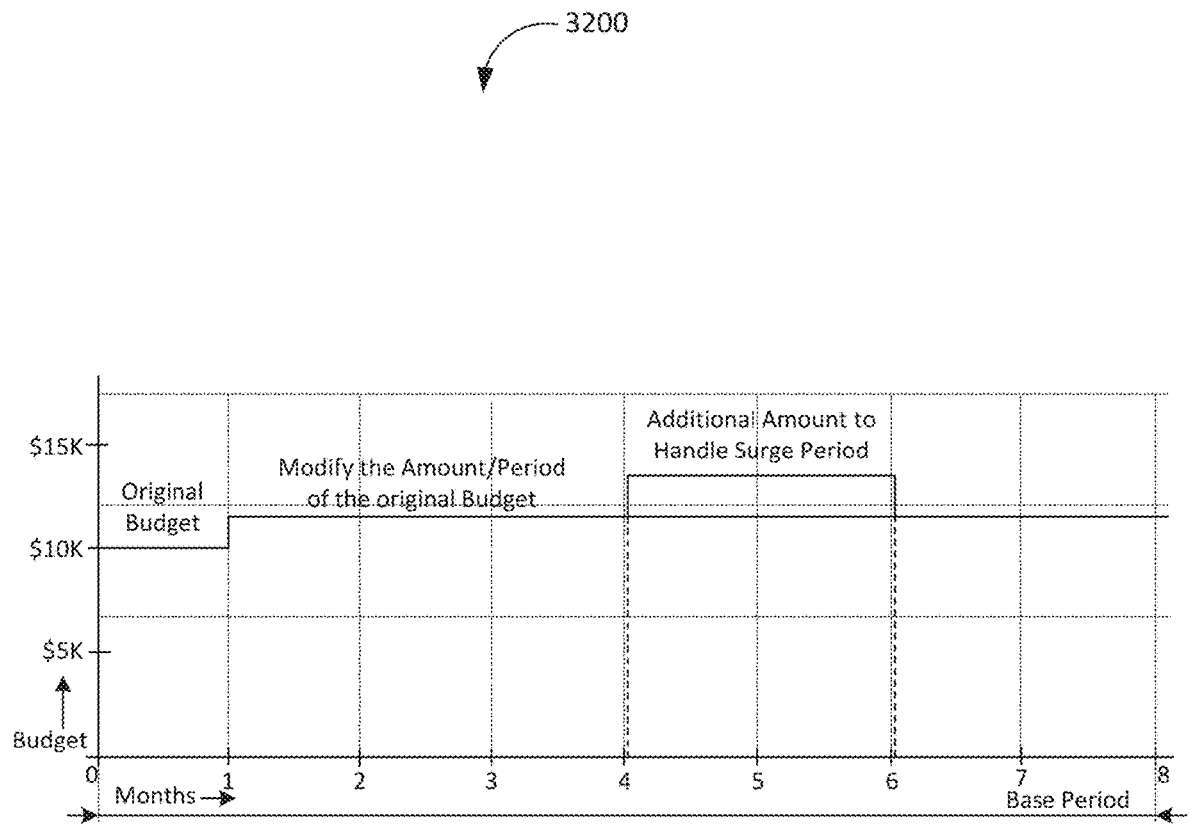
FIG. 32 is a graphical representation 3200 of a modification of the budget for the cloud account and an overriding of an amount of the budget, in accordance with some embodiments.

FIG. 32 is a graphical representation 3200 of a modification of the budget for the cloud account and an overriding of an amount of the budget, in accordance with some embodiments.

Budget Override and Additional Funds: Budget Overrides and Additional Funds play pivotal roles in budget management, empowering organizations and agencies to adapt to flexibility, and changing circumstances, address unexpected needs, and pursue strategic initiatives that surpass initial budget constraints. However, it is crucial to exercise proper justification and accountability when employing budget overrides and accessing additional funds. This preserves fiscal discipline, ensures efficient resource utilization, and mitigates the risk of cloud waste.

CloudThrottle offers two Budget Override settings to cater to different scenarios.

Budget Override Flag: This setting enables the Override Flag to surpass a Cloud account's predefined Control Limit (Hard-Cap) or budgetary limits. By activating the budget "Override Flag," the project gains access to the total 100% allocation of monthly funds, ensuring project continuity and fulfilling crucial operational requirements.

Consider a scenario where a company establishes a Control Limit (Hard-Cap) of 80% on the monthly budget for a Cloud account. Unexpected costs arise, causing the Cloud Spending to exceed 80% of the allocated budget. In this case, a Budget Override is granted, activating the "Override Flag" in the CloudThrottle to enable and allowing the project to utilize the remaining 20% of the budget to for addressing the unforeseen costs.

Budget Override Amount: Represents the additional funds granted to a project or cloud account in a specific month, exceeding the predefined budgetary limits or caps. Utilizing this CloudThrottle setting makes it possible to allocate an additional amount to the project for a specific month in addition to the monthly allocated budget.

Example: A project has a monthly budget of $10,000, but unforeseen costs arise in a specific month. A Budget Override is approved, providing an additional, say, $2,000 to address the unexpected expenses.

Additional funds: Refer to extra financial resources obtained or allocated to augment the existing budget for a specific period. These funds provide the flexibility to address unforeseen costs, extend project scope, support testing, experiment with new methodologies, or capitalize on strategic opportunities that exceed the original budgetary limits.

Example: A project with a $120,000 annual budget encounters an unexpected opportunity for a new proof of concept. To accommodate this activity, an additional $20,000 is allocated for a two-month period, without modifying the original budget. With these additional funds, the enabling project to expand its scope and successfully carry out the new proof of concept.

Budget Modification: Modifying the budget involves adjusting the allocated amount or budget period for a specific cloud account. This adjustment can include increasing or decreasing the budgeted amount or changing the duration of the budget period. The purpose of modifying the budget is to accommodate changes in project requirements, unexpected circumstances, or shifts in organizational priorities. By making these adjustments, the budget remains aligned with the project's needs and enables effective financial management throughout its lifecycle.

CloudThrottle provides the flexibility to modify the base budget. Example: Imagine a project with an initial budget of $120,000. However, as the project advances, it becomes apparent that additional resources are necessary to fulfill the evolving requirements. To accommodate this, the project manager changes the budget to $160,000.

CloudThrottle introduces a unified, centralized console that excels in managing the Budget Lifecycle and cloud budget spending across a multi-cloud environment. Tailored specifically to accommodate Federal contracts, fixed-price projects, and corporate settings, this platform continuously gathers data on cloud expenditures and budget utilization. It facilitates constant monitoring and swift adjustments while integrating workflow management features for handling scenarios like Budget Override Flag activation, Budget Override Amount setting, and Additional Funds Budget Modification. This ensures streamlined oversight and efficient management of cloud resources, enabling a cohesive budget control strategy in a diverse multi-cloud framework.

The Budget Overview Panel in CloudThrottle is further enhanced by the integration of alert-triggered statuses and a comprehensive overview sequence of events that have occurred in the budget lifecycle, such as modifications, overrides, and more. This addition not only provides users with a snapshot of essential budgetary information but also offers an in-depth audit trail detailing who made changes, what changes were made, and when these changes occurred. By including this level of detail, the panel ensures complete transparency and accountability in budget management, allowing for precise tracking of all actions taken within the budget. This feature is crucial for maintaining financial integrity and facilitating informed decision-making by providing a clear, chronological overview of budget-related events and modifications.

FIG. 33 is a screenshot of a Monthly Budget & Threshold Status interface 3300 of a software application for managing budgets for cloud accounts, in accordance with some embodiments.

Figure 34:
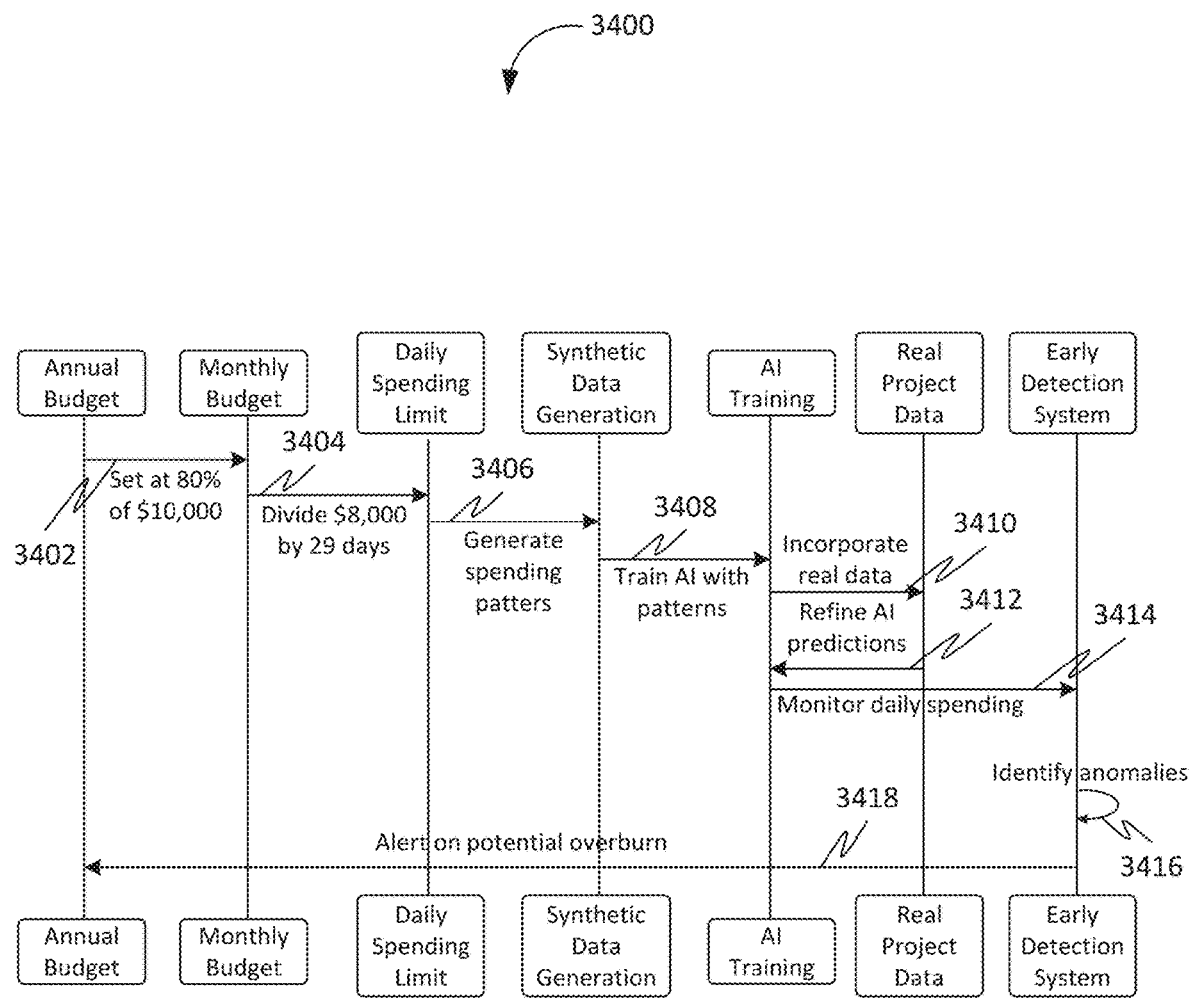
FIG. 34 is a flow diagram of a method 3400 for managing budgets for cloud accounts, in accordance with some embodiments.

FIG. 34 is a flow diagram of a method 3400 for managing budgets for cloud accounts, in accordance with some embodiments. Further, the method 3400 may include a step 3402 of setting 80% of $10,000, which is an annual budget for a cloud account, as a monthly budget. Further, the method 3400 may include a step 3404 of dividing $8,000, which is the monthly budget by 29 days, taking an average, for example, to calculate a daily spending limit. Further, the method 3400 may include a step 3406 of generating spending patterns for synthetic data generation. Further, the method 3400 may include a step 3408 of training an AI model with the patterns. Further, the method 3400 may include a step 3410 of incorporating real data associated with a project into the AI model training. Further, the method 3400 may include a step 3412 of refining predictions generated by the AI model. Further, the method 3400 may include a step 3414 of monitoring daily spending. Further, the method 3400 may include a step 3416 of identifying anomalies using an early detection system. Further, the method 3400 may include a step 3418 of generating an alert on potential over burn by the early detection system for updating the annual budget.

Figure 35:
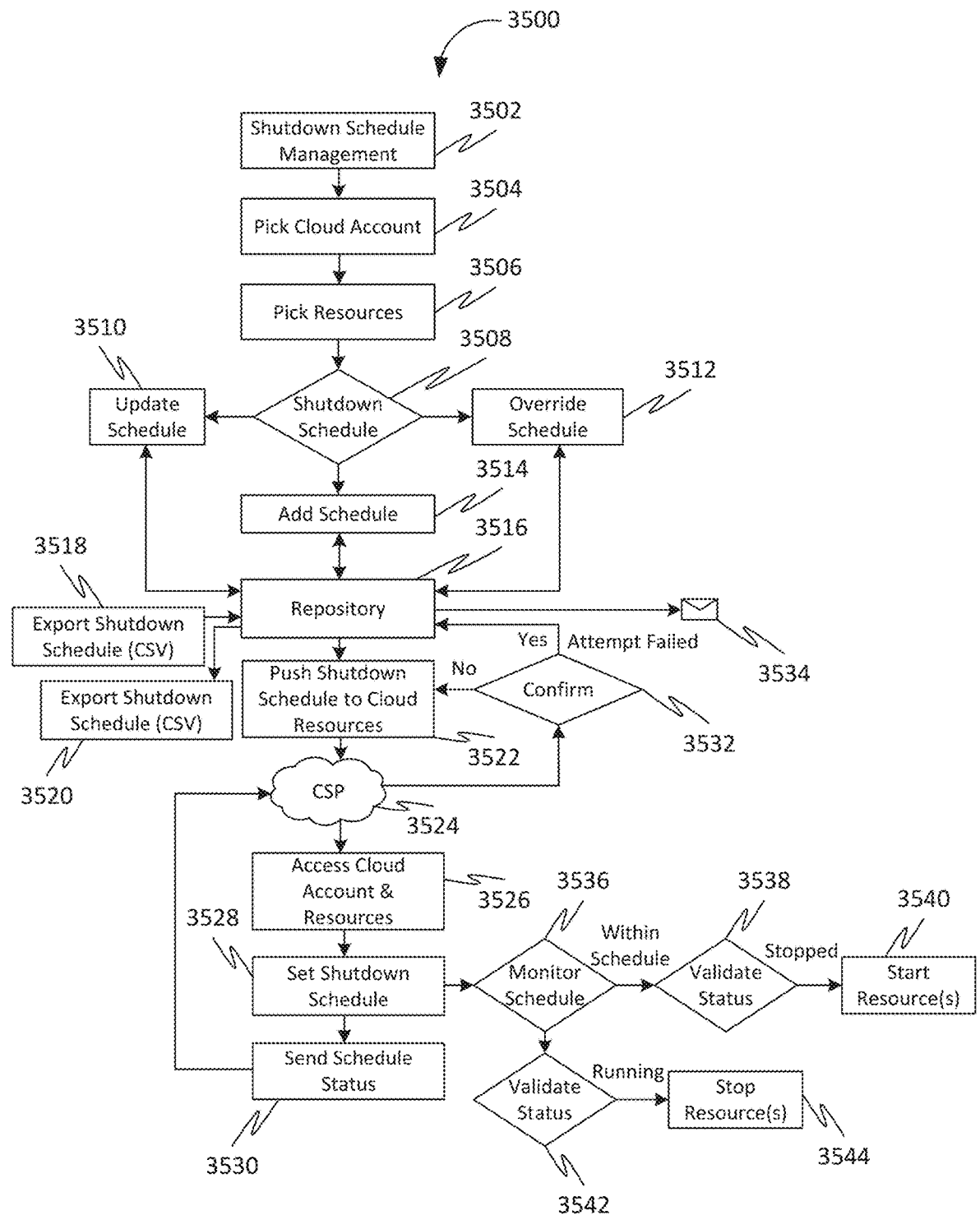
FIG. 35 is a flow diagram of a method 3500 for facilitating scheduling of resources, in accordance with some embodiments.
Figure 36:
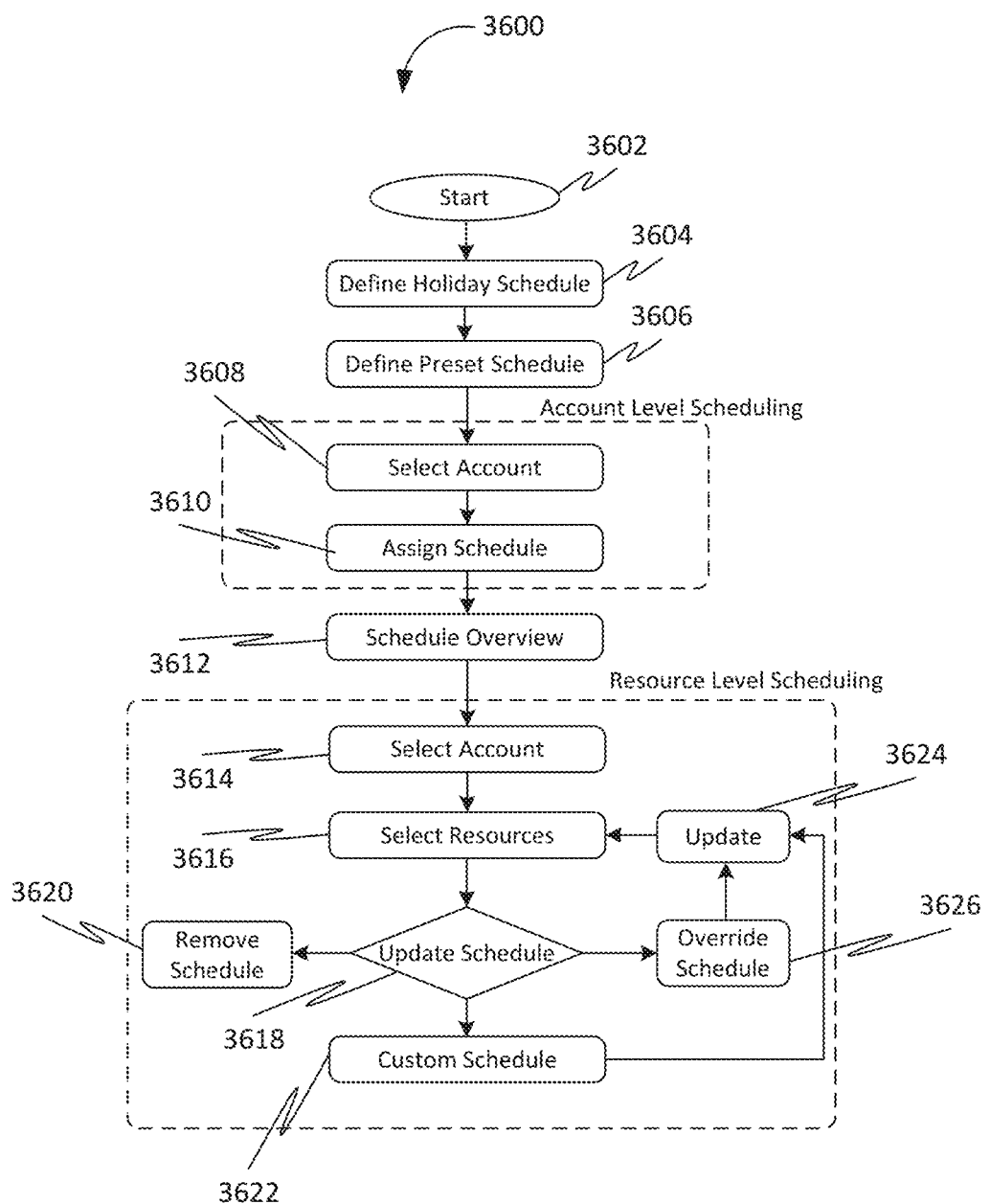
FIG. 36 is a flowchart of a method 3600 for facilitating scheduling of cloud resources, in accordance with some embodiments.

FIG. 35 is a flow diagram of a method 3500 for facilitating scheduling of resources, in accordance with some embodiments. Further, the method 3500 may include a step 3502 of initiating a shutdown schedule management. Further, the method 3500 may include a step 3504 of picking a cloud account. Further, the method 3500 may include a step 3506 of picking resources. Further, the method 3500 may include a step 3508 of determining a shutdown schedule. Further, the method 3500 may include a step 3510 of updating the schedule after the step 3508. Further, the method 3500 may include a step 3512 of overriding the schedule after the step 3508. Further, the method 3500 may include a step 3514 of adding the schedule after the step 3508. Further, the schedule may be added to a repository 3516. Further, the method 3500 may include a step 3518 of exporting shutdown schedule (CSV) to the repository 3516. Further, the method 3500 may include a step 3520 of exporting the shutdown schedule (CSV) from the repository 3516. Further, the method 3500 may include a step 3522 of pushing the shutdown schedule to cloud resources from the repository 3516 to a cloud service provider (CSP) 3524. Further, the method 3500 may include a step 3526 of accessing cloud accounts and resources from the CSP 3524. Further, the method 3500 may include a step 3528 of setting the shutdown schedule. Further, the method 3500 may include a step 3530 of sending the shutdown schedule to the CSP 3524. Further, the method 3500 may include a step 3532 of confirming the schedule. If the schedule is confirmed the schedule is moved to the repository 3516 and if the schedule is not confirmed the method 3500 moves to the step 3522. Further, the method 3500 may include a step 3534 of generating alerts/notifications. Further, the method 3500 may include a step 3536 of monitoring schedule after the step 3528. If resource utilization is within the schedule, the method 3500 may include a step 3538 of validating a status and if the status is stopped, the method 3500 may include a step 3540 of starting resources. Further, the method 3500 may include a step 3542 of validating status. If the resources are running, the method 3500 may include a step 3544 of stopping the resources FIG. 36 is a flowchart of a method 3600 for facilitating scheduling of cloud resources, in accordance with some embodiments. Further, the method 3600 may include a step 3602 of starting. Further, the method 3600 may include a step 3604 of defining a holiday schedule. Further, the method 3600 may include a step 3606 of defining a preset schedule. Further, the method 3600 may include a step 3608 of selecting an account. Further, the method 3600 may include a step 3610 of assigning a schedule. Further, the steps 3608 and 3610 may be associated with account level scheduling. Further, the method 3600 may include a step 3612 of providing a schedule overview. Further, the method 3600 may include a step 3614 of selecting an account. Further, the method 3600 may include a step 3616 of selecting resources. Further, the method 3600 may include a step 3618 of determining an update for the schedule. Further, the method 3600 may include a step 3620 of removing the schedule. Further, the method 3600 may include a step 3622 of customizing the schedule. Further, the method 3600 may include a step 3624 of updating. Further, the method 3600 moves to the step 3616 after the step 3624. Further, the method 3600 may include a step 3626 overriding the schedule. Further, the method moves to the step 3624 after the step 3626. Further, the steps 3614-3626 may be associated with resource level scheduling.

Further, the disclosed system may include an automated cloud resource scheduler. The cornerstone of CloudThrottle is its cloud resource scheduler. This dynamic feature automates the process of enabling and disabling cloud resources and ensures that these resources are available precisely when needed, thereby minimizing waste and optimizing utilization.

Further, the CloudThrottle provides a centralized platform for comprehensive control and visibility over resource scheduling. This empowers organizations to meticulously manage their cloud resource uptime and make informed decisions to optimize costs effectively. Further, the CloudThrottle may be configured for dual-level scheduling: Account and Resource Level. Further, the CloudThrottle may be configured to recognize the diverse needs of organizations, CloudThrottle offers two tiers of scheduling:

Account-Level Scheduling: Ideal for enterprises intending to schedule resources across an entire cloud account (as shown in FIG. 37).

Figure 38:
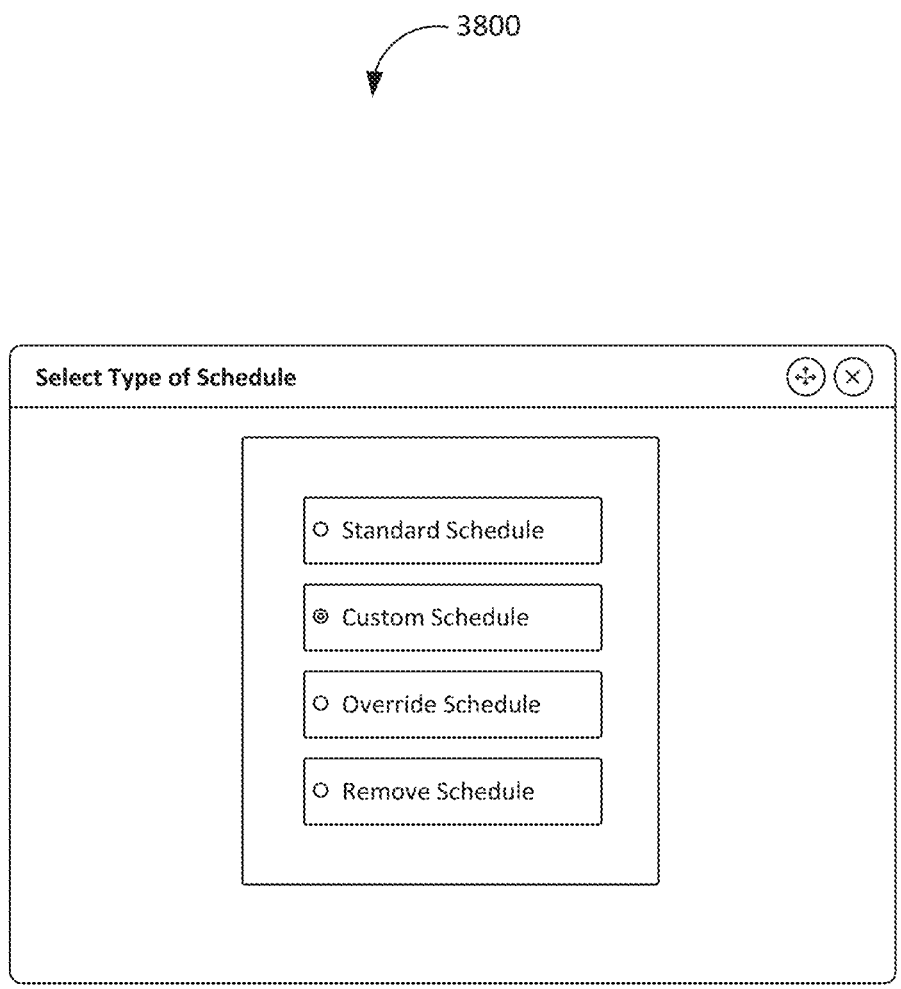
FIG. 38 is a screenshot of a Select Type of Schedule interface 3800 of the software application, in accordance with some embodiments.

Resource-Level Scheduling: Tailored for situations where specific resources within an account require individual scheduling (as shown in FIG. 38).

Figure 39:
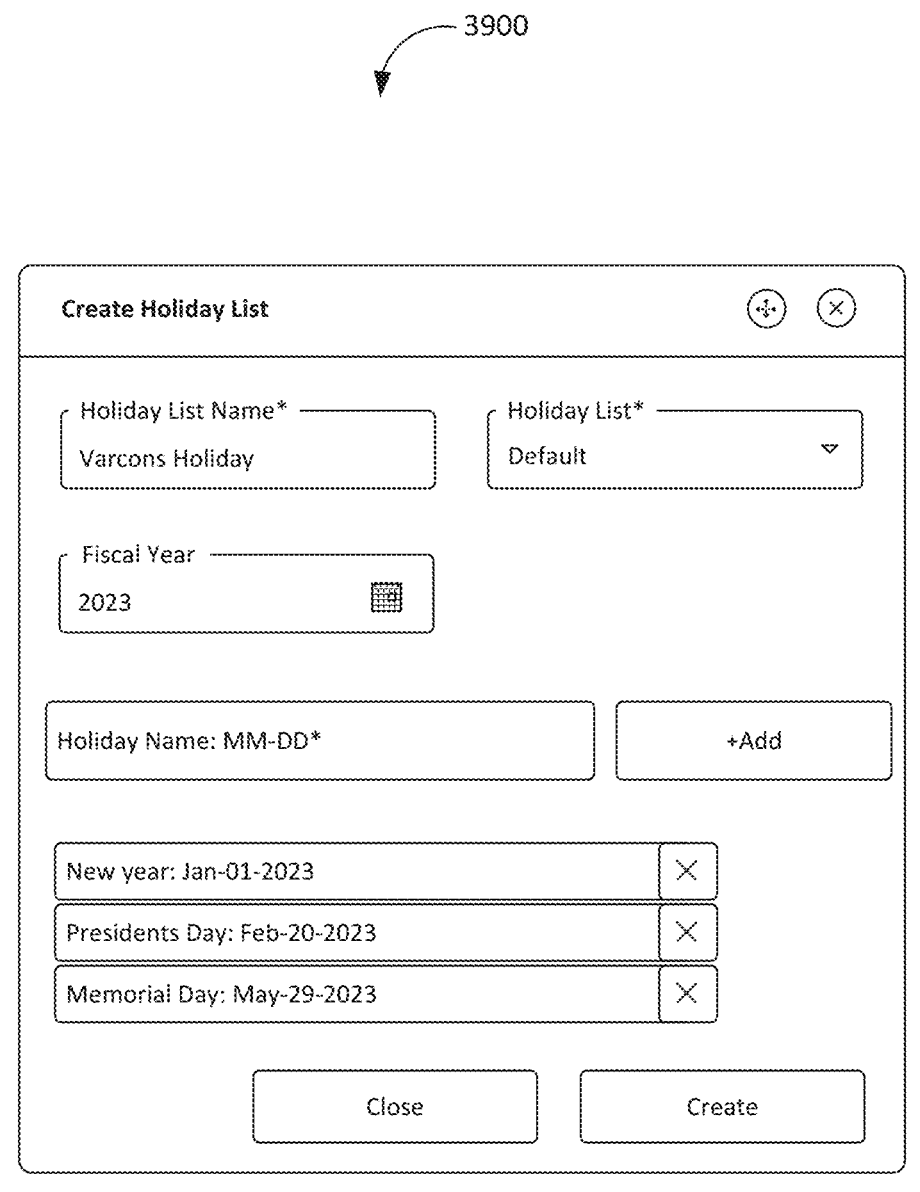

Further, the method may include holiday schedule integration (as shown in FIG. 39). An innovative aspect of CloudThrottle is its integration of company-specific holiday schedules. This feature automatically shuts down cloud resources during non-operational days, streamlining the process and standardizing downtime for cloud resources.

Figure 40:
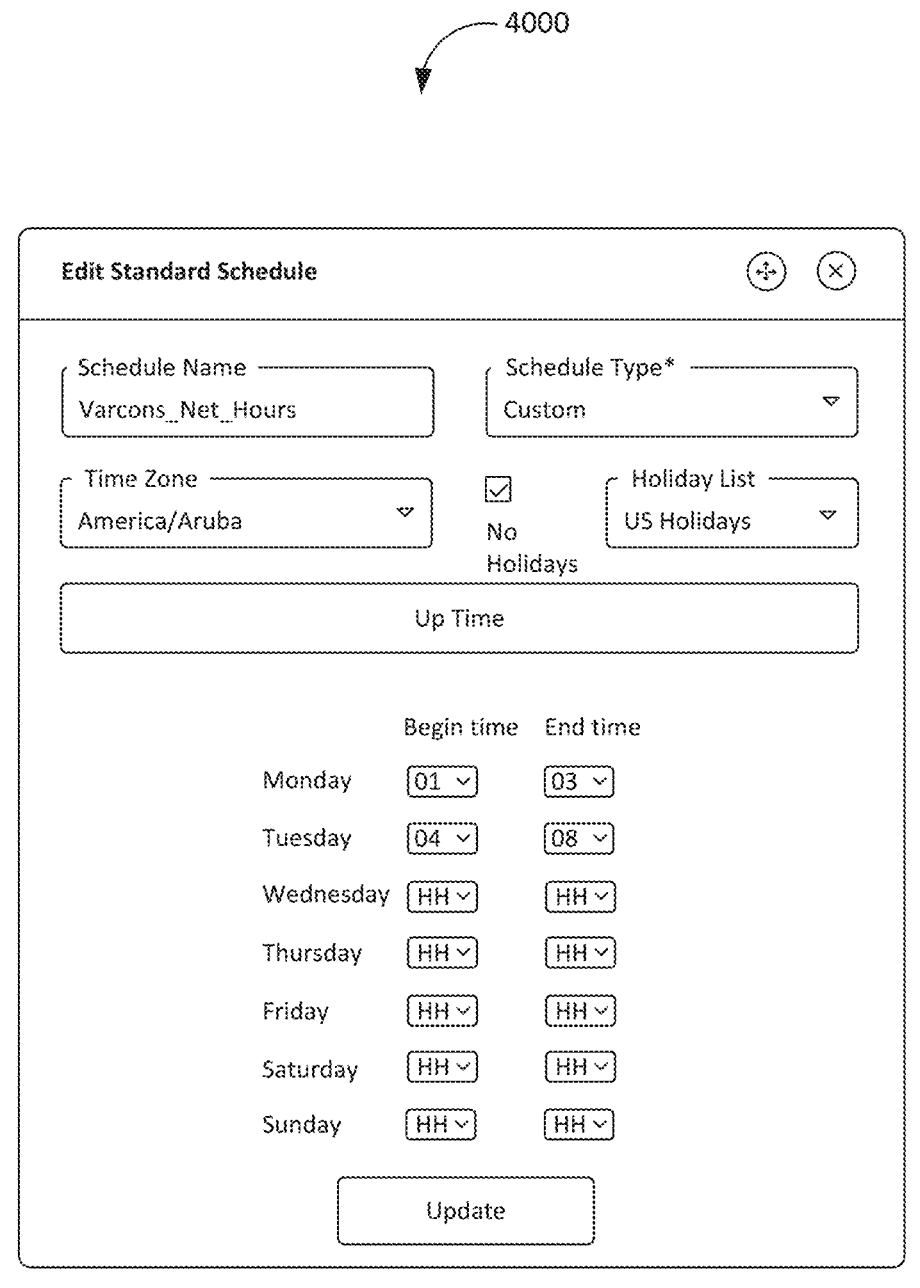

Further, the method may include defining preset schedules for operational efficiency (as shown in FIG. 40). Preset schedules are a pivotal component of CloudThrottle. The Preset schedules are pre-determined timetables that outline the availability of cloud resources, ensuring they are active only during necessary operational hours. By standardizing operational hours, the preset schedules offer a consistent and efficient approach to resource management.

Figure 41:
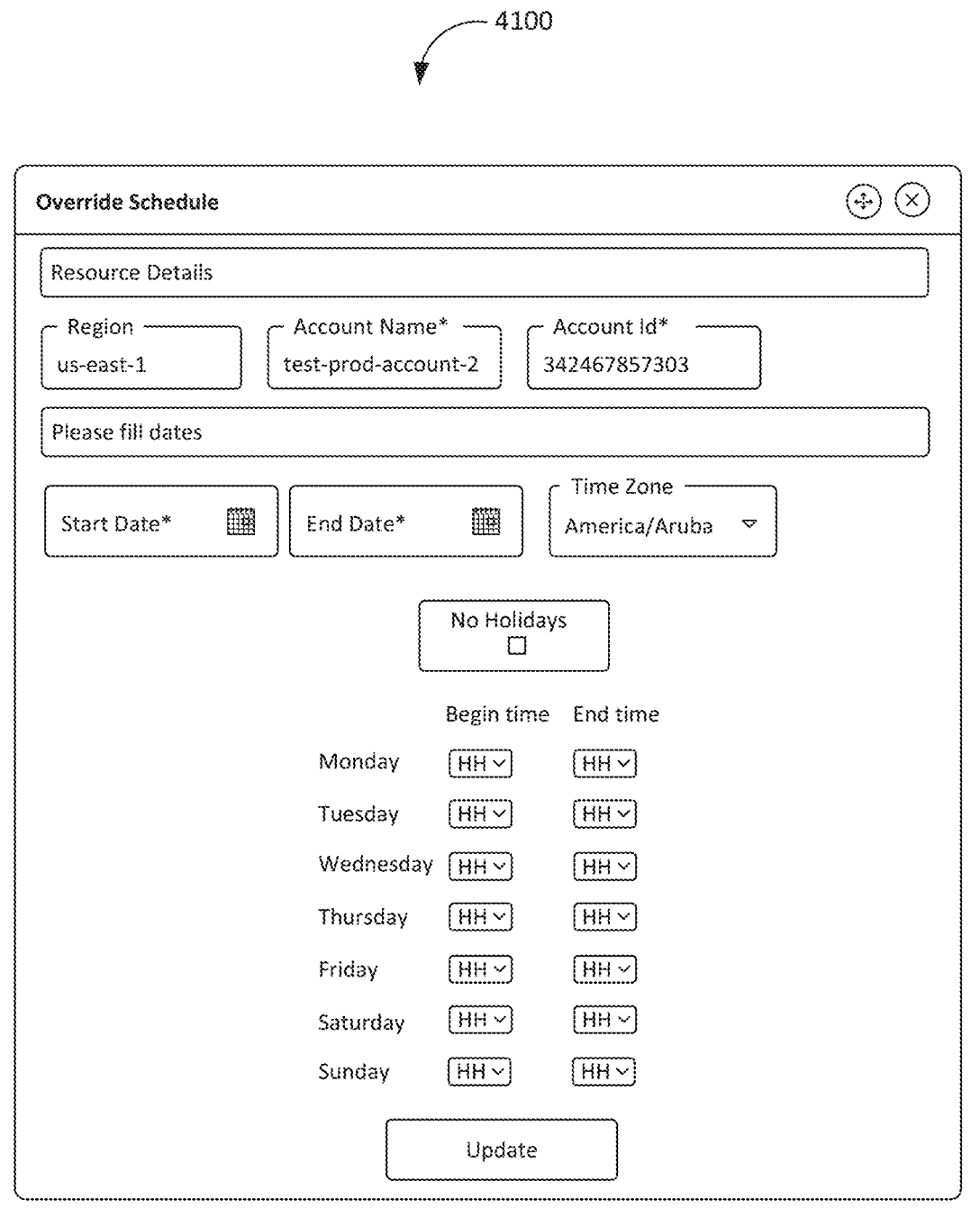

Further, the method may include scheduling override for flexibility (as shown in FIG. 41). In addition to these features, CloudThrottle introduces a crucial strategy: Schedule Override. This function allows users to modify an already running schedule to accommodate urgent needs, such as reaching deadlines or conducting off-hours testing. By simply specifying the days of the week, the users may override the existing schedule with a new one, ensuring system availability during critical periods.

Customization and Easy Setup: CloudThrottle is designed with flexibility in mind. Companies can establish a list of holiday schedules specific to their operations, integrating these into the setup process of both Preset and Custom Schedules. This level of customization ensures that resource utilization aligns seamlessly with the unique operational rhythms of each organization.

FIG. 37 is a screenshot of an Update Schedule interface 3700 of a software application for facilitating managing budgets for cloud accounts, in accordance with some embodiments.

FIG. 38 is a screenshot of a Select Type of Schedule interface 3800 of the software application, in accordance with some embodiments.

FIG. 39 is a screenshot of a Create Holiday List interface 3900 of the software application, in accordance with some embodiments.

FIG. 40 is a screenshot of an Edit Standard Schedule interface 4000 of the software application, in accordance with some embodiments.

FIG. 41 is a screenshot of an Override Schedule interface 4100 of the software application, in accordance with some embodiments.

Figure 42:
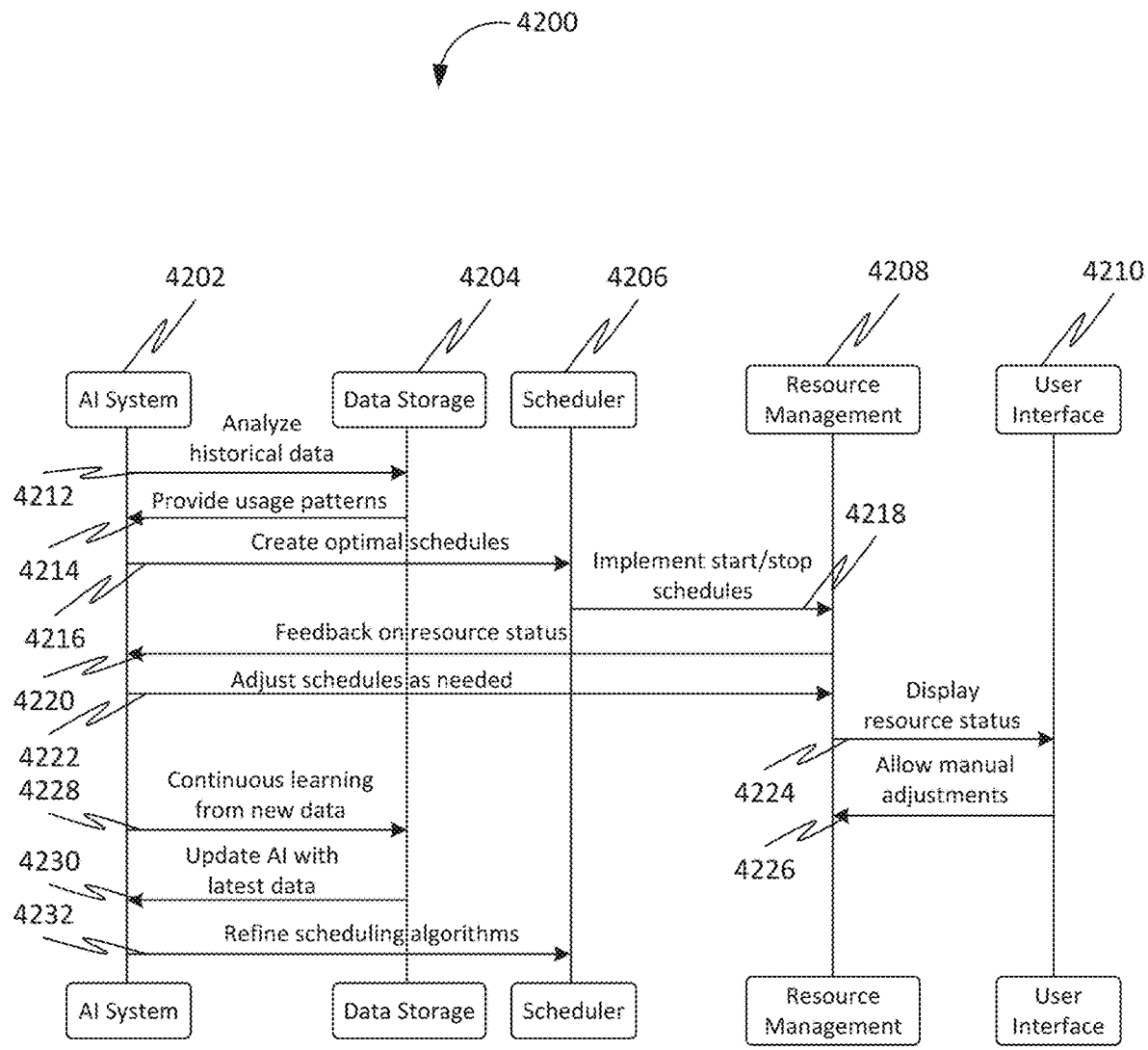
FIG. 42 is a flow diagram of a method 4200 for facilitating optimizing cloud resource utilization using a ProActive Resource Management System (ProRMS), in accordance with some embodiments.

FIG. 42 is a flow diagram of a method 4200 for facilitating optimizing cloud resource utilization using a ProActive Resource Management System (ProRMS), in accordance with some embodiments. Accordingly, the method 4200 may represent a flow of operations and interactions between various components associated with the ProActive Resource Management System (ProRMS) over time. Further, the components may include an AI system 4202, a data storage 4204, a scheduler 4206, a resource management 4208, and a user interface 4210.

Further, at 4212 of the method 4200, the AI system 4202 interacts with the data storage 4204 for analyzing historical data. Further, at 4214 of the method 4200, the data storage 4204 interacts with the AI system 4202 to provide usage patterns. Further, at 4216 of the method 4200, the AI system 4202 interacts with the scheduler 4206 to create optimal schedules. Further, at 4218 of the method 4200, the scheduler 4206 may interact with the resource management 4208 to implement start/stop schedules. Further, at 4220 of the method 4200, the resource management 4208 may interact with the AI system 4202 to provide feedback on resource status. Further, at 4222 of the method 4200, the AI system 4202 interacts with the resource management 4208 to adjust schedules as needed. Further, at 4224 of the method 4200, the resource management 4208 may interact with the user interface 4210 to display resource status. Further, at 4226 of the method 4200, the user interface 4210 may interact with the resource management 4208 to allow manual adjustments. Further, at 4228 of the method 4200, the AI system 4202 may interact with the data storage 4204 to continuously learn from new data. Further, at 4230 of the method 4200, the data storage 4204 may interact with the AI system 4202 to update the AI model with the latest data. Further, at 4232 of the method 4200, the AI system 4202 may interact with the scheduler 4206 to refine scheduling algorithms.

Further, the ProActive Resource Management System (ProRMS) may be associated with the CloudThrottle. Further, the CloudThrottle may be configured for integrating AI to automate resource scheduling, focusing on identifying peak and non-peak hours to optimize cloud resource utilization and reduce costs. Further, the disclosed system may utilize AI to identify resources that are underutilized or not required during non-peak or off hours. Further, the disclosed system may actively manage the status of these resources using CloudThrottle's Scheduler to minimize cloud costs.

Further, the disclosed system may be configured for data analysis and pattern recognition.

Resource Utilization Analysis: The disclosed AI system analyzes historical data on cloud resource usage, identifying patterns of high and low demand.

Peak and Non-Peak Identification: AI algorithms are employed to distinguish between peak and non-peak hours, focusing on times when certain resources are underutilized or not needed.

Further, the disclosed system may be configured for intelligent scheduling logic development. Further, based on the AI's analysis, the CloudThrottle's Scheduler is programmed to create schedules for starting up and shutting down resources. Further, the Scheduler allows for customization based on specific organizational needs and patterns identified by the AI.

Further, the disclosed system may be configured for AI model training and integration. Further, the disclosed system may be configured for model training. The AI model is trained using the collected data, ensuring it accurately identifies low utilization periods and resource requirements. The trained AI model is integrated into CloudThrottle, enabling it to control the Scheduler based on its predictions. Further, the disclosed system may be configured for automated resource management. The scheduler actively manages resources, automatically adjusting their status based on the AI-driven schedule. Further, the disclosed system may be configured for efficiency optimization. This automation ensures resources are only active when needed, significantly reducing unnecessary cloud costs. A feedback loop may be established for continuous learning, allowing the AI to adapt to changing usage patterns and organizational needs. Further, the AI model is regularly updated with new data to refine its scheduling predictions and maintain cost efficiency. Further, the disclosed system may provide a user interface. Further, the CloudThrottle provides a user interface where users can monitor the AI's scheduling decisions and manually adjust settings if necessary. Further, the users may track the impact of AI-driven scheduling on resource utilization and cost savings.

The system undergoes regular evaluations to ensure optimal performance and accuracy of the AI predictions. Further, the CloudThrottle continuously updates the AI algorithms and Scheduler based on user feedback and evolving cloud management practices.

By implementing AI-driven resource scheduling, the CloudThrottle effectively learns usage patterns to automate resource management, leading to significant cost savings and enhanced efficiency. This integration is a crucial advancement in commitment to providing intelligent, automated solutions for cloud cost optimization, particularly in managing Federal projects. Further, the disclosed system may significantly reduce resource wastage, a common challenge in Federal and large-scale organizational environments where cloud assets often remain idle outside of active development hours.

Figure 43:
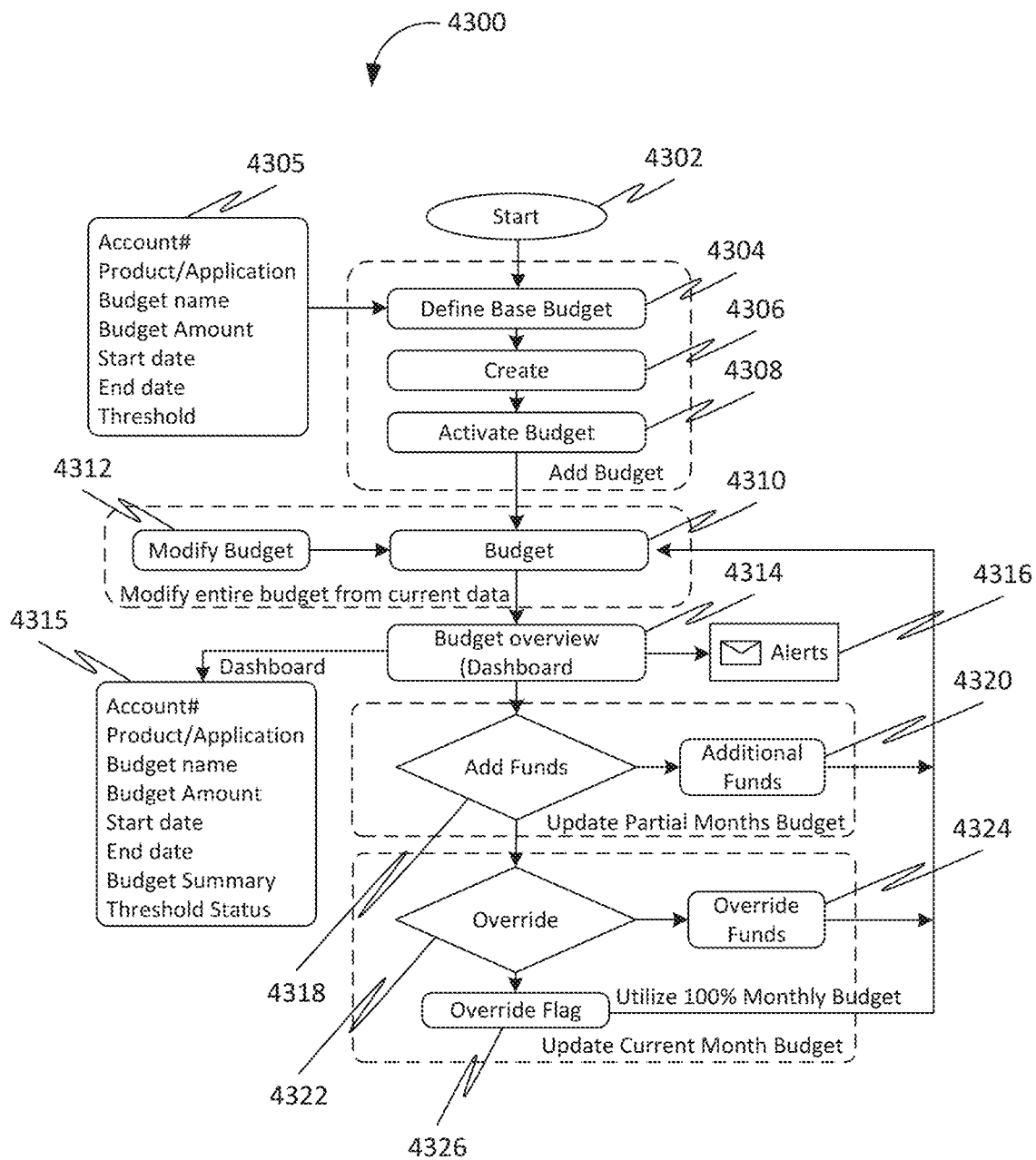
FIG. 43 is a flow diagram of a method 4300 for setting a budget using CloudThrottle for facilitating managing budgets for cloud accounts, in accordance with some embodiments.

FIG. 43 is a flow diagram of a method 4300 for setting a budget using CloudThrottle for facilitating managing budgets for cloud accounts, in accordance with some embodiments. Further, the method 4300 may include a step 4302 of starting. Further, the method 4300 may include a step 4304 of defining a base budget using information associated with an account (cloud account). Further, the method 4300 may include a step 4305 of receiving the information. Further, the information may include product/application, budget name, budget amount, start date, end date, threshold, etc. Further, the method 4300 may include a step 4306 of creating the budget. Further, the method 4300 may include a step 4308 of activating the budget. Further, the steps 4304, 4306, and 4308 may be associated with adding the budget. Further, the method 4300 may include a step 4310 of defining the budget. Further, the method 4300 may include a step 4312 of modifying the budget defined in the step 4310. Further, the steps 4310 and 4312 may be associated with modifying the entire budget from the current data. Further, the method 4300 may include a step 4314 of determining a budget overview. Further, the method 4300 may include a step 4315 of presenting the budget overview using a dashboard. Further, the budget overview may be associated with the account. Further, the budget overview may include the product/application, the budget name, the budget amount, the start date, the end date, a budget summary, a threshold status, etc. Further, the method 4300 may include a step 4316 of generating alerts. Further, the method 4300 may include a step 4318 of adding funds. Further, the method 4300 may include a step 4320 of adding additional funds. Further, the method 4300 moves to step 4310 after the step 4320. Further, steps 4318 and 4320 may be associated with updating partial months' budget. Further, the method 4300 may include a step 4322 of overriding the budget. Further, the method 4300 may include a step 4326 of determining an override flag. Further, the method 4300 may include a step 4324 of overriding funds. Further, the method 4300 moves to the step 4310 after the steps 4324 and 4326.

Figure 44:
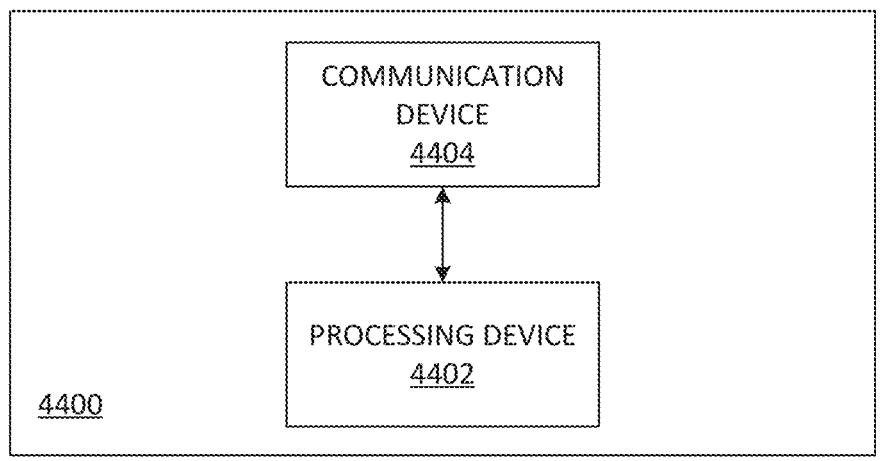
FIG. 44 is a block diagram of a system 4400 for facilitating cloud budget management based on artificial intelligence, in accordance with some embodiments.

FIG. 44 is a block diagram of a system 4400 for facilitating cloud budget management based on artificial intelligence, in accordance with some embodiments. Accordingly, the system 4400 may include a processing device 4402 configured for obtaining at least one synthetic data. Further, the at least one synthetic data may include a dataset designed to simulate the range of scenarios that might occur in real project management.

Further, the processing device 4402 may be configured for training at least one artificial intelligence model based on the at least one synthetic data. Further, the at least one artificial intelligence model may be configured for recognizing standard spending patterns and identifying anomalies or unexpected spikes.

Further, the processing device 4402 may be configured for analyzing at least one project data using the at least one artificial intelligence model. Further, the processing device 4402 may be configured for determining a cloud usage information based on the analyzing. Further, in some embodiments, the determining of the cloud usage information may include determining the cloud usage information in real time.

Further, the processing device 4402 may be configured for processing the cloud usage information. Further, in some embodiments, the processing of the cloud usage information may be based on a daily expenditure threshold. Further, in an instance, the daily expenditure threshold may be $275. Further, the processing device 4402 may be configured for determining a cloud usage pattern information associated with a cloud usage pattern based on the processing of the cloud usage information. Further, the cloud usage pattern information may include at least one cloud usage attribute indicating a usage style associated with the cloud. Further, the cloud usage attributes may include a daily spending amount and spending pattern such as sudden spikes or consistently higher daily expenditures, etc.

Further, the processing device 4402 may be configured for determining a criticality level associated with the at least one cloud usage attribute.

Further, the processing device 4402 may be configured for generating at least one alert based on the criticality level.

Further, the system 4400 may include a communication device 4404 configured for receiving the at least one project data from at least one device. Further, the at least one device may include a smartphone, a tablet, a laptop, a computer, and so on that may be associated with at least one user. Further, the at least one user may include an individual, an institution, and an organization. Further, the communication device 4402 may be configured for transmitting the at least one alert to the at least one device.

Figure 45:
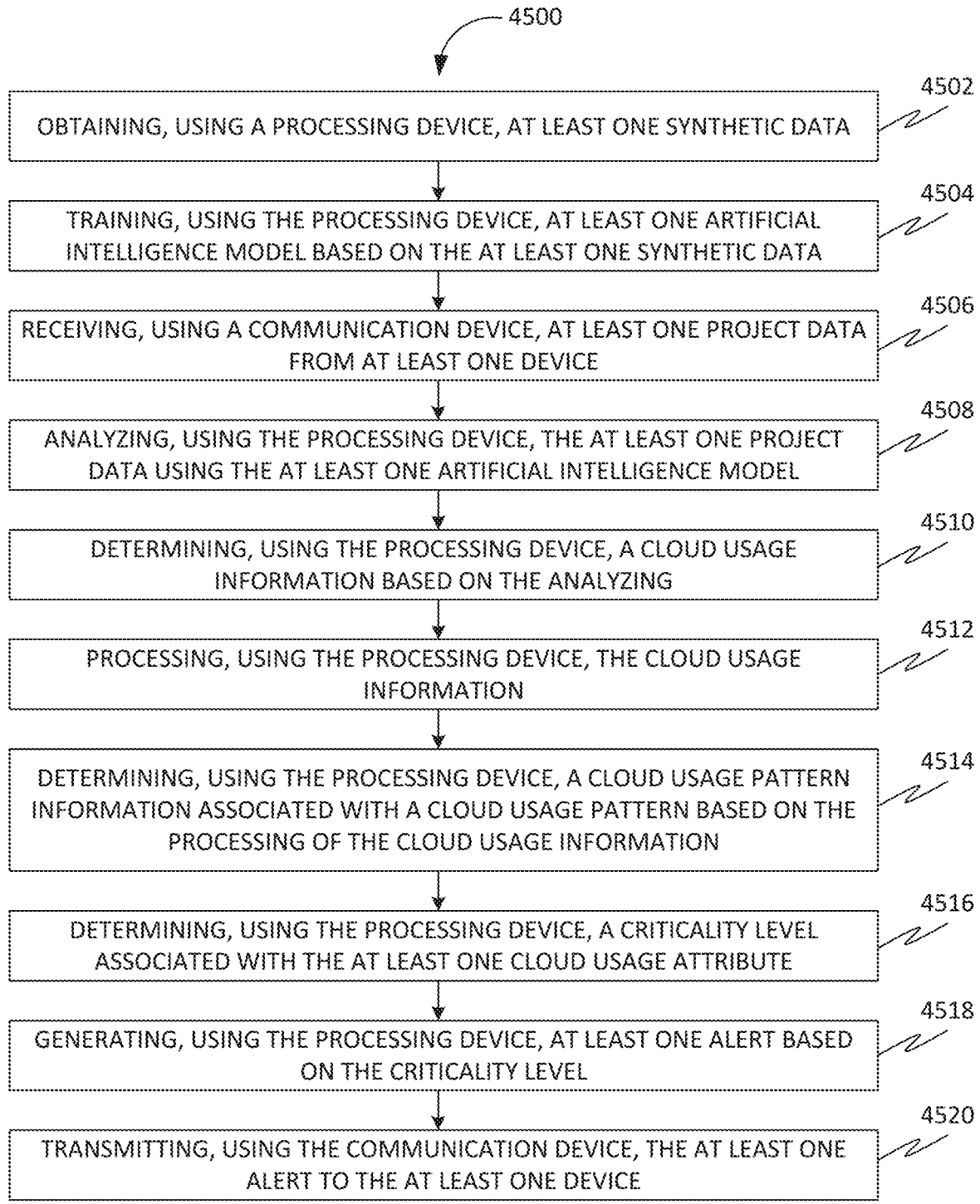
FIG. 45 is a flow chart of a method 4500 for facilitating cloud budget management based on artificial intelligence, in accordance with some embodiments.

FIG. 45 is a flow chart of a method 4500 for facilitating cloud budget management based on artificial intelligence, in accordance with some embodiments. Accordingly, at 4502, the method 4500 may include obtaining, using a processing device, at least one synthetic data.

Further, at 4504, the method 4500 may include training, using the processing device, at least one artificial intelligence model based on the at least one synthetic data. Further, the at least one artificial intelligence model may be configured for recognizing standard spending patterns and identifying anomalies or unexpected spikes.

Further, at 4506, the method 4500 may include receiving, using a communication device, at least one project data from at least one device. Further, the at least one device may include a smartphone, a tablet, a laptop, a computer, and so on that may be associated with at least one user. Further, the at least one user may include an individual, an institution, and an organization.

Further, at 4508, the method 4500 may include analyzing, using the processing device, the at least one project data using the at least one artificial intelligence model.

Further, at 4510, the method 4500 may include determining, using the processing device, a cloud usage information based on the analyzing. Further, in some embodiments, the determining of the cloud usage information may include determining the cloud usage information in real time.

Further, at 4512, the method 4500 may include processing, using the processing device, the cloud usage information. Further, in some embodiments, the processing of the cloud usage information may be based on a daily expenditure threshold. Further, the daily expenditure threshold may be $275.

Further, at 4514, the method 4500 may include determining, using the processing device, a cloud usage pattern information associated with a cloud usage pattern based on the processing of the cloud usage information. Further, the cloud usage pattern information may include at least one cloud usage attribute indicating a usage style associated with the cloud. Further, the cloud usage attributes may include a daily spending amount and spending pattern such as sudden spikes or consistently higher daily expenditures, etc.

Further, at 4516, the method 4500 may include determining, using the processing device, a criticality level associated with the at least one cloud usage attribute.

Further, at 4518, the method 4500 may include generating, using the processing device, at least one alert based on the criticality level.

Further, at 4520, the method 4500 may include transmitting, using the communication device, the at least one alert to the at least one device.

According to some aspects, a method for real-time financial monitoring in cloud computing environments is disclosed. Further, the method may include establishing secure connections with multiple cloud service providers via their respective Application Programming Interfaces (APIs) or any other mechanism. Further, the method may include fetching real-time financial data from the connected cloud service providers, wherein said financial data includes expenditures, budget allocations, and resource utilization metrics, among others. Further, the method may include analyzing the fetched financial data to identify current spending trends, budget utilization, and potential cost-saving opportunities. Further, the method may include integrating the fetched and analyzed financial data across various storage types and cloud services to provide a comprehensive financial overview. Further, the method may include utilizing the integrated financial data for real-time budget monitoring and management, wherein such real-time monitoring facilitates the immediate identification of anomalies, overspending, or underutilization of resources. Further, the method may include implementing a secure data handling and processing framework that complies with data privacy standards, including but not limited to GDPR and HIPAA, to safeguard the integrity and confidentiality of the financial data. Further, the method may include providing a user interface that displays the analyzed financial data, enabling users to make informed decisions regarding cloud cost management, budget adjustments, and resource allocation in real-time.

Further, according to some aspects, the method may include customizing the analysis of financial data based on user-defined parameters, which may include specific cloud services, budgetary thresholds, and financial goals, thereby enhancing the method's adaptability to user needs.

Further, according to some aspects, the fetching and analysis of real-time financial data are automated through scheduled tasks, thus enabling continuous monitoring without the need for manual intervention and ensuring timely detection and response to financial dynamics.

Further, according to some aspects, the method may include generation of alerts and notifications based on predefined criteria related to budget utilization and financial thresholds, thereby facilitating proactive financial management through timely interventions.

According to some aspects, advanced budget monitoring and management for Federal and commercial contracting is disclosed. Further, the advanced budget monitoring and management introduces an advanced system designed for the monitoring and managing cloud budgets, specifically tailored to meet the unique requirements of Federal and commercial contracting, including fixed-price budget projects. By leveraging foundational real-time financial data access through comprehensive API or any other similar mechanism integration with cloud service providers, the system adeptly navigates the complexities and stringent regulatory requirements of Federal and commercial cloud expenditures. Importantly, it is suited for all sizes of businesses and startups, aiming to achieve control over cloud costs and ensuring that organizations, regardless of their scale, can benefit from optimized cloud financial management. Further, key features tailored for Federal and commercial contracting of the system are as follows:

Contract lifecycle alignment: The system is meticulously crafted to align with the general lifecycle of Federal and commercial contracts, from initiation through completion. It accommodates specific budgetary cycles, reporting requirements, and compliance mandates inherent to federal contracting, ensuring adherence to Federal Acquisition Regulations (FAR) and other relevant standards. This alignment is vital for managing contracts across various funding structures, including fixed-price projects, where budget management and reporting accuracy are paramount.

Fixed-price project budget management: This system introduces an advanced approach to managing and monitoring budgets established for fixed-price projects across all sectors. It provides a comprehensive solution for the detailed tracking of expenditures against a predetermined budget, ensuring that spending remains within the allocated limits for the budgeting period. This functionality is pivotal for any organization aiming to maintain financial discipline and efficiency, ensuring that projects stay within their allocated funding without overstepping budgetary constraints.

Proration for contract periods: Features an automated budget proration capability that aligns budget allocations with project milestones and periods, including the specific challenges posed by fixed-price projects or contracts. This ensures accurate budget allocations throughout the project's duration, facilitating precise financial planning and control.

Rollover for fiscal compliance: The system presents a flexible budget rollover system adaptable to diverse fiscal practices, enabling effective management of unspent funds. This innovative system allows for the seamless carrying forward of unused budgets to future periods or the strategic reallocation of funds according to organizational needs. By promoting financial discipline and budgetary efficiency, it serves a broad spectrum of business environments, ensuring that entities of any size can maintain fiscal health and operational agility.

Override for financial flexibility: The system introduces a budget override function designed to offer unparalleled flexibility and adaptability in budget management. This feature allows organizations to make timely adjustments to their budgets in response to unforeseen project requirements, scope changes, or other operational shifts. It provides the essential fiscal agility needed to navigate the dynamic business landscape, ensuring that organizations can maintain financial discipline while adapting to changing circumstances. This functionality is crafted to support a wide array of contractual arrangements and business models, ensuring its applicability beyond specific contract types or pricing agreements.

Modification for dynamic financial management: This feature introduces advanced budget modification capabilities designed to adapt to any changes in project scope, business objectives, or operational requirements. It enables organizations to meticulously manage their budgets, ensuring that adjustments can be made smoothly without compromising the overall financial strategy. This flexibility is crucial for maintaining financial discipline across various project types and funding arrangements, supporting the continuous optimization of cloud spending in alignment with evolving business needs and strategic goals.

Integration and value for federal and commercial contracting: Seamlessly integrated with cloud service platforms, the system utilizes APIs or any other similar mechanisms to access crucial real-time financial data for effective Federal and commercial contract management. Designed with the complexities of federal contracting in mind, it provides financial managers and contract administrators with a centralized, intuitive interface for efficient planning, monitoring, and adjusting of cloud budgets. Advanced analytics and customized reporting functionalities offer insights into budget performance against contract milestones, spending trends, and compliance with federal financial management standards.

Value Proposition: CloudThrottle system represents a strategic advancement in dynamically and efficiently managing cloud budgets, addressing critical challenges such as compliance with regulations, alignment with project milestones, efficient utilization of allocated funds, and adaptability to modifications. While it ensures that cloud spending is strategic, compliant, and adaptable to the intricacies of federal and commercial contracting, it is equally suited for businesses of all sizes, including startups, aiming to achieve stringent control over cloud costs. This broad applicability empowers organizations to enhance fiscal discipline and strategic resource allocation, mirroring the rigorous budget monitoring and control expected in federal contexts but tailored to meet the diverse needs of the modem business landscape.

According to some aspects, a ProActive Budget Alert System (ProBAS) is disclosed. Further, the ProBAS introduces an advanced system that revolutionizes budget monitoring and anomaly detection by leveraging artificial intelligence (AI) in a novel manner. Unlike traditional budget monitoring systems that solely rely on historical financial data, ProBAS integrates AI to analyze both real budget historical data and synthetic data. This dual-data approach enables the system to achieve unprecedented accuracy and foresight in identifying budgetary anomalies, setting a new standard in proactive financial management. Further, the features of the ProBAS are as follows:

Integration of synthetic data: ProBAS distinguishes itself by generating and incorporating synthetic data that simulates a wide range of possible financial scenarios and outcomes. This synthetic data is meticulously designed to mirror the complexity and variability of real-world financial activities, including irregular spending patterns, sudden budgetary shifts, and unexpected financial demands. By training the AI models with this comprehensive dataset, ProBAS significantly enhances the system's predictive capabilities, enabling it to recognize potential anomalies that could not be identified through historical data alone.

AI-driven anomaly detection: At the heart of ProBAS lies a sophisticated AI algorithm capable of discerning subtle patterns and discrepancies within financial data that may indicate emerging budgetary issues. This AI does not simply compare current spending against past trends; it employs advanced machine learning techniques to evaluate financial activities in the context of both historical and synthetic data. This allows for the early detection of anomalies, ranging from minor deviations to significant discrepancies, well before they escalate into critical financial concerns.

Proactive budgetary insights: By integrating AI in such a comprehensive manner, ProBAS goes beyond reactive financial reporting. It provides actionable insights that empower organizations to address potential budget overruns and inefficiencies preemptively. The system automatically generates alerts and recommendations when it identifies potential anomalies, offering guidance on corrective actions and adjustments. This proactive approach ensures that financial managers and decision-makers can maintain tighter control over budgets, optimize resource allocation, and avoid the financial pitfalls commonly encountered in dynamic business environments. Cloud Cost observability or Cloud budget observability is at the forefront of CloudThrottle's design, enabling a proactive stance toward cloud budget management and operational efficiency.

Adaptive learning and continuous improvement: ProBAS's AI models are designed for continuous learning, allowing them to adapt to the evolving financial landscape of an organization. As the system processes more real and synthetic data over time, its predictive accuracy and anomaly detection capabilities improve. This adaptive learning ensures that ProBAS remains effective and relevant, even as an organization's financial patterns and priorities evolve.

Enhanced financial management and decision making: The integration of AI and synthetic data in ProBAS fundamentally transforms the approach to budget monitoring and management. By providing early warnings of potential issues and actionable insights for preemptive action, the system facilitates more informed and strategic financial decision-making. This leads to improved financial health, reduced risk of budget overruns, and enhanced operational efficiency for organizations.

According to some embodiments, a CloudPause—enhanced automated cloud resource scheduling system for optimal efficiency and cost reduction is disclosed.

This system capitalizes on the Pay-as-you-go (PAYG) philosophy of cloud computing, introducing a pioneering approach to cloud resource management. By integrating a sophisticated automated scheduling system capable of dynamically enabling and disabling cloud resources based on predefined operational schedules, CloudPause ensures that organizations only pay for the computing resources they consume, in alignment with the PAYG model. This contrasts sharply with traditional resource management solutions that do not optimize for variable usage, leading to unnecessary costs for idle resources. CloudPause is particularly effective in maximizing capacity utilization, thereby controlling the billion-dollar cloud waste issue. It optimizes the use of idle resources in development and testing environments, where cloud resources often remain unused during non-working hours, ensuring that organizations do not incur costs for unutilized services. CloudPause employs advanced algorithms to analyze usage patterns, predict resource requirements, and automatically adjust resource availability to align with actual operational needs. This proactive management minimizes idle resources, significantly reducing associated costs and maximizing the financial benefits of the PAYG pricing model. The system's innovative scheduling engine is adept at accommodating complex, multi-layered scheduling scenarios, including peak and off-peak hours, special event-driven resource needs, and ad-hoc adjustments for unforeseen demands. This ensures that resources are available when needed and conserved during downtime, leading to more sustainable cloud operations and environmental benefits through reduced energy consumption. Furthermore, CloudPause supports granular control over resource scheduling, allowing for the customization of schedules at both the macro (entire cloud environments or accounts) and micro (individual resources or groups of resources) levels. This dual-level scheduling capability ensures that the system can be tailored to the unique operational rhythms and requirements of various organizations, enhancing its applicability across a wide range of industries and cloud computing models. The system also features a user-friendly interface that provides real-time insights into resource utilization and scheduling effectiveness, offering actionable intelligence for continuous optimization. Through the integration of CloudPause, organizations can strike an ideal balance between operational efficiency and cost management, making it a transformative solution for the dynamic and resource-intensive nature of cloud computing environments. By leveraging the PAYG model through automated, intelligent scheduling, CloudPause represents a significant leap forward in the pursuit of operational efficiency, cost savings, and environmental sustainability within the cloud computing domain.

According to some aspects, a ProActive Resource Management System (ProRMS)—AI-driven optimization of cloud resources is disclosed. The ProActive Resource Management System (ProRMS) represents a groundbreaking advancement in the management and optimization of cloud resources, leveraging the power of artificial intelligence (AI) to transform cloud computing efficiency and cost-effectiveness. This system is distinctively designed to analyze extensive historical usage data of cloud resources across multiple platforms and services, employing sophisticated AI algorithms and machine learning techniques to discern patterns and trends in resource utilization. Further, key innovations and technical advancements are as follows:

Intelligent analysis of usage patterns: ProRMS goes beyond traditional static threshold-based approaches by dynamically analyzing historical and real-time data to understand usage patterns. This includes identifying peak usage times, recurring schedules of high demand, and periods of underutilization, facilitating a more nuanced understanding of cloud resource needs.

Identification of peak and non-peak hours: Utilizing AI, ProRMS accurately predicts peak and non-peak hours for resource utilization, enabling preemptive resource allocation or de-allocation. This predictive capability ensures that resources are optimally allocated, reducing waste and improving overall cloud efficiency.

AI-driven resource optimization: By harnessing the predictive insights gained from AI analysis, ProRMS automates the scheduling of resource scaling activities. This includes scaling up resources in anticipation of peak demand periods and scaling down or deallocating resources during predicted low-usage times, ensuring that cloud resource usage is both efficient and cost-effective.

Adaptive learning mechanism: ProRMS features an adaptive learning mechanism that continuously refines its predictive models based on new data, improving its accuracy and effectiveness over time. This self-improving system adapts to changes in usage patterns and evolving business needs, maintaining optimal resource allocation without manual intervention.

Cross-platform compatibility and integration: Designed to work seamlessly across multiple cloud platforms, ProRMS offers a unified solution for resource optimization. Its platform-agnostic approach enables businesses to manage and optimize resources across diverse cloud environments, enhancing operational flexibility and resource utilization.

Environmental impact and sustainability: By optimizing the utilization of cloud resources, ProRMS contributes to reduced energy consumption and lower carbon emissions associated with cloud computing facilities. This aligns with sustainability goals and environmental responsibility, making it an essential tool for eco-conscious organizations. Further, the Further, the ProActive Resource Management System (ProRMS) has the following benefits over existing technologies:

Cost reduction: By ensuring that cloud resources are used efficiently, ProRMS significantly reduces unnecessary expenditure on idle or underutilized resources, offering substantial cost savings over traditional cloud management approaches.

Enhanced performance: Through AI-driven optimization, ProRMS ensures that adequate resources are always available to meet demand, enhancing application performance and user satisfaction.

Operational efficiency: Automating the complex task of resource management, ProRMS frees up valuable IT resources to focus on strategic initiatives rather than routine operational tasks.

Scalability and flexibility: ProRMS enables organizations to scale their cloud resource utilization up or down with unprecedented agility, responding swiftly to changing business requirements and market conditions.

Further, the ProActive Resource Management System (ProRMS) introduces a novel, AI-driven approach to cloud resource management, setting a new standard for efficiency, cost-effectiveness, and environmental sustainability in the cloud computing domain.

According to some aspects, an automated budget proration and rollover is disclosed. Further, the automated budget proration and rollover may be associated with a sophisticated system for dynamically managing cloud budgets across various timeframes, integrating seamlessly with the foundational real-time financial monitoring and sophisticated budget management systems. The system introduces a novel method for the automatic proration of budgets at the inception of budget creation and at the conclusion of each month, thereby ensuring budgets are accurately aligned with the temporal distribution of expenditures. This method addresses and resolves the common challenge of aligning budget allocations with irregular project timelines or fluctuating cloud resource usage patterns. Further enhancing its innovation, the system incorporates an automated budget rollover mechanism. This mechanism ensures that any unutilized funds from a given period are not forfeited but are instead automatically carried over to the next period. This feature mitigates the traditional "use it or lose it" predicament faced by many cloud budget managers, promoting a more efficient and responsible allocation of financial resources. The rollover process is meticulously designed to work in harmony with the real-time data analysis provided by comprehensive API or any other similar mechanism integration with cloud service providers, leveraging the detailed financial insights garnered to optimize budget allocations over time. The automated proration and rollover functionalities are grounded in a robust analytical framework that utilizes advanced algorithms to assess spending patterns, forecast future expenditures, and adjust budget allocations dynamically. This framework is capable of handling complex budgeting scenarios, including varying project scales, multiple cloud environments, and diverse financial objectives, offering an unparalleled level of precision and flexibility in cloud budget management. By leveraging the capabilities introduced by the above mentioned aspects, this expanded system not only simplifies the financial management of cloud resources but also introduces a level of automation and intelligence previously unseen in the field. It represents a significant leap forward in the ability of organizations to manage their cloud expenditures more effectively, reducing waste and enhancing the strategic use of financial resources in cloud computing environments.

According to some aspects, budget triggers and thresholds with advisory thresholds and control limits are disclosed. Further, the budget triggers and thresholds with advisory thresholds and control limits may be associated with an advanced "Budget Triggers and Thresholds with Advisory Thresholds and Control Limits" system, meticulously engineered to integrate within the sophisticated budget monitoring and management framework. This innovative system equips organizations with a dual-layered mechanism for nuanced cloud spending management, combining the flexibility of advisory alerts with the enforceability of spending ceilings, all while leveraging the comprehensive insights provided by the underlying budget management framework. Further, the "Budget Triggers and Thresholds with Advisory Thresholds and Control Limits" system is associated with:

Advisory thresholds (Soft Cap): Act as multi-level proactive alerts within the budget monitoring framework, designated at predetermined percentages of the budget to signal approaching financial boundaries. These thresholds can be set to trigger at various levels, enable early strategic responses, facilitating adjustments to spending patterns before reaching critical limits. By integrating these multi-level alerts, utilizing the advanced analytics of the framework, advisory thresholds help preempt budget overruns, allowing for timely interventions that align with financial objectives and project requirements.

Control limits (Hard Cap): Represent definitive financial boundaries, imposing strict restrictions on expenditure once these limits are reached. Integrated with the budget monitoring framework's real-time data analysis and forecasting capabilities, control limits automatically enforce budget compliance, halting additional spending to prevent budgetary overreach and maintain fiscal discipline. Embedding this system within the sophisticated budget monitoring and management framework significantly bolsters its utility, offering an automated, data-driven approach to financial oversight. The framework's capability to process real-time financial data and apply predictive analytics underpins the effective management of advisory thresholds and control limits, enabling:

Adaptive financial strategies: Dynamic management of advisory thresholds and control limits based on comprehensive financial insights and predictive models provided by the framework, ensuring that budget controls are responsive to evolving organizational dynamics and market conditions.

Informed financial decision-making: Leveraging the framework's detailed monitoring features to equip decision-makers with in-depth analyses of spending trends, facilitating precise and strategic financial planning.

Optimized resource utilization: Encouraging efficient allocation of cloud resources by aligning expenditure with strategic priorities and project demands, supported by the actionable intelligence delivered by the budget monitoring framework.

Automated financial governance: Automated enforcement of financial policies through the application of advisory thresholds and control limits, driven by the framework's seamless integration with cloud service APIs or any other mechanism and financial management platforms.

Incorporating the "Budget Triggers and Thresholds with Advisory Thresholds and Control Limits" system within the established budget monitoring and management framework significantly enhances cloud cost management practices. It provides organizations with a sophisticated tool for navigating the complexities of cloud expenditure, achieving an optimal balance of financial flexibility, control, and strategic oversight.

According to some aspects, budget triggers and thresholds with advisory thresholds and control limits are disclosed. Further, the budget triggers and thresholds with advisory thresholds and control limits may be associated with a "Budget Triggers and Thresholds with Advisory Thresholds and Control Limits" system which is intricately integrated within a sophisticated budget monitoring and management framework. This system offers organizations a comprehensive and nuanced approach to cloud expenditure management, leveraging both preemptive notifications and decisive spending controls, supported by the extensive data analytics capabilities of the underlying framework. Further, the "Budget Triggers and Thresholds with Advisory Thresholds and Control Limits" system may be associated with advisory thresholds and control limits.

Advisory thresholds: Set at designated budget percentages, these thresholds act as early warning systems, employing email and other integrated alerting mechanisms to promptly notify stakeholders of approaching budget limits. This feature ensures stakeholders are well-informed in real-time, facilitating strategic financial planning and preemptive adjustments to adhere to budgetary constraints, thus enhancing the organization's ability to manage finances proactively.

Control limits: Establish firm boundaries for allowable spending, with a dual-action mechanism that both restricts further cloud resource provisioning and sends comprehensive alerts through email and integrated alerting systems when these limits are reached. This ensures that, in addition to automatically halting the provisioning of new cloud resources to prevent overspending, stakeholders are immediately made aware of the situation. This alert system allows for rapid administrative intervention to assess and address the cause of the breach, ensuring that financial governance is maintained and that measures are implemented to realign expenditures with budgetary frameworks.

By embedding these advanced controls within the budget monitoring and management framework, the system achieves:

Dynamic and responsive financial oversight: Through the use of Advisory Thresholds for early alerts and Control Limits for enforcing budgetary compliance, the system ensures that financial management is both proactive and reactive, capable of adapting to real-time fiscal developments.

Enhanced communication and stakeholder engagement: Guaranteeing immediate notification of critical budgetary events to all relevant parties through their preferred channels, thus facilitating collaborative decision-making and swift response to financial challenges.

Automated budgetary enforcement: With Control Limits that not only restrict cloud resource provisioning but also alert stakeholders to such actions, the system ensures strict adherence to budgetary allocations, reinforcing the organization's financial discipline.

Strategic financial management and governance: Leveraging an automated, data-driven approach for both monitoring spending and controlling resource allocation, the system aligns cloud expenditures with strategic priorities, optimizing resource utilization and financial performance.

The integration of "Budget Triggers and Thresholds with Advisory Thresholds and Control Limits" into the budget monitoring and management framework represents a significant advancement in the domain of cloud cost management. This system provides organizations with a sophisticated toolset for navigating the complexities of cloud resource expenditure, striking the perfect balance between maintaining operational agility and enforcing strict budgetary limits through an informed, automated strategy for resource management and financial oversight.

According to some aspects, budget override and additional funds management is disclosed. Building upon the foundational system of Advanced Budget Monitoring and Management tailored for Federal and commercial contracting environments. Further, the budget override and additional funds management enhances the financial management framework by introducing two pivotal features: The Budget Override Mechanism and the Additional Funds Allocation. These features are specifically designed to extend the capabilities of the system, ensuring that it can adeptly handle scenarios that surpass the established budgetary control limits, thereby offering a nuanced level of financial adaptability and precision crucial for fixed-price and other contract types.

The budget override mechanism includes an override flag and an additional funds allocation.

Override flag: The system's Override Flag is a key feature designed to temporarily authorize the utilization of up to 100% of the allocated budget for a specific month. This is particularly crucial for situations where financial demands unexpectedly surpass the "Control Limits" set within the budget, offering a critical solution for projects facing immediate and unforeseen financial needs. The activation process for the Override Flag is carefully governed by a series of authorization checks, ensuring that any decision to exceed the control limit is taken with full accountability and strategic foresight. This mechanism is invaluable for navigating the strict confines of fixed-price contracts, providing a means to address sudden financial challenges while remaining compliant with established contractual and regulatory frameworks.

Additional funds allocation: In addition to the Override Flag, the system includes a feature for Additional Funds Allocation, enabling the infusion of financial resources beyond the monthly budget allocation. This functionality is essential for extraordinary circumstances where the project's financial needs extend beyond the allocated monthly budget and the capabilities provided by the Override Flag. It allows for the strategic augmentation of the project budget for a particular month, facilitating the management of unforeseen scenarios or the exploitation of emergent opportunities without destabilizing the project's financial structure or progress. The process for securing additional funds is structured around a stringent approval workflow, emphasizing the system's dedication to maintaining financial control and transparency.

Integrating these mechanisms within a unified Advanced Budget Monitoring and Management system, our approach is adept at managing the unique and often stringent requirements of Federal and commercial contracts. Leveraging foundational real-time financial data access through comprehensive API or any other similar mechanism integration with cloud service providers, the system guarantees that budgetary adjustments are both timely and compliant with relevant financial regulations and contract stipulations.

According to some aspects, budget modification with contract lifecycle and fixed-price project alignment is disclosed. Further, the budget modification with contract lifecycle and fixed-price project alignment is a novel aspect of budget modification that leverages and expands upon the foundational budget management capabilities. Further, the budget modification with contract lifecycle and fixed-price project alignment introduces an integrated system designed for seamless alignment with the intricate requirements of contract lifecycles in both Federal and commercial sectors. This system enhances the basic budget adjustment functionalities to include dynamic modifications that are not only responsive to changing project needs and unexpected situations but also meticulously tailored to comply with the regulatory frameworks and fiscal cycles specific to federal and commercial contracting. Engineered to align with every phase of the contract lifecycle, from initiation through to completion, the system supports budget modifications that adhere to the unique budgetary cycles, detailed reporting obligations, and compliance mandates essential in Federal contracting. It ensures that all budget adjustments are in strict conformity with Federal Acquisition Regulations (FAR) and other relevant standards, thereby safeguarding against compliance risks and boosting operational effectiveness. By building on the foundational budget management capabilities, this expanded budget modification functionality not only underscores financial management efficiency but also ensures rigorous compliance with federal standards and enhances budget oversight throughout a project's lifecycle. This development marks a significant advancement in budget management, offering organizations enhanced financial discipline, adaptability, and compliance, crucial for successfully delivering federal and commercial projects.

According to some aspects, an automated cloud resource scheduler with centralized control is disclosed. Further, the automated cloud resource scheduler with centralized control heralds a significant innovation in cloud computing with the development of an Automated Cloud Resource Scheduler that features a dynamic, rule-based scheduling engine complemented by a centralized control mechanism and setting it apart from conventional scheduling solutions, which may operate in silos or necessitate manual oversight for resource allocation, this inventive scheduler utilizes sophisticated rule-based algorithms and real-time data to automate the management of cloud resource utilization efficiently across diverse cloud platforms and services. Further, the key innovations and benefits associated with the automated cloud resource scheduler with centralized control are as follows:

Dynamic scheduling engine: Employs advanced rule-based algorithms to automate the allocation and scheduling of cloud resources in accordance with real-time demand, workload fluctuations, and predefined operational policies. This capability ensures that resources are utilized optimally, minimizing idle times and reducing operational expenses.

Centralized control dashboard: Offers a comprehensive, intuitive dashboard providing centralized oversight and management capabilities for cloud resources across different environments. Through this dashboard, administrators can effortlessly monitor resource statuses, modify scheduling rules, and receive notifications about potential issues from a singular interface, thereby streamlining operations and enhancing strategic decision-making.

Rule-based optimization: Integrates a sophisticated rule-based logic system to analyze usage patterns and implement scheduling decisions based on a set of predefined rules and conditions. This approach ensures resources are allocated and scaled precisely according to organizational policies and workload requirements, optimizing performance and cost-efficiency.

Cross-platform compatibility: Designed for seamless integration with leading cloud service providers, this scheduler enables organizations to manage resources across AWS, Azure, Google Cloud, and others through a unified system. Such compatibility ensures a cohesive cloud management strategy that can adapt to the varied infrastructure needs of modern enterprises.

Environmental sustainability: By enhancing resource usage efficiency and curtailing unnecessary consumption, the scheduler aids in reducing the energy usage and carbon emissions associated with cloud operations, aligning with broader sustainability objectives and corporate responsibility initiatives.

According to some aspects, dual-level scheduling (account and resource level) is disclosed. Further, the dual-level scheduling introduces a pioneering approach to cloud resource management through its Dual-Level Scheduling system which operates at both the account and individual resource levels within a cloud computing environment. This dual-level scheduling mechanism represents a significant leap in cloud management technology by offering an unprecedented level of flexibility and granularity in how cloud resources are scheduled for operation. Further, the key features and innovations associated with the dual-level scheduling are as follows:

Hierarchical scheduling framework: By implementing a hierarchical scheduling framework, the system enables comprehensive management across different organizational levels. At the top tier, account-level scheduling allows administrators to define overarching operational schedules that apply to all resources within a cloud account, facilitating broad-stroke efficiency improvements and policy compliance. At the lower tier, resource-level scheduling grants the ability to tailor operational parameters for individual resources or groups of resources, accommodating specific requirements, workload variations, and performance optimizations.

Enhanced operational flexibility: this dual-level approach empowers users to precisely align cloud resource utilization with actual demand patterns and operational needs. Account-level scheduling provides a macro-level tool for cost management and policy enforcement, while resource-level scheduling addresses micro-level efficiency and flexibility. This dual mechanism ensures that resources are not just allocated but are dynamically adjusted to meet the organization's evolving needs, reducing waste and optimizing cost-efficiency.

Granular control and customization: The system allows for detailed customization of scheduling policies, enabling users to set specific operational windows, define exception rules, and adjust schedules based on real-time analytics. Such granularity ensures that critical resources remain available when needed, while non-essential resources can be scaled down or turned off to conserve costs. This level of control is pivotal for organizations managing diverse cloud environments with varying workload requirements.

Further, technical and operational advantages associated with the dual-level scheduling are as follows:

Cost reduction: By optimizing the operational schedule of cloud resources, organizations can significantly reduce their cloud expenditure. The system's ability to turn off or scale down resources during low-demand periods directly translates to lower usage costs.

Performance optimization: Tailoring resource availability to match demand ensures that applications and services have access to necessary resources when needed, enhancing performance and user experience.

Compliance and policy enforcement: The dual-level scheduling facilitates compliance with organizational policies and industry regulations by ensuring resources are used in accordance with predefined operational guidelines.

According to some aspects, holiday schedule integration and preset schedules for operational efficiency are disclosed. Further, the holiday schedule integration and preset schedules innovatively extend the foundational capabilities "CloudPause—Automated Cloud Resource Scheduling for Efficiency" by incorporating advanced scheduling features that leverage company-specific holiday schedules and preset operational schedules to optimize cloud resource utilization. Unlike conventional resource management approaches that operate on a static or manually adjusted schedule, our system dynamically aligns cloud resource activity with actual business operation needs, including recognizing non-standard workdays, holidays, and variable operational hours across different global regions. Further, features associated with the holiday schedule integration and preset schedules are as follows:

Customizable holiday scheduling: The system allows for the customization of holiday schedules, accommodating variations in public holidays, company-specific non-working days, and regional observances. This feature ensures that cloud resources are not unnecessarily active during periods when business operations are halted, thereby reducing operational costs and enhancing energy efficiency.

Preset operational schedules: Incorporating preset schedules for cloud resource activity based on typical business hours or specific operational needs further refines cost management and resource efficiency. These schedules can be predefined for regular operation periods, ensuring that resources are available during peak business hours while conserving resources during off-peak times.

Integration with cloud resource scheduler: This novel approach is seamlessly integrated with the automated cloud resource scheduler, enhancing its capability by incorporating intelligent, calendar-aware decisions into the scheduling logic. This integration ensures that the automated enabling and disabling of resources are not only based on operational patterns but also on specific calendar dates, providing a holistic approach to resource management.

Further, the holiday schedule integration and preset schedules underscore the inventive step of integrating holiday schedules and preset operational schedules into cloud resource management, highlighting its benefits in terms of cost savings, operational efficiency, and environmental sustainability.

According to some aspects, schedule override for flexibility is disclosed. Further, the schedule override introduces a groundbreaking "Schedule Override for Flexibility" feature designed to enhance operational flexibility within cloud resource management, a capability previously unattainable with conventional cloud management systems. This innovation is intricately dependent on the automated cloud resource scheduling for efficiency by leveraging its foundational infrastructure for a more dynamic, responsive operational model. The "Schedule Override for Flexibility" mechanism allows users to temporarily adjust or completely override the automated schedules for cloud resources without the need for manual reconfiguration or permanent alteration to the established scheduling policies. This feature is particularly innovative for several reasons:

Dynamic adaptation to changing requirements: It enables cloud resource management systems to adapt dynamically to sudden changes in operational requirements, workload demands, or specific project needs. For instance, if an unforeseen need arises for additional computing resources due to a spike in demand or to accommodate off-hours development activities, the schedule override feature allows for immediate resource availability adjustment, ensuring that the necessary resources are operational precisely when needed.

Enhanced user control and autonomy: By granting users the ability to override preset schedules, the system significantly enhances user autonomy over cloud resource management. This control extends beyond rigid scheduling frameworks, allowing for real-time adjustments that align with immediate operational objectives or unforeseen circumstances, thus maximizing resource utilization efficiency and minimizing wastage.

Seamless integration with automated scheduling systems: The feature seamlessly integrates with the automated cloud resource scheduling mechanisms, maintaining the integrity and efficiency of the overall resource management system while introducing an unprecedented level of flexibility. This integration ensures that overrides are handled efficiently, with minimal disruption to the overall scheduling logic and without compromising on the cost-saving benefits of automated scheduling.

Intelligent notification and feedback loops: The feature includes intelligent notification systems and feedback loops that inform users of the operational status of resources post-override and the impact on projected cloud spending. This real-time feedback empowers users to make data-driven decisions regarding the duration and extent of schedule overrides.

In essence, the "Schedule Override for Flexibility" encapsulates a novel approach to cloud resource management, addressing the limitations of existing automated scheduling systems by introducing a layer of operational flexibility that supports dynamic, cost-effective cloud resource utilization. This innovation represents a significant leap forward in enabling businesses to manage their cloud environments more effectively, adapting in real-time to the evolving demands of the digital landscape.

According to some aspects, AI-driven resource scheduling for cost optimization is disclosed. Further, the AI-driven resource scheduling for cost optimization represents a pioneering advancement in the field of cloud resource management, emphasizing the strategic deployment of artificial intelligence (AI) to automate and refine the scheduling of cloud resources with the primary objective of minimizing operational costs while maximizing efficiency. This inventive aspect is contingent upon the foundational technologies that establish the groundwork for utilizing AI in analyzing historical cloud usage data to discern patterns indicative of peak and non-peak resource utilization periods. Further, the key innovations associated with the AI-driven resource scheduling are as follows:

Predictive analysis: At the core of this claim is the application of sophisticated AI algorithms that perform predictive analysis on vast datasets, encompassing historical cloud usage patterns. This analysis is not merely reactive but anticipatory, allowing for the prediction of future resource needs with high accuracy.

Dynamic scheduling: Leveraging the insights gained from predictive analysis, the system dynamically adjusts the scheduling of cloud resources. This means that resources are allocated or de-allocated in real-time, based on the anticipated demand, thereby ensuring that resources are not lying idle and accruing unnecessary costs.

Cost-effective resource utilization: By optimizing the timing for resource availability, the system significantly reduces expenditure associated with over-provisioning or underutilization of cloud resources. This approach directly addresses one of the most critical challenges in cloud computing-managing operational costs without compromising on availability or performance.

Customization and flexibility: The AI-driven scheduling mechanism is highly customizable, allowing for adjustments based on specific operational requirements, seasonal variations in demand, or unexpected spikes in resource usage. This adaptability ensures that the scheduling system remains efficient and effective across diverse operational scenarios.

Efficiency and environmental impact: Beyond cost optimization, this claim also encompasses an enhancement in operational efficiency and a reduction in environmental impact. By optimizing resource usage, the system contributes to lower energy consumption and reduced carbon footprint, aligning with sustainability goals.

Continuous learning and improvement: The AI model is designed for continuous learning, incorporating new data into its analysis and refining its predictions over time. This aspect ensures that the system's scheduling decisions improve in accuracy and relevance, adapting to evolving usage patterns and operational needs.

According to some aspects, an advanced budget workflow system for enhanced fiscal discipline in cloud computing environments is disclosed. Further, the advanced budget workflow system introduces an innovative budget workflow system designed to revolutionize financial management within cloud computing environments. Leveraging real-time data analytics, this system provides unprecedented capabilities for tracking, forecasting, and adjusting cloud budgets, ensuring that organizations maintain enhanced fiscal discipline. By building upon the foundational budget management capabilities, the advanced budget workflow system integrates seamlessly with comprehensive API or any other similar mechanism integration for real-time financial monitoring, enabling a dynamic and responsive approach to budget management that is both proactive and predictive. Further, the key features of the advanced budget workflow system include:

Real-time budget tracking: Utilizing live financial data streams from various cloud service providers, the system offers an up-to-the-minute view of expenditures. This enables organizations to monitor their cloud spending continuously, identifying trends and anomalies as they occur.

Intelligent forecasting: By employing advanced algorithms and machine learning techniques, the system analyzes historical spending data alongside real-time inputs to predict future budgetary requirements. This predictive capability allows for more accurate financial planning, helping organizations to anticipate and prepare for future expenditures.

Dynamic budget adjustments: The system facilitates immediate budgetary adjustments in response to changing cloud resource needs or financial objectives. Through an intuitive interface, users can recalibrate their budgets based on the system's forecasting, ensuring that financial resources are allocated efficiently and effectively.

Enhanced fiscal discipline: By providing a comprehensive overview of cloud spending and facilitating informed decision-making, the system promotes a culture of fiscal responsibility. Organizations can set precise budgetary controls and thresholds, receive alerts for potential overspending, and implement strategies to optimize their cloud investments.

Seamless integration with existing financial systems: The Advanced Budget Workflow System is designed to integrate smoothly with an organization's existing financial management infrastructure, enhancing its capabilities without requiring significant changes to established processes.

Customizable alerts and reports: Users can configure the system to generate alerts for specific budgetary events or thresholds and create customized reports that align with organizational needs and compliance requirements. This customization ensures that stakeholders have access to relevant, actionable information tailored to their roles.

In-depth audit trail for transparency and accountability: The system offers an in-depth audit trail detailing who made changes, what changes were made, and when these changes occurred. By including this level of detail, the system ensures complete transparency and accountability, providing stakeholders with the ability to trace every action and decision back to its source, thereby enhancing the integrity and reliability of the budget management process.

By expanding the capabilities of traditional budget management systems with real-time data analytics, predictive forecasting, dynamic adjustments, and comprehensive auditing, the Advanced Budget Workflow System sets a new standard for financial management in the cloud. It addresses the unique challenges of cloud cost management, providing organizations with the tools they need to maintain control over their spending, optimize their cloud resource utilization, and achieve greater fiscal discipline.

Although the present disclosure has been explained in relation to its preferred embodiment, it is to be understood that many other possible modifications and variations can be made without departing from the spirit and scope of the disclosure.

What is claimed is:

1. A method for facilitating real-time management of budgets for cloud accounts, the method comprising:
obtaining, using a processing device, at least one real-time account information associated with at least one cloud account of at least one cloud platform;
analyzing, using the processing device, the at least one real-time account information using at least one machine learning model, wherein the at least one machine learning model is configured for detecting at least one of a pattern, a trend, and an anomaly corresponding to a utilization of a cloud resource by the at least one cloud account;
determining, using the processing device, at least one value of at least one parameter associated with the utilization of the cloud resource by the at least one cloud account;
determining, using the processing device, at least one action required to be implemented for the at least one cloud account based on the determining of the at least one value of the at least one parameter;
generating, using the processing device, at least one cloud account controlling command for implementing the at least one action based on the determining of the at least one action;
transmitting, using a communication device, the at least one cloud account controlling command to at least one cloud service provider device associated with at least one cloud service provider, wherein the at least one cloud service provider provides the at least one cloud account;
storing, using a storage device, the at least one real-time account information;
obtaining, using the processing device, at least one budget information associated with at least one budget allocated to the at least one cloud account;
analyzing, using the processing device, the at least one budget information and the at least one value of the at least one parameter, wherein the determining of the at least one action is further based on the analyzing of the at least one budget information and the at least one value of the at least one parameter;
analyzing, using the processing device, the at least one value of the at least one parameter and at least one threshold value of the at least one parameter;
generating, using the processing device, at least one alert based on the analyzing of the at least one value of the at least one parameter and the at least one threshold value of the at least one parameter;
transmitting, using the communication device, the at least one alert to at least one device;
receiving, using the communication device, at least one threshold information from the at least one device;
analyzing, using the processing device, the at least one threshold information using the at least one machine learning model, wherein the at least one machine learning model is configured for at least one of applying predictive analytics and forecasting a budgetary issue for the at least one cloud account;
adjusting, using the processing device, the at least one threshold value dynamically based on at least one of the applying of the predictive analytics, the forecasting of the budgetary issue, and the detecting of the anomaly; and
determining, using the processing device, the at least one threshold value for the at least one parameter based on the analyzing of the at least one threshold information and the adjusting of the at least one threshold value, wherein the analyzing of the at least one value of the at least one parameter and the at least one threshold value of the at least one parameter is based on the determining of the at least one threshold value.

2. The method of claim 1 further comprising:
receiving, using the communication device, at least one data from at least one device;
analyzing, using the processing device, the at least one data; and
determining, using the processing device, the at least one parameter, wherein the determining of the at least one value for the at least one parameter is further based on the determining of the at least one parameter.

3. The method of claim 1 further comprising:
retrieving, using the storage device, at least one historical account information associated with the at least one cloud account;
obtaining, using the processing device, at least one synthetic account information associated with the at least one cloud account; and
training, using the processing device, the at least one machine learning model based on the at least one historical account information and the at least one synthetic account information, wherein the analyzing of the at least one real-time account information using the at least one machine learning model is based on the training.

4. The method of claim 1 further comprising predicting, using the processing device, at least one requirement associated with the at least one cloud account based on the at least one value of the at least one parameter, wherein the determining of the at least one action is further based on the at least one requirement.

5. The method of claim 1 further comprising:
obtaining, using the processing device, at least one information associated with at least one project implemented using the at least one cloud account;
analyzing, using the processing device, the at least one information;
determining, using the processing device, at least one requirement associated with the at least one cloud account based on the analyzing of the at least one information; and
analyzing, using the processing device, the at least one value of the at least one parameter and the at least one requirement, wherein the determining of the at least one action is further based on the analyzing of the at least one value of the at least one parameter and the at least one requirement.

6. The method of claim 1 further comprising:
receiving, using the communication device, at least one schedule associated with the utilization of the cloud resource by the at least one cloud account from at least one device; and
analyzing, using the processing device, the at least one schedule, wherein the determining of the at least one action is further based on the analyzing of the at least one schedule.

7. The method of claim 1 further comprising:
obtaining, using the processing device, at least one first real-time account information associated with the at least one cloud account after the implementing of the at least one action;
analyzing, using the processing device, the at least one first real-time account information; and
adjusting, using the processing device, at least one variable associated with the at least one machine learning model for optimizing the at least one machine learning model based on the analyzing of the at least one first real-time account information.

8. A system for facilitating managing budgets for cloud accounts, the system comprising:
a processing device configured for:
obtaining at least one real-time account information associated with at least one cloud account of at least one cloud platform;
analyzing the at least one real-time account information using at least one machine learning model, wherein the at least one machine learning model is configured for detecting at least one of a pattern, a trend, and an anomaly corresponding to a utilization of a cloud resource by the at least one cloud account;
determining at least one value of at least one parameter associated with the utilization of the cloud resource by the at least one cloud account;
determining at least one action required to be implemented for the at least one cloud account based on the determining of the at least one value of the at least one parameter; and
generating at least one cloud account controlling command for implementing the at least one action based on the determining of the at least one action;
a communication device communicatively coupled with the processing device, wherein the communication device is configured for transmitting the at least one cloud account controlling command to at least one cloud service provider device associated with at least one cloud service provider, wherein the at least one cloud service provider provides the at least one cloud account;
a storage device communicatively coupled with the processing device, wherein the storage device is configured for storing the at least one real-time account information;
the processing device being further configured for:
obtaining at least one budget information associated with at least one budget allocated to the at least one cloud account;
analyzing the at least one budget information and the at least one value of the at least one parameter, wherein the determining of the at least one action is further based on the analyzing of the at least one budget information and the at least one value of the at least one parameter;
analyzing the at least one value of the at least one parameter and at least one threshold value of the at least one parameter;
generating at least one alert based on the analyzing of the at least one value of the at least one parameter and the at least one threshold value of the at least one parameter, wherein the communication device is further configured for transmitting the at least one alert to at least one device;
the communication device being further configured for:
receiving at least one threshold information from the at least one device, wherein the processing device is further configured for:
analyzing the at least one threshold information using the at least one machine learning model, wherein the at least one machine learning model is configured for at least one of applying predictive analytics and forecasting a budgetary issue for the at least one cloud account;
adjusting the at least one threshold value dynamically based on at least one of the applying of the predictive analytics, the forecasting of the budgetary issue, and the detecting of the anomaly; and
determining the at least one threshold value for the at least one parameter based on the analyzing of the at least one threshold information and the adjusting of the at least one threshold value, wherein the analyzing of the at least one value of the at least one parameter and the at least one threshold value of the at least one parameter is based on the determining of the at least one threshold value.

9. The system of claim 8, wherein the communication device is further configured for receiving at least one data from at least one device, wherein the processing device is further configured for:

analyzing the at least one data; and determining the at least one parameter, wherein the determining of the at least one value for the at least one parameter is further based on the determining of the at least one parameter.

10. The system of claim 8, wherein the storage device is further configured for retrieving at least one historical account information associated with the at least one cloud account, wherein the processing device is further configured for:

obtaining at least one synthetic account information associated with the at least one cloud account; and training the at least one machine learning model based on the at least one historical account information and the at least one synthetic account information, wherein the analyzing of the at least one real-time account information using the at least one machine learning model is based on the training.

11. The system of claim 8, wherein the processing device is further configured for predicting at least one requirement associated with the at least one cloud account based on the at least one value of the at least one parameter, wherein the determining of the at least one action is further based on the at least one requirement.

12. The system of claim 8, wherein the processing device is further configured for:

obtaining at least one information associated with at least one project implemented using the at least one cloud account;

analyzing the at least one information;

determining at least one requirement associated with the at least one cloud account based on the analyzing of the at least one information; and analyzing the at least one value of the at least one parameter and the at least one requirement, wherein the determining of the at least one action is further based on the analyzing of the at least one value of the at least one parameter and the at least one requirement.

13. The system of claim 8, wherein the communication device is further configured for receiving at least one schedule associated with the utilization of the cloud resource by the at least one cloud account from at least one device, wherein the processing device is further configured for analyzing the at least one schedule, wherein the determining of the at least one action is further based on the analyzing of the at least one schedule.

14. The system of claim 8, wherein the processing device is further configured for:

obtaining at least one first real-time account information associated with the at least one cloud account after the implementing of the at least one action;

analyzing the at least one first real-time account information; and adjusting at least one variable associated with the at least one machine learning model for optimizing the at least one machine learning model based on the analyzing of the at least one first real-time account information.

* * * * *